US011592681B2

(12) United States Patent
Yaroshchuk et al.

(10) Patent No.: US 11,592,681 B2
(45) Date of Patent: Feb. 28, 2023

(54) DEVICE INCLUDING DIFFRACTIVE OPTICAL ELEMENT

(71) Applicant: Meta Platforms Technologies, LLC, Menlo Park, CA (US)

(72) Inventors: Oleg Yaroshchuk, Redmond, WA (US); Giuseppe Calafiore, Redmond, WA (US); Alireza Moheghi, Bothell, WA (US); Andrew Maimone, Duvall, WA (US); Barry David Silverstein, Kirkland, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 241 days.

(21) Appl. No.: 17/029,963

(22) Filed: Sep. 23, 2020

(65) Prior Publication Data

US 2022/0091323 A1 Mar. 24, 2022

(51) Int. Cl.
*G02B 27/42* (2006.01)
*G02B 6/02* (2006.01)
(Continued)

(52) U.S. Cl.
CPC ..... *G02B 27/4261* (2013.01); *G02B 6/02076* (2013.01); *G02B 6/29304* (2013.01);
(Continued)

(58) Field of Classification Search
None
See application file for complete search history.

(56) References Cited

U.S. PATENT DOCUMENTS

2017/0184848 A1* 6/2017 Vallius ............... G02B 27/4272
2018/0074340 A1 3/2018 Robbins et al.
(Continued)

FOREIGN PATENT DOCUMENTS

WO 2013033274 A1 3/2013

OTHER PUBLICATIONS

International Search Report and Written Opinion for International Application No. PCT/US2021/044097, dated Feb. 4, 2022, 17 pages.
(Continued)

*Primary Examiner* — Jerry Rahll
(74) *Attorney, Agent, or Firm* — Millburn IP PLLC

(57) ABSTRACT

A device includes a waveguide, an in-coupling element, and an out-coupling element coupled with the waveguide. The waveguide, the in-coupling element, and the out-coupling element are configured to deliver a plurality of portions of an image light to an eye-box of the device. At least one of the in-coupling element or the out-coupling element includes a polarization selective diffractive element. The polarization selective diffractive element includes a grating including a plurality of microstructures defining a plurality of grooves filled with a passive optically anisotropic material having a first effective refractive index along a groove direction of the grooves and a second effective refractive index along an in-plane direction perpendicular to the groove direction. One of the first effective refractive index or the second effective refractive index substantially matches with a refractive index of the microstructures.

12 Claims, 39 Drawing Sheets

(51) Int. Cl.

| | |
|---|---|
| ***G02B 6/293*** | (2006.01) |
| ***G02B 27/01*** | (2006.01) |
| ***G02B 27/28*** | (2006.01) |
| *F21V 8/00* | (2006.01) |

(52) U.S. Cl.

CPC ....... *G02B 27/0172* (2013.01); *G02B 27/286* (2013.01); *G02B 6/0078* (2013.01); *G02B 2027/0178* (2013.01)

(56) References Cited

U.S. PATENT DOCUMENTS

| | | | |
|---|---|---|---|
| 2018/0164627 | A1 | 6/2018 | Oh |
| 2020/0183163 | A1 | 6/2020 | Waldern et al. |

OTHER PUBLICATIONS

Invitation to Pay Additional Fees and Communication Relating to the Results of the Partial International Search for International Application No. PCT/US2021/044097, dated Dec. 14, 2021, 13 pages.

Jepsen M.L., et al., "High Efficiency Liquid-Crystal Filled Diffraction Gratings," Proceedings of SPIE, IEEE, vol. 3011, Feb. 10, 1997, pp. 165-176.

Jepsen M.L.,, et al., "Liquid-Crystal-Filled Gratings with High Diffraction Efficiency," Optics Letters, Optical Society of America, vol. 21, No. 14, Jul. 15, 1996, pp. 1081-1082-1083.

Pavani K., et al., "Electro-Optical Switching of Liquid Crystal Diffraction Gratings by using Surface Relief Effect in the Photopolymer," Optics Communications, vol. 273, Jan. 13, 2007, pp. 367-369.

Chou, J., et al., "Electrically switchable diffractive waveplates with metasurface aligned liquid crystals," Optics Express, vol. 24, No. 21, Oct. 17, 2016, pp. 24265-24273 (9 pages).

Yin, K., et al., "Stretchable, flexible, rollable, and adherable polarization volume grating film," Optics Express, vol. 27, No. 4, Feb. 18, 2019, pp. 5814-5823 (10 pages).

Waldern, J.D., et al., "DigiLens switchable Bragg grating waveguide optics for augmented reality applications," Proceedings of SPIE, vol. 10676, Digital Optics for Immersive Displays, 106760G-1 to 106760G-16, May 21, 2018 (16 pages).

* cited by examiner

1800

1810 — Configuring, during a first time period, at least one of a first in-coupling grating or a first out-coupling grating disposed at a first waveguide of an optical device to operate in a diffraction state

1820 — Coupling, during the first time period by the first in-coupling grating, a first light corresponding to a first portion of an image light into the first waveguide via diffraction,

1830 — Coupling, by the first out-coupling grating, the first light out of the first waveguide toward an eye-box of the optical device via diffraction

1840 — Configuring, during a second time period, at least one of a second in-coupling grating or a second out-coupling grating disposed at a second waveguide to operate in the diffraction state

1850 — Coupling, during the second time period by the second in-coupling grating, a second light corresponding to a second portion of the image light into the second waveguide via diffraction

1860 — Coupling, during the second time period by the second out-coupling grating, the second light out of the second waveguide toward an eye-box of the optical device via diffraction

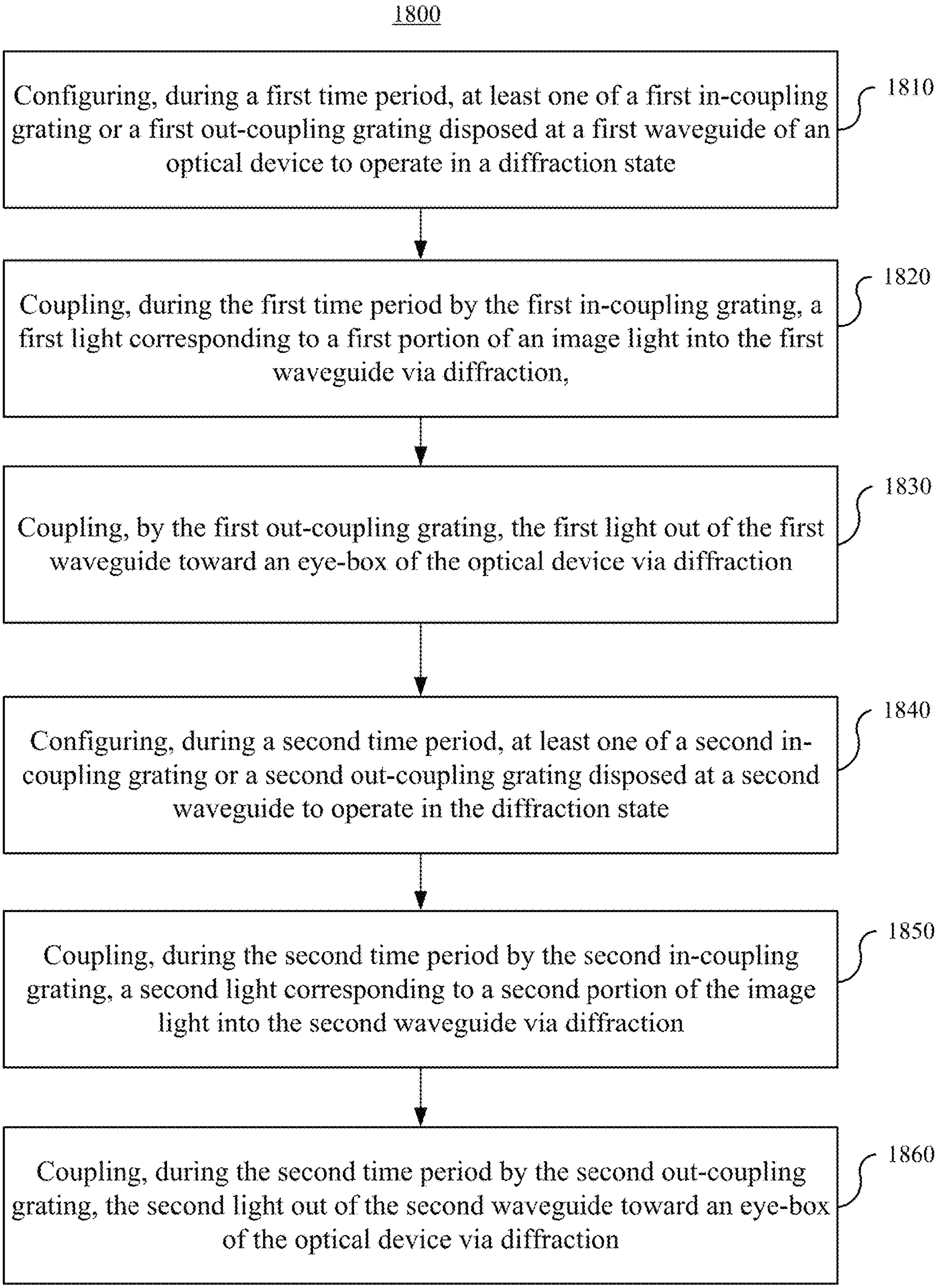

```
┌─────────────────────────────────────────────────────────────────┐
│ Configuring, at least one of a first polarization selective     │ ─ 1910
│ in-coupling element or a first polarization selective           │
│ out-coupling element coupled to a first waveguide of a          │
│ device to operate in a diffraction state                        │
└─────────────────────────────────────────────────────────────────┘
                                │
                                ▼
┌─────────────────────────────────────────────────────────────────┐
│ Directing, by the first polarization selective in-coupling      │ ─ 1920
│ element, the first waveguide, and the first polarization        │
│ selective out-coupling element, a first portion of an image     │
│ light to an eye-box of the device                               │
└─────────────────────────────────────────────────────────────────┘
                                │
                                ▼
┌─────────────────────────────────────────────────────────────────┐
│ Configuring, at least one of a second polarization selective    │ ─ 1930
│ in-coupling element or a second polarization selective          │
│ out-coupling element coupled to a second waveguide to           │
│ operate in the diffraction state                                │
└─────────────────────────────────────────────────────────────────┘
                                │
                                ▼
┌─────────────────────────────────────────────────────────────────┐
│ Directing, by the second polarization selective in-coupling     │ ─ 1940
│ element, the second waveguide, and the second polarization      │
│ selective out-coupling element, a second portion of the image   │
│ light to the eye-box                                            │
└─────────────────────────────────────────────────────────────────┘
```

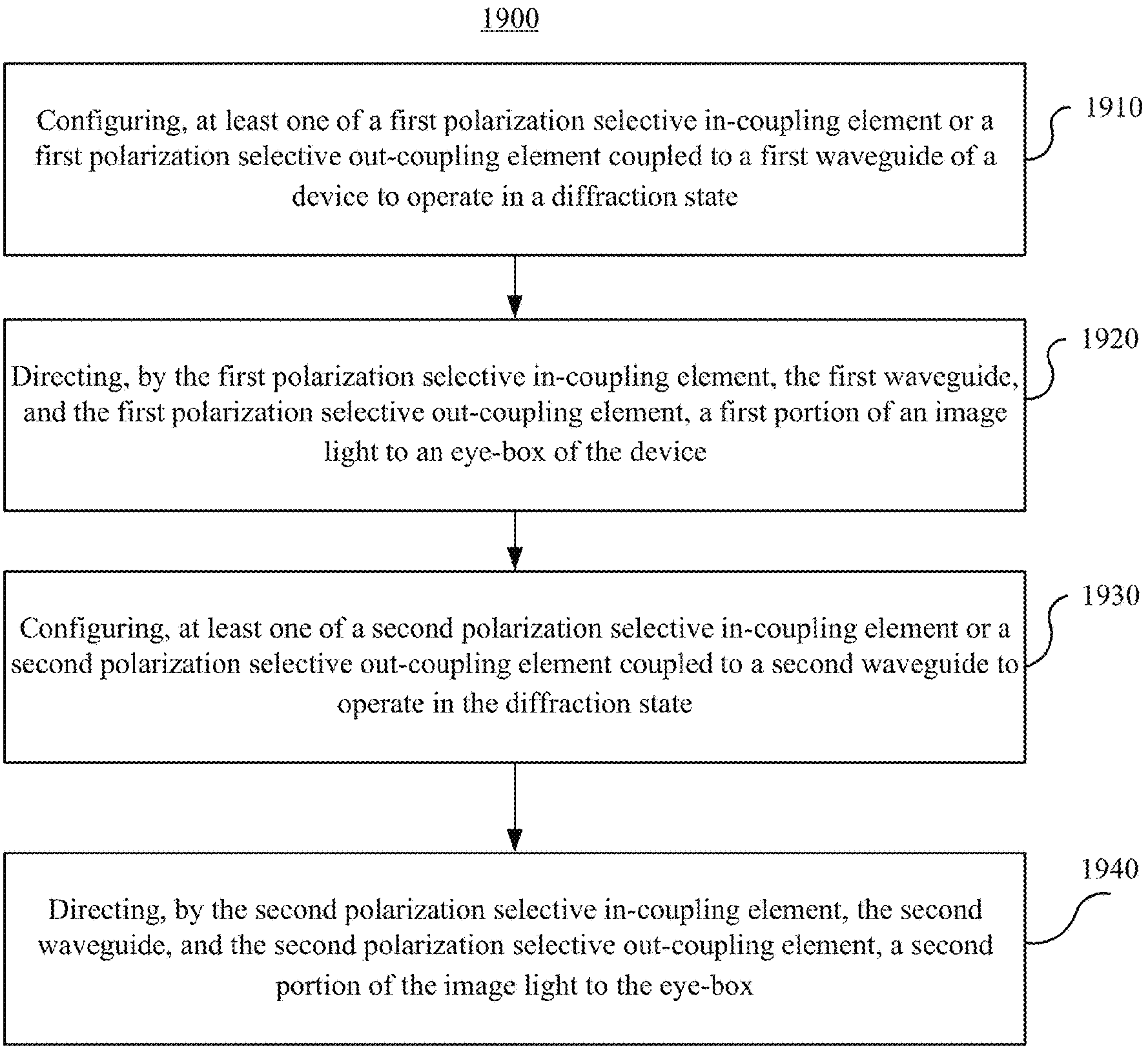

FIG. 19

DEVICE INCLUDING DIFFRACTIVE OPTICAL ELEMENT

TECHNICAL FIELD

The present disclosure relates generally to optical devices and, more specifically, to a device including a diffractive optical element.

BACKGROUND

Near-eye displays ("NEDs") have been widely implemented in a variety of applications, such as video playback, gaming, and sports. NEDs have been used to present information to a user through virtual reality ("VR"), augmented reality ("AR"), or mixed reality ("MR") technologies. AR or MR headsets display a virtual image overlapping or superimposed with real-world images or see-through images. Pupil-expansion waveguide display systems with diffractive coupling structures are promising designs for AR/MR displays, which can potentially offer sun/eye-glasses form factors, a moderately large field of view ("FOV"), a high transmittance, and a large eye-box. A waveguide display system includes a micro-display, a collimator, and waveguide optics such as a waveguide combiner. The waveguide combiner integrates in-coupling and out-coupling elements that may be diffraction gratings. Various diffraction gratings may be integrated into the waveguide combiner, such as surface relief gratings obtained by nanofabrication or holographic gratings of various types.

SUMMARY OF THE DISCLOSURE

One aspect of the present disclosure provides a device. The device includes a waveguide, an in-coupling element, and an out-coupling element coupled with the waveguide. The waveguide, the in-coupling element, and the out-coupling element are configured to deliver a plurality of portions of an image light to an eye-box of the device. At least one of the in-coupling element or the out-coupling element includes a polarization selective diffractive element. The polarization selective diffractive element includes a grating including a plurality of microstructures defining a plurality of grooves filled with a passive optically anisotropic material having a first effective refractive index along a groove direction of the grooves and a second effective refractive index along an in-plane direction perpendicular to the groove direction. One of the first effective refractive index or the second effective refractive index substantially matches with a refractive index of the microstructures.

Another aspect of the present disclosure provides a method. The method includes configuring, at least one of a first polarization selective in-coupling element or a first polarization selective out-coupling element coupled to a first waveguide of a device to operate in a diffraction state. The method also includes directing, by the first polarization selective in-coupling element, the first waveguide, and the first polarization selective out-coupling element, a first portion of an image light to an eye-box of the device. The method also includes configuring, at least one of a second polarization selective in-coupling element or a second polarization selective out-coupling element coupled to a second waveguide to operate in the diffraction state. The method further includes directing, by the second polarization selective in-coupling element, the second waveguide, and the second polarization selective out-coupling element, a second portion of the image light to the eye-box.

Other aspects of the present disclosure can be understood by those skilled in the art in light of the description, the claims, and the drawings of the present disclosure.

BRIEF DESCRIPTION OF THE DRAWINGS

The following drawings are provided for illustrative purposes according to various disclosed embodiments and are not intended to limit the scope of the present disclosure. In the drawings:

FIG. 18 illustrates a flow chart showing a method of directing a plurality of portions of an image light in a time-multiplexing manner, according to an embodiment of the disclosure; and FIG. 19 illustrates a flow chart showing a method of directing a plurality of portions of an image light, according to an embodiment of the disclosure.

DETAILED DESCRIPTION

Figure 1A:
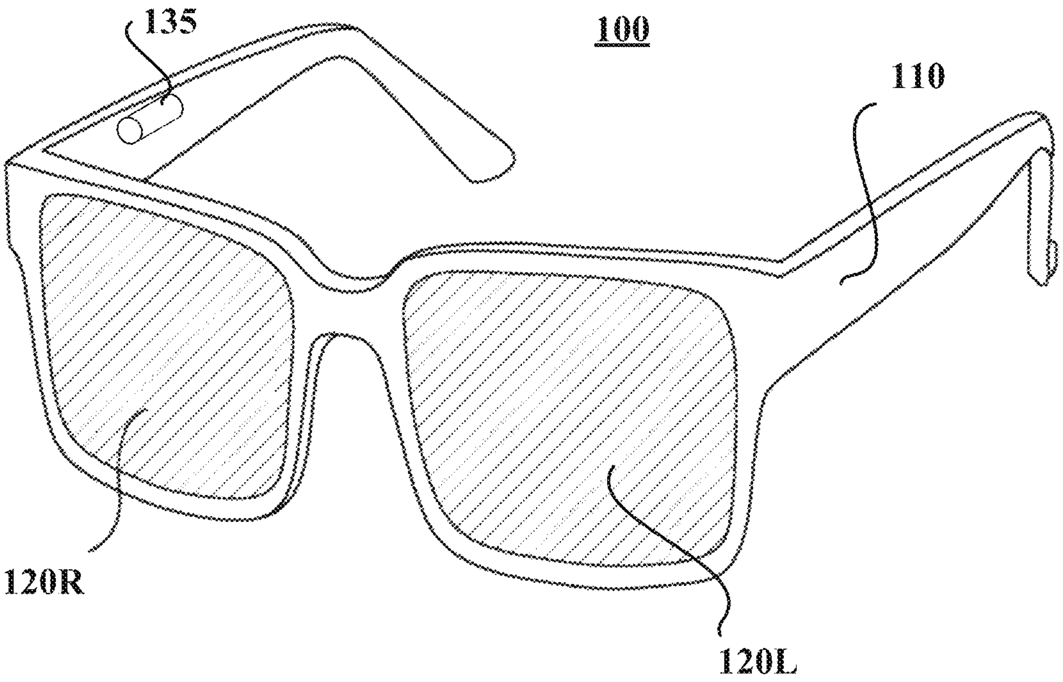
FIG. 1A illustrates a schematic diagram of a near-eye display ("NED"), according to an embodiment of the disclosure.

Embodiments consistent with the present disclosure will be described with reference to the accompanying drawings, which are merely examples for illustrative purposes and are not intended to limit the scope of the present disclosure. Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claims.

As used herein, the terms "couple," "coupled," "coupling," or the like may encompass an optical coupling, a mechanical coupling, an electrical coupling, an electromagnetic coupling, or a combination thereof. An "optical coupling" between two optical elements refers to a configuration in which the two optical elements are arranged in an optical series, and a light output from one optical element may be received directly or indirectly by the other optical element. An optical series refers optical positioning of a plurality of optical elements in a light path, such that a light output from one optical element may be transmitted, reflected, diffracted, converted, modified, or otherwise processed or manipulated by one or more of other optical elements. In some embodiments, the sequence in which the plurality of optical elements are arranged may not affect an overall output of the plurality of optical elements. A coupling may be a direct coupling or an indirect coupling (e.g., coupling through an intermediate element).

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

When the first element is shown or described as being disposed or arranged "on" the second element, term "on" is merely used to indicate an example relative orientation between the first element and the second element. The description may be based on a reference coordinate system shown in a figure, or may be based on a current view or example configuration shown in a figure. For example, when describing a view shown in a figure, the first element may be described as being disposed "on" the second element. It is understood that the term "on" does not necessarily imply that the first element is over the second element in the vertical, gravitational direction. For example, when the assembly of the first element and the second element is turned 180 degrees, the first element may be "under" the second element (or the second element may be "on" the first element). Thus, it is understood that when a figure shows that the first element is "on" the second element, the configuration is merely an illustrative example. The first element may be disposed or arranged at any suitable orientation relative to the second element (e.g., over or above the second element, below or under the second element, left to the second element, right to the second element, behind the second element, in front of the second element, etc.).

In the present disclosure, when a grating structure is described as being disposed (e.g., formed, deposited, coated, etched, recorded, or otherwise provided) "on" or "at least partially in" a structure, device, or material (e.g., a base structure), the terms "on" or the phrase "at least partially in" should be broadly construed to encompass various configurations, such as a configuration in which the grating structure is formed on a surface of the structure, device, or material, a configuration in which the grating structure is formed at least partially in or inside the structure, device, or material, a configuration in which the grating structure is recorded, coated, deposited, etched, or printed (or provided in any other suitable manner) on or in the structure, device, or material. In other words, the terms "on" or the phrase "at least partially in" may not strictly limit the positional relationship between the grating structure and the structure, device, or material. When a grating structure is referred to as being formed or provided "at" a structure, device, or material, the term "at" should be broadly construed to encompass various configurations in which the grating structure is formed or provided "at least partially in" or "on" the structure, device, or material, as well as other suitable configurations between the grating structure and the base structure, device, or material.

The wavelength ranges, spectra, or bands mentioned in the present disclosure are for illustrative purposes. The disclosed optical device, system, element, assembly, and method may be applied to a visible wavelength range, as well as other wavelength ranges, such as an ultraviolet ("UV") wavelength range, an infrared wavelength range, or a combination thereof.

The term "communicatively coupled" or "communicatively connected" indicates that related items are coupled or connected through a communication channel, such as a wired or wireless communication channel.

A linear polarizer selectively transmits a first linearly polarized light vibrating in any one direction and selectively blocks a second linearly polarized light vibrating in a direction perpendicular to the vibrating direction of the first linearly polarized light. A linear polarizer may be, for example, a reflective polarizer (e.g., dual brightness enhancement film, a lyotropic liquid crystal layer, a wire grid polarizer, a prism polarizer, etc.), or an absorptive polarizer (e.g., a dichroic polarizer). The linear polarizer may have a light transmission axis and a light absorption axis that is orthogonal to the light transmission axis in the plane direction. In some embodiment, the polarization efficiency of the linear polarizer may be smaller than 50%. In some embodiment, the polarization efficiency of the linear polarizer greater than about 50%, e.g., 60%, 70%, 80%, 90%, or 95%, etc.

The present disclosure provides a device, such as an optical device. The optical device may include a light source assembly configured to generate an image light representing a virtual image or a display image. The optical device may also include at least one waveguide configured to guide the image light to an eye-box of the optical device. The waveguide may be coupled with an in-coupling element and an out-coupling element. The combination of the waveguide, the in-coupling element, and the out-coupling element is configured to transmit a plurality of portions of the image light to the eye-box substantially simultaneously during a same time period (e.g., within a same image frame without division in subframes) or in a time-multiplexing manner (e.g., in sequential image frames or sub-frames). A portion of the image light may correspond to or represent a predetermined portion of a field of view ("FOV") of a single-color image, a predetermined portion of the FOV of a multi-color image (e.g., a full-color image), or a single-color image of a predetermined color. The term "full color" or "full-color" indicates a full, predetermined range of colors visible to human eyes. For example, a full color may include a range of colors that may be generated based on a plurality of primary colors. For example, in some embodiments, the plurality of primary colors may include red, green, and blue. In some embodiments, the plurality of primary colors may include one or more colors in addition to the red, green, and blue. A full-color image (or image light) may refer to an image (or an image light) that includes substantially the full range of colors that may be generated based on the primary colors.

At least one of the in-coupling element or the out-coupling element may include at least one passive diffractive optical element. The passive diffractive optical element may be polarization dependent or polarization selective. The passive diffractive optical element may selectively diffract an incident light having a predetermined polarization, and selectively transmit an incident light having a polarization different from the predetermined polarization (e.g., orthogonal to the predetermined polarization) with no or negligible diffraction. For example, the passive diffractive optical element may operate in a diffraction state to diffract an incident light having a predetermined polarization, and operate in a non-diffraction state to transmit an incident light having a polarization different from the predetermined polarization (e.g., orthogonal to the predetermined polarization) with no or negligible diffraction. The passive diffractive optical element may be indirectly switchable between a diffraction state and a non-diffraction state. The term "indirectly switchable" means that the passive diffractive optical element may not be directly switched between the diffraction state and the non-diffraction state through an external field, such as an external electric field applied across the passive diffractive optical element. The passive diffractive optical element may be indirectly switchable between the diffraction state and the non-diffraction state through an external polarization switch or polarization rotator coupled to the passive diffractive optical element. The polarization of the incident light may be changed or maintained via the external polarization rotator or polarization switch before the incident light is incident onto the passive diffractive optical element. Thus, the external polarization rotator or polarization switch may control the polarization of the incident light of the passive diffractive optical element, thereby indirectly switching the passive diffractive optical element between the diffraction state and the non-diffraction state.

In some embodiments, the passive diffractive optical element may be a microstructure (e.g., a structure having dimensions at micron or nano levels) grating, such as a surface relief grating ("SRG"). The SRG may include a plurality of microstructures (e.g., protrusions) defining a plurality of grooves. The grooves may be at least partially filled with a passive (or non-reorientable) optically anisotropic material. Molecule orientations of a passive (or non-reorientable) optically anisotropic material may not be reorientable through an external field, such as an electric field.

The optically anisotropic material may have a first effective refractive index along a groove direction of the grooves of the microstructure grating (e.g., the SRG) and a second effective refractive index along an in-plane direction perpendicular to the groove direction. The groove direction may be, for example, a groove length direction. The "in-plane" direction perpendicular to the groove length direction may be a direction along a bottom surface of the groove and perpendicular to the groove length direction. In some embodiments, the in-plane direction perpendicular to the groove length direction may be referred to as the in-plane direction of the periodicity of microstructures or grooves included in the microstructure grating. In some embodiments, the first effective refractive index may be equal to a first principal refractive index of the optically anisotropic material. In some embodiments, the first effective refractive index may be equal to a component of the first principal refractive index in the groove direction. In some embodiments, the second effective refractive index may be equal to a second principal refractive index of the optically anisotropic material. In some embodiments, the second effective refractive index may be equal to a component of the second principal refractive index in the in-plane direction perpendicular to the groove direction. In some embodiments, the first effective refractive index and the second effective refractive index may be equal to the first principal refractive index and the second principal refractive index of the optically anisotropic material, respectively. In some embodiments, one of the first effective refractive index and the second effective refractive index may be equal to one of the first principal refractive index and the second principal refractive index of the optically anisotropic material, and the other may not be equal to the first principal refractive index or the second principal refractive index of the optically anisotropic material.

In some embodiments, one of the first effective refractive index or the second effective refractive index may substantially match with a refractive index of the microstructure grating (e.g., the SRG), and the other one of the first effective refractive index or the second effective refractive index may not match with the refractive index of the microstructure grating (e.g., the SRG). The refractive index of the microstructure grating (e.g., the SRG) may be equal the refractive index of the microstructures. The optically anisotropic material may include passive liquid crystals ("LCs"). In some embodiments, the optically anisotropic material may include an optically anisotropic polymer that is polymerized from polymerizable pre-polymeric compositions or polymerizable liquid crystal ("LC") precursors. In some embodiments, the polymerizable LC precursors may include reactive mesogens ("RMs") that are polymerizable molecules with optical properties similar to those of LC materials. In some embodiments, the optical device may be a component of a near-eye display ("NED").

The optically anisotropic material may be a uniaxial anisotropic material, whose refractive index ellipsoid has an axial symmetry with regard to its optic axis, where $n^o_{AN}$ and $n^e_{AN}$ are principal refractive indices of the uniaxial anisotropic material. For example, reactive mesogens ("RMs") belong to the category of uniaxial anisotropic materials. In some embodiments, refractive index experienced by a light propagating in a polymerized RM layer may be variable in a range between the ordinary refractive index $n^o_{AN}$ and the extraordinary refractive index $n^e_{AN}$, depending on an angle $\alpha$ between the light polarization direction and optic axis of the optically anisotropic material. For example, the refractive index experienced by a light propagating in the polymerized RM layer may vary from $n^o_{AN}$ to $n^e_{AN}$ when the angle $\alpha$ changes from 90° to 0°.

In some embodiments, the passive diffractive optical element may be linear polarization selective. For example, the passive diffractive optical element may selectively diffract a linearly polarized light having a first polarization, and transmit a linearly polarized light having a second polarization with negligible or no diffraction. The first polarization and the second polarization may be orthogonal polarizations. Two polarizations are orthogonal when an inner product of two vectors representing the two polarizations is substantially zero. In some embodiments, the diffraction efficiency of the polarized light having the second polarization may be lower than or equal to a predetermined threshold, for example, about 10%, 5%, 1%, 0.5%, 0.1%, or 0.05%. In some embodiments, one of the first principal refractive index or the second principal refractive index may be the same as (or may match with) the refractive index of the microstructure grating (e.g., the SRG). Accordingly, the passive diffractive optical element may transmit the polarized light having the second polarization with negligible or no diffraction. In some embodiments, the passive diffractive optical element may be circular or elliptical polarization selective. For example, the passive diffractive optical element may selectively diffract a circularly or elliptically polarized light having a first handedness, and transmit a circularly or elliptically polarized light having a second handedness with negligible or no diffraction. The first handedness and the second handedness may be opposite to each other (e.g., left handedness and right handedness).

FIG. 1A illustrates a schematic diagram of a near-eye display ("NED") 100 according to an embodiment of the disclosure. The NED 100 may present media content to a user, such as one or more images, videos, audios, or a combination thereof. In some embodiments, an audio may be presented to the user via an external device (e.g., a speaker and/or a headphone), which may receive audio information from the NED 100 and/or a console (not shown), and present audio data based on the audio information. The NED 100 may operate as a VR device, an AR device, and/or an MR device, or a combination thereof. In some embodiments, when the NED 100 operates as an AR and/or MR device, a portion of the NED 100 may be at least partially transparent, and internal components of the NED 100 may be at least partially visible.

As shown in FIG. 1A, the NED 100 may include a frame 110, a right display system 120R, and a left display system 120L. In some embodiments, certain device(s) shown in FIG. 1A may be omitted. In some embodiments, additional devices or components not shown in FIG. 1A may also be included in the NED 100. The frame 110 may include a suitable type of mounting structure configured to mount the right display system 120R and the left display system 120L to a body part (e.g. a head) of the user (e.g., adjacent a user's eyes). The frame 110 may be coupled to one or more optical elements, which may be configured to display media to users. In some embodiments, the frame 110 may represent a frame of eye-wear glasses. The right display system 120R and the left display system 120L may be configured to enable the user to view content presented by the NED 100 and/or to view images of real-world objects (e.g., each of the right display system 120R and the left display system 120L may include a see-through optical element). In some embodiments, the right display system 120R and the left display system 120L may include any suitable display assembly (not shown) configured to generate a light (e.g., an image light corresponding to a virtual image) and to direct the image light to an eye of the user. In some embodiments, the NED 100 may include a projection system. For illustrative purposes, FIG. 1A shows the projection system may include a projector 135 coupled to the frame 110.

Figure 1B:
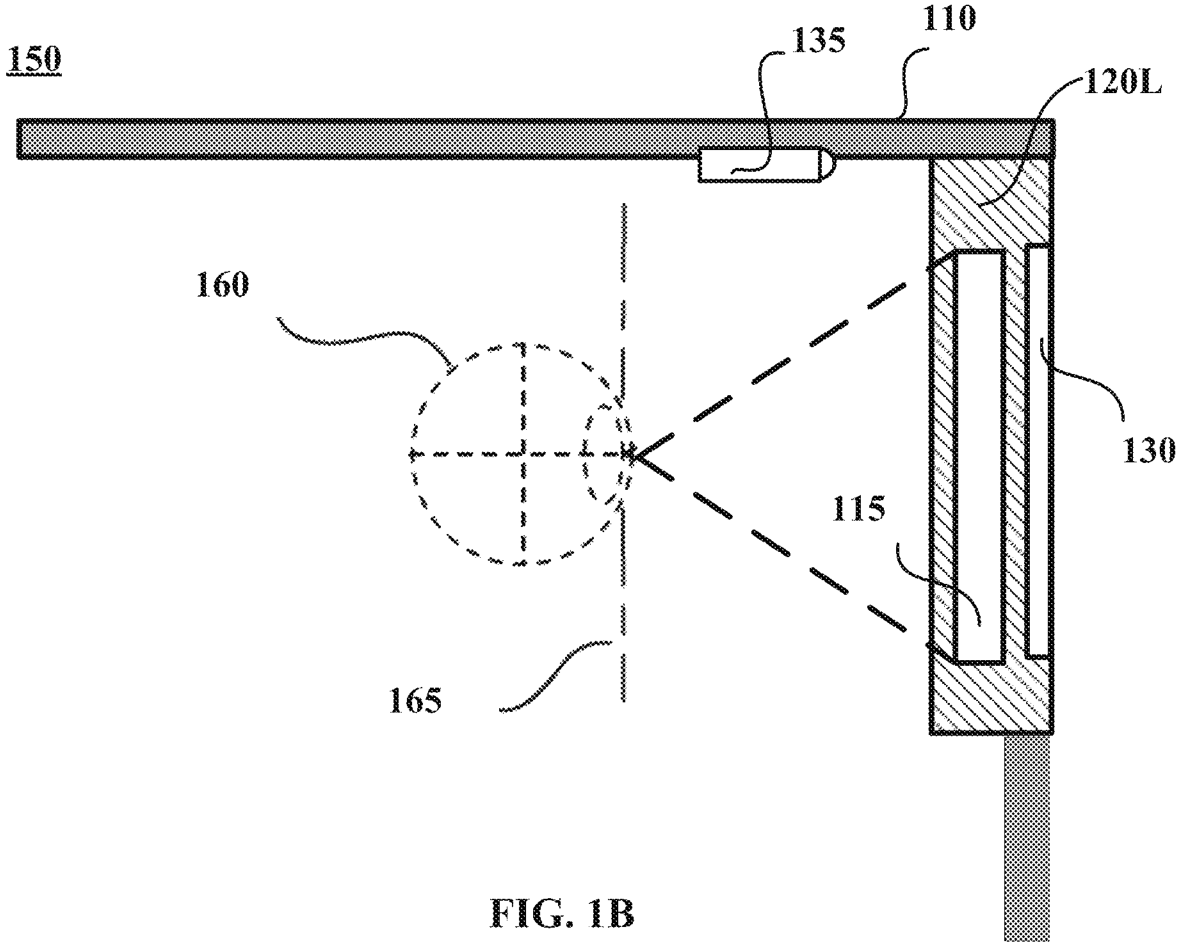
FIG. 1B illustrates a cross-sectional view of half of the NED shown in FIG. 1A, according to an embodiment of the disclosure.

FIG. 1B is a cross-section 150 of the NED 100 shown in FIG. 1A in accordance with an embodiment of the disclosure. For purposes of illustration, FIG. 1B shows the cross-sectional view 150 associated with the left display system 120L. As shown in FIG. 1B, the left display system 120L may include a waveguide display assembly 115 for an eye 160 of the user. The waveguide display assembly 115 may include a waveguide or a stack of waveguides. An exit pupil 125 may be a location where an eye 160 is positioned in an eye-box region when the user wears the NED 100. For purposes of illustration, FIG. 1B shows the cross section 150 associated with a single eye 160 and a single waveguide display assembly 115. In some embodiments, another waveguide display assembly that is separate from and similar to the waveguide display assembly 115 shown in FIG. 1B, may provide an image light to an eye-box located at an exit pupil of another eye of the user.

The waveguide display assembly 115 may include one or more materials (e.g., a plastic, a glass, etc.) with one or more refractive indices. The waveguide display assembly 115 may effectively minimize the weight and widen the field of view ("FOV") of the NED 100. In some embodiments, the waveguide display assembly 115 may be a component of the NED 100. In some embodiments, the waveguide display assembly 115 may be a component of some other NED, or other system that directs an image light to a particular location. As shown in FIG. 1B, the waveguide display assembly 115 may be provided for one eye 160 of the user. The waveguide display assembly 115 for one eye may be separated or partially separated from the waveguide display assembly 115 for the other eye. In certain embodiments, a single waveguide display assembly 115 may be used for both eyes 160 of the user.

In some embodiments, the NED 100 may include one or more optical elements disposed between the waveguide display assembly 115 and the eye 160. The optical elements may be configured to, e.g., correct aberrations in an image light emitted from the waveguide display assembly 115, magnify an image light emitted from the waveguide display assembly 115, or perform another type of optical adjustment of an image light emitted from the waveguide display assembly 115. Examples of the one or more optical elements may include an aperture, a Fresnel lens, a convex lens, a concave lens, a filter, any other suitable optical element that affects an image light, or a combination thereof. In some embodiments, the waveguide display assembly 115 may include a stack of waveguide displays. In some embodiments, the stacked waveguide displays may include a polychromatic display (e.g., a red-green-blue ("RGB") display) formed by stacking waveguide displays whose respective monochromatic light sources are configured to emit lights of different colors. For example, the stacked waveguide displays may include a polychromatic display that is configured to be projected on multiple planes (e.g., multi-focus colored display). In some embodiments, the stacked waveguide displays may include a monochromatic display configured to be projected on multiple planes (e.g., multi-focus monochromatic display). In some embodiments, the NED 100 may include an adaptive dimming element 130, which may dynamically adjust the transmittance of the real-world objects viewed through the NED 100, thereby switching the NED 100 between a VR device and an AR device or between a VR device and a MR device. In some embodiments, along with switching between the AR/MR device and the VR device, the adaptive dimming element 130 may be used in the AR and/MR device to mitigate difference in brightness of real and virtual objects.

Figure 2A:
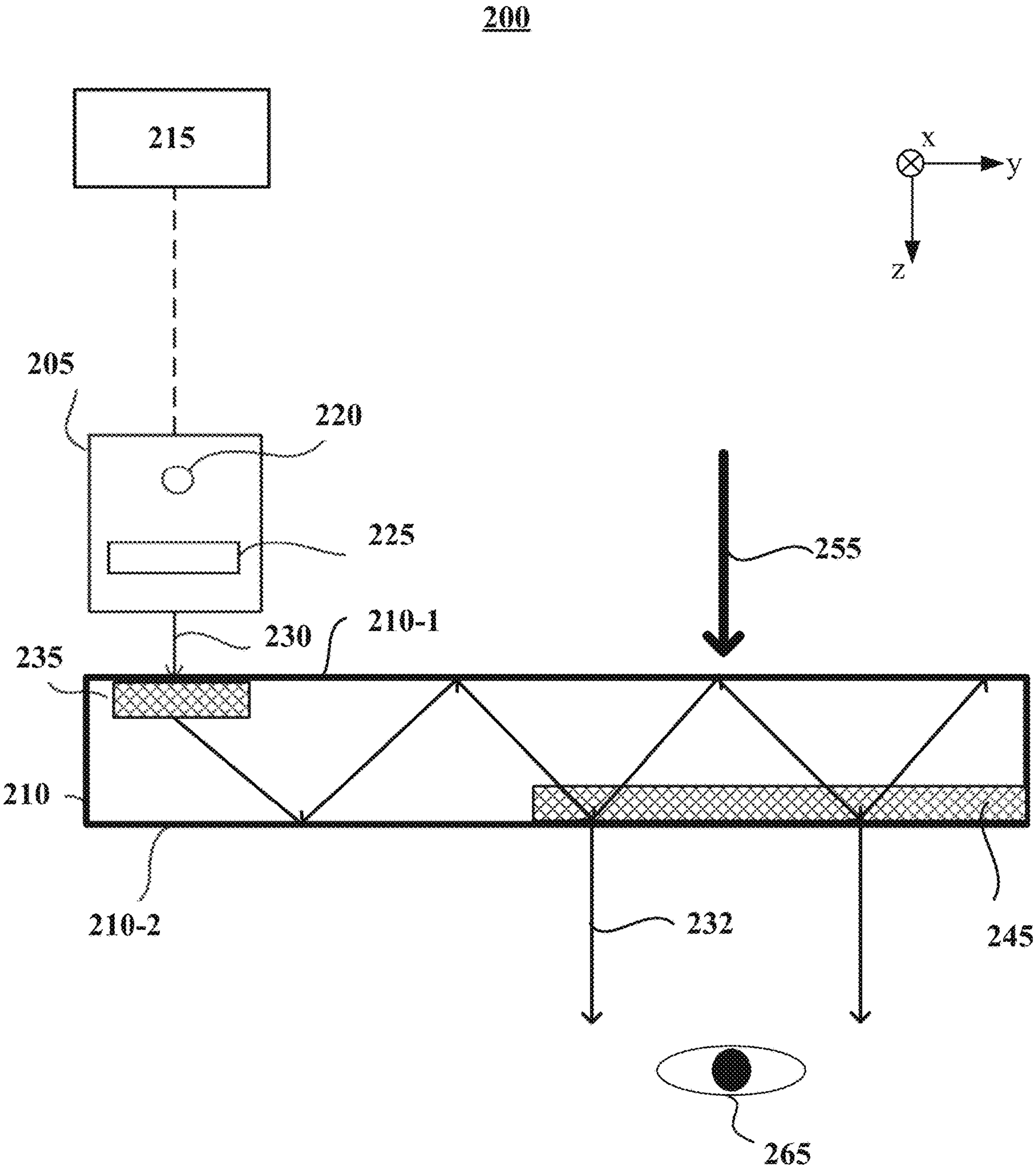
FIG. 2A illustrates a schematic diagram of a waveguide display assembly, according to an embodiment of the disclosure.

FIG. 2A illustrates a schematic diagram of a waveguide display assembly 200 according to an embodiment of the disclosure. The waveguide display assembly 200 may be implemented in NEDs for VR, AR, and/or MR applications. As shown in FIG. 2A, the waveguide display assembly 200 may include a light source assembly 205, a waveguide 210, and a controller 215. The light source assembly 205 may include a light source 220 and a light conditioning system 225. In some embodiments, the light source 220 may be a light source configured to generate a coherent or partially coherent light.

In some embodiments, the light source 220 may include, e.g., a laser diode, a vertical cavity surface emitting laser, a light emitting diode, or a combination thereof. In some embodiments, the light source 220 may be a display panel, such as a liquid crystal display ("LCD") panel, a liquid-crystal-on-silicon ("LCoS") display panel, an organic light-emitting diode ("OLED") display panel, a micro light-emitting diode ("micro-LED") display panel, a laser display panel, a micro-electro-mechanical system ("MEMS") display panel, a digital light processing ("DLP") display panel, or a combination thereof. In some embodiments, the light source 220 may be a self-emissive panel, such as an OLED display panel or a micro-LED display panel. In some embodiments, the light source 220 may be a display panel that is illuminated by an external source, such as an LCD panel, an LCoS display panel, or a DLP display panel. Examples of an external source may include a laser, an LED, an OLED, or a combination thereof. The light conditioning system 225 may include one or more optical components configured to condition the light from the light source 220. For example, the controller 215 may control the light conditioning system 225 to condition the light from the light source 220, which may include, e.g., transmitting, attenuating, expanding, collimating, and/or adjusting orientation of the light.

The light source assembly 205 may generate an image light 230 and output the image light 230 to an in-coupling element 235 coupled with a first portion of the waveguide 210. The waveguide 210 may expand and direct the image light 230 to an eye 265 of a user. The waveguide 210 may receive the image light 230 at one or more in-coupling elements 235 coupled with the first portion of the waveguide 210, and guide the received image light 230 (e.g., through total internal reflection (or "TIR")) to an out-coupling element 245 coupled with a second portion of the waveguide 210. The first portion and the second portion may be coupled with different portions of the waveguide 210. The out-coupling element 245 may be configured to couple the image light 230 out of the waveguide 210 toward the eye 265. In some embodiments, the in-coupling element 235 may couple the image light 230 from the light source assembly 205 into a TIR path inside the waveguide 210. The waveguide 210 may include a first surface or side 210-1 facing the real-world environment and an opposing second surface or side 210-2 facing the eye 265. In some embodiments, as shown in FIG. 2A, the in-coupling element 235 may be disposed at the first surface 210-1 of the waveguide 210. In some embodiments, the in-coupling element 235 may be integrally formed as a part of the waveguide 210 at the first surface 210-1. In some embodiments, the in-coupling element 235 may be separately formed, and may be disposed at (e.g., affixed to) the first surface 210-1 of the waveguide 210. In some embodiments, the in-coupling element 235 may be disposed at the second surface 210-2 of the waveguide 210. In some embodiments, the in-coupling element 235 may be integrally formed as a part of the waveguide 210 at the second surface 210-2. In some embodiments, the in-coupling element 235 may be separately formed and disposed at (e.g., affixed to) the second surface 210-2 of the waveguide 210. In some embodiments, the in-coupling element 235 may include a surface relief grating, a volume hologram, a polarization grating, a polarization volume hologram, a metasurface grating, another type of diffractive element, or a combination thereof. In some embodiments, the in-coupling element 235 may include a diffraction grating. A pitch of the diffraction grating may be configured to enable total internal reflection ("TIR") of the image light 230 within the waveguide 210. As a result, the image light 230 may propagate internally within the waveguide 210 through TIR. The in-coupling element 235 may also be referred to as an in-coupling grating 235.

The out-coupling element 245 may be disposed at the first surface 210-1 or the second surface 210-2 of the waveguide 210. For example, as shown in FIG. 2A, the out-coupling element 245 may be disposed at the second surface 210-2 of the waveguide 210. In some embodiments, the out-coupling element 245 may be integrally formed as a part of the waveguide 210, for example, at the second surface 210-2. In some embodiments, the out-coupling element 245 may be separately formed and dispose at (e.g., affixed to) the second surface 210-2 of the waveguide 210. In some embodiments, the out-coupling element 245 may be disposed at the first surface 210-1 of the waveguide 210. For example, in some embodiments, the out-coupling element 245 may be integrally formed as a part of the waveguide 210 at the first surface 210-1. In some embodiments, the out-coupling element 245 may be separately formed and disposed at (e.g., affixed to) the first surface 210-1 of the waveguide 210. In some embodiments, the out-coupling element 245 may include a surface relief grating, a volume hologram, a polarization grating, a polarization volume hologram, a metasurface grating, another type of diffractive element, or a combination thereof. In some embodiments, the out-coupling element 245 may include a diffraction grating. A pitch of the diffraction grating may be configured to cause the incident image light 230 to exit the waveguide 210, i.e., redirecting the image light 230 so that the TIR no longer occurs. In other words, the diffraction grating of the out-coupling element 245 may couple the image light 230 propagating inside the waveguide 210 through TIR out of the waveguide 210 via diffraction as an output light 232. In some embodiments, the out-coupling element 245 may also be referred to as an out-coupling grating 245. The out-coupling element 245 may progressively extract the image light 230 propagating inside the waveguide 210 through TIR out of the waveguide 210 at different positions of the out-coupling element 245 when the TIR propagating light is incident onto the different positions of the out-coupling element 245. Thus, the out-coupling element 245 may replicate the virtual image to expand an effective pupil of the waveguide display assembly 200. In some embodiments, the waveguide 210 may receive a light 255 from a real-world environment, and may combine the light 255 with the output light 232 (which may be an image light), and deliver the combined light to the eye 265.

The waveguide 210 may include one or more materials configured to facilitate the total internal reflection of the image light 230. The waveguide 210 may include, for example, a plastic, a glass, and/or polymers. The waveguide 210 may have a relatively small form factor. For example, the waveguide 210 may be approximately 50 mm wide along the x-dimension, 30 mm long along the y-dimension, and 0.5-1 mm thick along the z-dimension.

The controller 215 may be communicatively coupled with the light source assembly 205, and may control the operation scheme of the light source assembly 205. In some embodiments, the waveguide 210 may output the expanded image light 232 to the eye 265 with an increased or expanded field of view ("FOV"). For example, the expanded image light 232 may be provided to the eye 265 with a diagonal FOV (in x and y) of equal to or greater than 60 degrees and equal to or less than 150 degrees. The waveguide 210 may be configured to provide an eye-box with a width of equal to or greater than 8 mm and equal to or less than 50 mm, and/or a height of equal to or greater than 6 mm and equal to or less than 20 mm. With the waveguide display assembly 200, the physical display and electronics may be moved to a side of a front body of an NED, and a substantially fully unobstructed view of the real world environment may be achieved, which enhances the AR user experience.

Figure 2B:
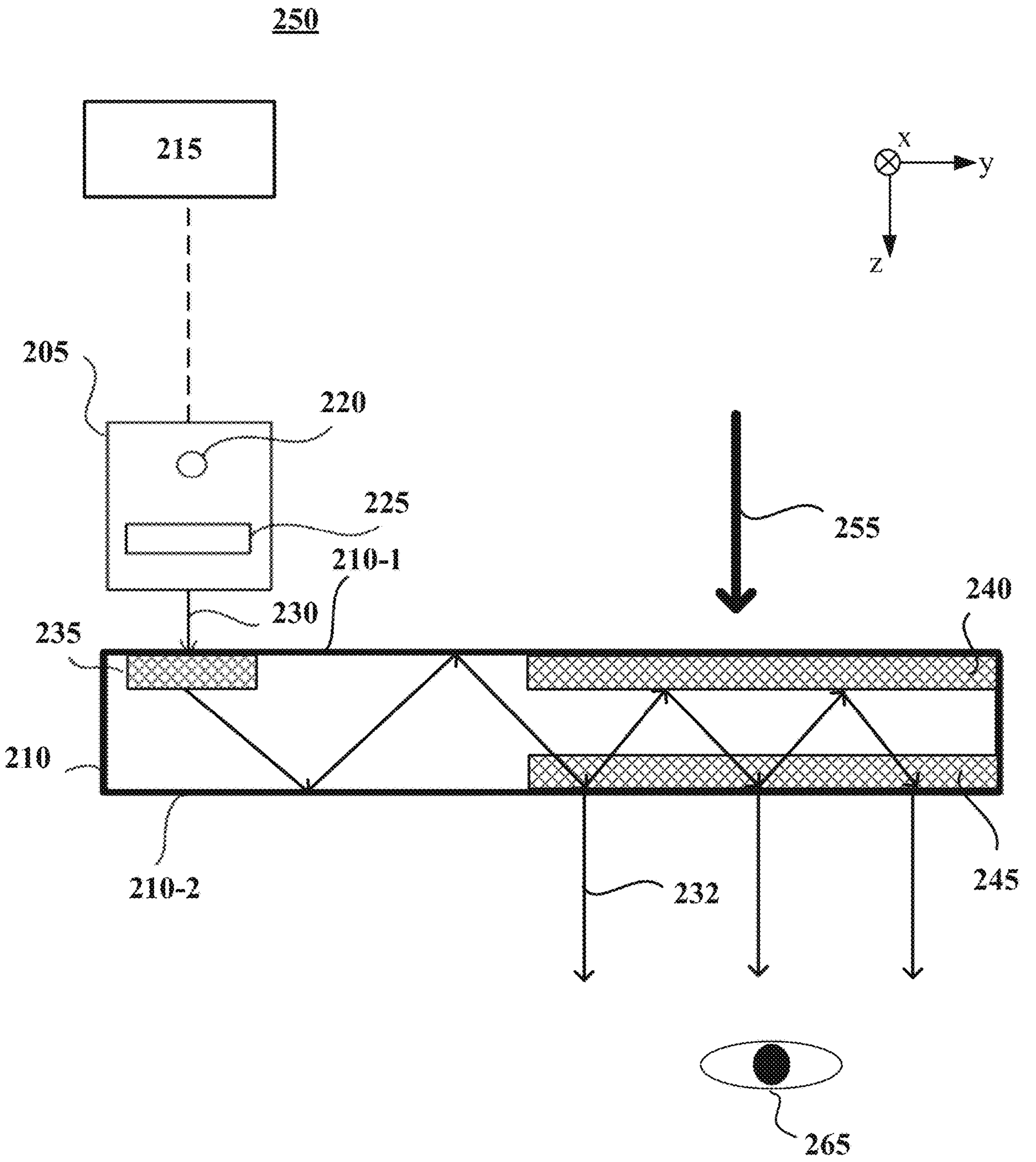
FIG. 2B illustrates a schematic diagram of a waveguide display assembly, according to another embodiment of the disclosure.

In some embodiments, the waveguide 210 may include additional gratings configured to redirect, fold, and/or expand the pupil of the light source assembly 205. For example, as shown in FIG. 2B, in a waveguide display assembly 250, a directing element 240 may be coupled with the waveguide 210. The directing element 240 may be configured to redirect the received input image light 230 to the out-coupling element 245, such that the received input image light 230 is coupled out of the waveguide 210 via the out-coupling element 245 as the output image light 232. In some embodiments, the directing element 240 and the out-coupling element 245 may be disposed at different sides of the waveguide 210. In some embodiments, the directing element 240 may be disposed at the first surface 210-1 of the waveguide 210. For example, in some embodiments, the directing element 240 may be integrally formed as a part of the waveguide 210 at the first surface 210-1. In some embodiments, the directing element 240 may be separately formed and disposed at (e.g., affixed to) the first surface 210-1 of the waveguide 210. In some embodiments, the out-coupling element 245 may be disposed at the second surface 210-2 of the waveguide 210. For example, in some embodiments, the directing element 240 may be integrally formed as a part of the waveguide 210 at the second surface 210-2. In some embodiments, the directing element 240 may be separately formed and disposed at (e.g., affixed to) the second surface 210-2 of the waveguide 210.

In some embodiments, the directing element 240 and the out-coupling element 245 may have a similar structure. In some embodiments, the directing element 240 may include a surface relief grating, a volume hologram, a polarization grating, a polarization volume hologram, a metasurface grating, another type of diffractive element, or a combination thereof. In some embodiments, the directing element 240 may include a diffraction grating. The directing element 240 may also be referred to as a folding grating 240 or a directing grating 240. In some embodiments, multiple functions, e.g., redirecting, folding, and/or expanding the pupil of the light generated by the light source assembly 205 may be combined into a single grating, e.g. an out-coupling grating.

Referring to FIGS. 2A and 2B, in the waveguide display assembly 200 or 250, a suitable combination of the in-coupling grating 235, the out-coupling grating 245, and/or the directing grating 240 may be configured to sequentially transmit a plurality of portions of the image light provided by the light source assembly 205 in a time-multiplexing manner. At least one of the in-coupling grating 235, the out-coupling grating 245, or the directing grating 240 may include at least one passive diffractive optical element in accordance with an embodiment of the present disclosure. In some embodiments, at least one of the in-coupling grating 235, the out-coupling grating 245, or the directing grating 240 may include one or more sub-gratings. At least one (e.g., each) of the sub-gratings may be an embodiment of the disclosed passive diffractive optical element.

In some embodiments, the passive diffractive optical element may be polarization selective. For example, the passive diffractive optical element may selectively diffract a light having a first polarization, and transmit a light having a second polarization with negligible or no diffraction. In some embodiments, the first polarization and the second polarization may be linear orthogonal polarizations. In some embodiments, the first polarization and the second polarization may be circular polarizations with opposite handedness. In some embodiments, the first polarization and the second polarization may be elliptical polarizations with opposite handedness. The passive diffractive optical element may be a passive element. The passive diffractive optical element may be indirectly switchable between a diffraction state (or an On-state) and a non-diffraction state (or an Off-state) via changing a polarization of an incident light through an external polarization switch. In other words, when a polarization of a light incident onto the passive diffractive optical element is changed by the external polarization switch, the passive diffractive optical element may switch between operating in a diffraction state or operating in a non-diffraction state, depending on the polarization of the incident light.

Referring to FIGS. 2A and 2B, in some embodiments, the waveguide display assembly 200 or 250 may include a plurality of waveguides 210 disposed in a stacked configuration (not shown in FIGS. 2A and 2B). At least one (e.g., each) of the waveguides 210 may be configured to process a portion of the FOV and/or a portion of the color spectrum of a virtual image. Although not shown in FIGS. 2A and 2B, in some embodiments, the waveguide display assembly 200 or 250 may include a plurality of light source assemblies 205 and/or a plurality of waveguides 210. At least one (e.g., each) of the light source assemblies 205 may emit a monochromatic image light of a specific wavelength band corresponding to a primary color (e.g., red, green, or blue). The waveguides 210 may be disposed in a stacked configuration and may be configured to output an expanded multi-color image light 232 (e.g., a full-color image light). At least one of the one or more waveguides 210 may be a waveguide. In some embodiments, at least one (e.g., each) of the light source assemblies 205 may emit multi-color image lights (e.g., full-color image lights) corresponding to different portions of the FOV provided by the waveguide display assembly 200 or 250. Although one light source 220 is shown in FIG. 2A, in some embodiments, the light source assembly 205 may include two or more light sources 220. At least one (e.g., each) of the light sources 220 may emit image lights of multiple colors (e.g., full colors). The multi-color image lights (e.g., full-color image lights) emitted by different light sources 220 may correspond to different portions of the FOV provided by the waveguide display assembly 200 or 250. For example, the light source assembly 205 may include three light sources 220 configured to emit multi-color image lights (e.g., full-color image lights) corresponding to a left portion, a center portion, and a right portion of the FOV, respectively.

Figure 3A:
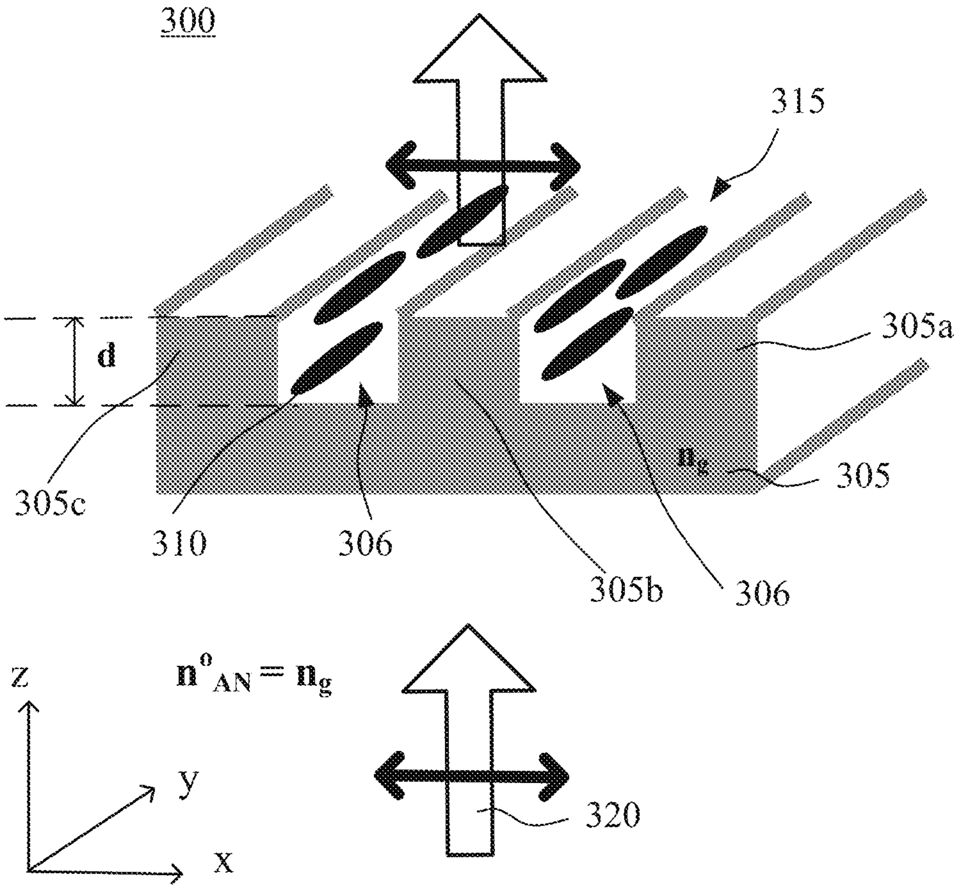
FIG. 3A illustrates a schematic diagram of a passive grating in a non-diffraction state, according to an embodiment of the disclosure.
Figure 3B:
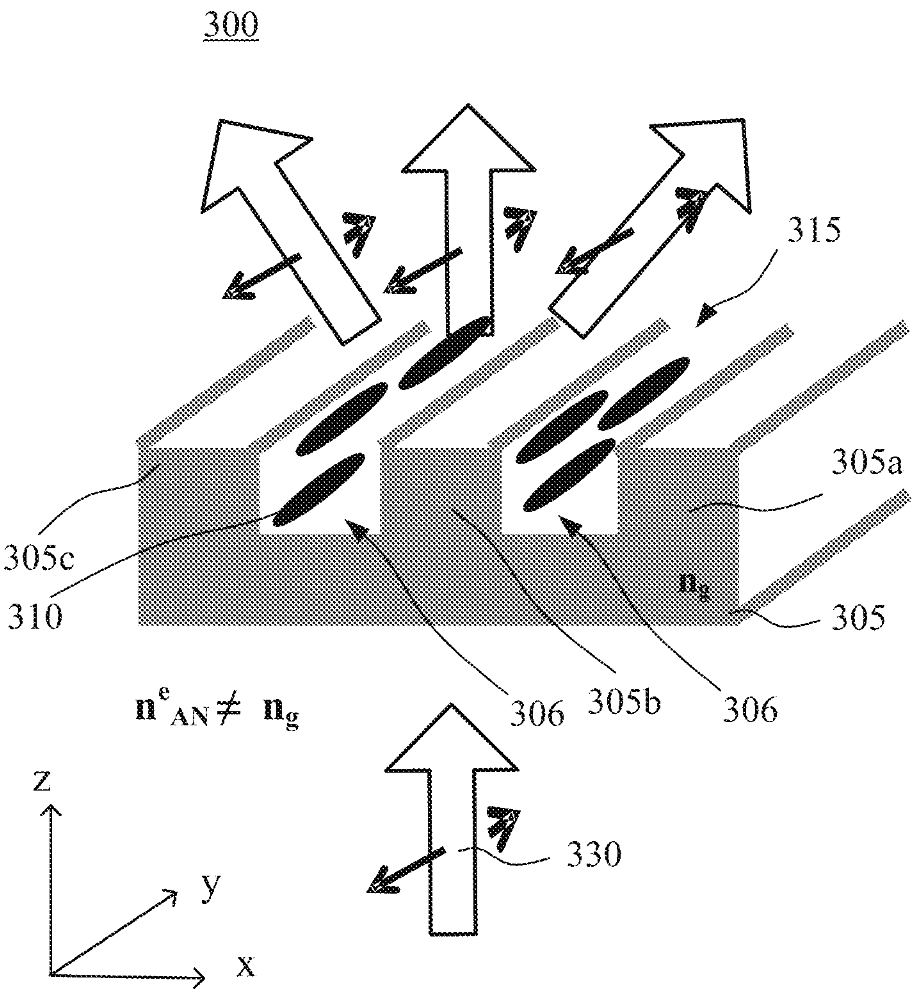
FIG. 3B illustrates a schematic diagram of the passive grating shown in FIG. 3A in a diffraction state, according to an embodiment of the disclosure.

For discussion purposes, a passive diffraction grating is used as an example of the disclosed passive diffractive optical element to explain the polarization selectivity. FIGS. 3A and 3B illustrate schematic diagrams of a passive grating 300 in a non-diffraction state and a diffraction state, respectively, according to an embodiment of the disclosure. As shown in FIGS. 3A and 3B, the passive grating 300 may include a surface relief grating ("SRG") 305. The SRG 305 may include a plurality of microstructures **305*a*, 305*b*, and 305*c* (e.g., micron- or nano-level protrusions) defining a plurality of grooves 306. The grooves 306 may be at least partially filled with an optically anisotropic material 315. In some embodiments, the microstructures 305*a*, 305*b*, and 305*c* may have the same shape and size. Accordingly, the plurality of grooves 306 may have the same shape and size. In some embodiments, the microstructures 305*a*, 305*b*, and 305*c* may have different shapes and sizes. Accordingly, the plurality of grooves 306 may have different shapes and sizes. Three microstructures 305*a*, 305*b*, and 305*c* are shown for illustrative purposes. The SRG 305** may include any suitable number of microstructures.

In some embodiments, the SRG 305 may be a binary non-slanted grating. Each of the microstructures **305*a*, 305*b*, and 305*c* may include vertical walls defining the grooves 306. That is, each groove 306 may include two vertical walls and a bottom surface, with the walls being perpendicular to the bottom surface. Molecules 310 of the optically anisotropic material 315 may be homogeneously aligned within the grooves 306 in a groove direction (e.g., a longitudinal direction of the groove), for example, in the y-direction in FIGS. 3A and 3B. The optically anisotropic material 315 may be uniaxial and may have a first principal refractive index (e.g., $n^e_{AN}$) in the groove direction (e.g., y-direction) of the SRG 305 and a second principal refractive index (e.g., $n^o_{AN}$) along an in-plane direction perpendicular to the groove direction of the SRG 305 (e.g., x-direction, i.e., the direction along the bottom surface of the groove, or the in-plane direction of periodicity of the microstructures). The second principal refractive index (e.g., $n^o_{AN}$) may substantially match with a refractive index $n_g$ of the SRG 305, and the first principal refractive index (e.g., $n^e_{AN}$) may not match with the refractive index $n_g$ of the SRG 305**.

In some embodiments, the SRG 305 may be fabricated based on an organic material that is optically isotropic, such as an amorphous polymer. In some embodiments, the SRG 305 may be fabricated based on an organic material that is optically anisotropic, such as a liquid crystalline polymer. In some embodiments, the SRG 305 may be fabricated based on an inorganic material, such as metals or oxides used for manufacturing of metasurfaces. The materials of the SRG 305 may be isotropic or anisotropic. In some embodiments, the SRG 305 may be nano-fabricated from a resist material that may be substantially transparent to a range of electromagnetic frequencies, such as the visible wavelength band. The resist material may be a form of thermoplastic, polymer, optically transparent photoresist, or a combination thereof. After being set or cured, the parallel grooves 306 may provide an alignment for the optically anisotropic material 315 disposed in the grooves 306 of the SRG 305. That is, the SRG 305 may function as an alignment layer for the optically anisotropic material 315. In some embodiments, the SRG 305 may be nano-fabricated to have various alignment patterns and features (e.g., a sub 10 nm thickness). The process may allow for the creation of an alignment pattern for the optically anisotropic material 315 with high customizability. For example, the molecules 310 of the optically anisotropic material 315 may be homeotropically or homogeneously aligned within the grooves 306 of the SRG 305. In some embodiments, the molecules 310 of the optically anisotropic material 315 may be aligned in a hybrid manner, for example, some molecules 310 may be homeotropically aligned and some molecules 310 may be homogeneously aligned within the grooves 306 of the SRG 305. In some embodiments, the molecules 310 of the optically anisotropic material 315 may be aligned (e.g., homeotropically, homogeneously, or in a hybrid manner) within the grooves 306 of the SRG 305 by a suitable aligning method, such as a stretch, a light (e.g., photoalignment), an electric field, a magnetic field, or a combination thereof.

In some embodiments, the optically anisotropic material 315 may include passive materials that are not directly switchable by an external field (e.g., an electric field). The passive materials may include passive or non-reorientable LCs, such as an optically anisotropic polymer that is polymerized from polymerizable pre-polymeric compositions or polymerizable LC precursors. In some embodiments, the polymerizable LC precursors may include RMs that are polymerizable molecules with optical properties similar to those of LC materials. In some embodiments, the optically anisotropic material 314 may include elongated molecules.

In some embodiments, the passive grating 300 may include two substrates (not shown in FIG. 3A) that may be disposed opposite to one another to form a container for the SRG 305 and the optically anisotropic material 315. In some embodiments, the alignment of the optically anisotropic material 315 may be provided by one or more alignment structures (e.g., alignment layers) other than by the SRG 305. An alignment structure may be disposed at the substrates (e.g., two alignment layers may be disposed at the respective opposing surfaces of the two substrates). In some embodiments, the alignment structure disposed at each of the two substates may be configured to provide a planar alignment (e.g., an alignment with a zero or small pretilt angle). The alignment structures disposed at the two substates may be configured to provide parallel surface alignments. In some embodiments, the alignment structures disposed at the two substates may be configured to provide hybrid surface alignments. For example, the alignment structure disposed at one of the two substates may be configured to provide a planar alignment, and the alignment structure disposed at the other one of the two substates may be configured to provide a homeotropic alignment.

In some embodiments, the plurality of grooves 306 may include a same shape with a same depth d. In some embodiments, the thickness (or height) of the optically anisotropic material 315 may be the same as the depth d of the grooves 306 of the SRG 305 (e.g., the optically anisotropic material 315 may be filled to the same level or height as a top surface of the grooves 306). In some embodiments, the thickness of the optically anisotropic material 315 may be different from the depth d of the grooves 306 of the SRG 305. For example, in some embodiments, the optically anisotropic material 315 may be filled to be over (or higher than) the top surface of the grooves 306 (e.g., the thickness of the optically anisotropic material 315 may be greater than the depth d of the grooves 306). The portion of the optically anisotropic material 315 disposed over the top surface (e.g., higher than the depth d) of the grooves 306 of the SRG 305 may be uniform and may not contribute to the diffraction. In some embodiments, the optically anisotropic material 315 may be filled to be below the top surface of the grooves 306 (e.g., the thickness of the optically anisotropic material 315 may be smaller than the depth d of the grooves 306). In some embodiments, the substrates may be removed after the grating 300 is fabricated.

The passive grating 300 may be polarization selective, and hence, may be indirectly switchable between a diffraction state and a non-diffraction state. For example, the passive grating 300 may be configured to selectively diffract a light with a predetermined polarization and transmit a light with a different polarization (e.g., a polarization orthogonal to the predetermined polarization) with negligible diffraction or no diffraction. As shown in FIG. 3A, for an incident light 320 polarized in the in-plane direction (e.g., x-direction) perpendicular to the groove direction (e.g., y-direction) of the grooves 306 of the SRG 305, due to the substantial refractive index match between $n^{o}_{AN}$ and $n_g$, the passive grating 300 may function as a substantially optically uniform plate for the incident light 320 with negligible or no diffraction. That is, the passive grating 300 may operate in a non-diffraction state for the incident light 320 polarized in the in-plane direction (e.g., x-direction) perpendicular to the groove direction (e.g., y-direction) of the grooves 306 of the SRG 305. In some embodiments, the second principal refractive index (e.g., $n^{o}_{AN}$) may match with (or be the same as) the refractive index $n_g$ of the SRG 305. Accordingly, the incident light 320 may be transmitted through with negligible or no diffraction. That is, the diffraction effect of the grating 300 may be substantially zero.

As shown in FIG. 3B, for an incident light 330 polarized in the groove direction (e.g., y-direction) of the SRG 305, due to the refractive index difference between $n^{e}_{AN}$ and $n_g$, the light 330 may experience a periodic modulation of the refractive index in the grating 300 and may be diffracted. That is, the passive grating 300 may operate in a diffraction state for the incident light 330 polarized in the groove direction (e.g., y-direction) of the SRG 305. The diffraction efficiency of the light 330 may depend on the modulation of refractive index nm (i.e., the difference between the $n^{e}_{AN}$ and $n_g$) provided by the passive grating 300.

In some embodiments, the SRG 305 shown in FIGS. 3A and 3B may be filled with an active optically anisotropic material (e.g., an active LC) that may be reorientable when subjected to an external field, such as an electric field. The SRG filled with the active optically anisotropic material may become an active grating. The active grating may be either directly switchable between the diffraction state and the non-diffraction state, or indirectly switchable between the diffraction state and the non-diffraction state, similar to the passive grating 300 described above. That is, the active grating may function as an indirectly switchable grating.

Figure 4A:
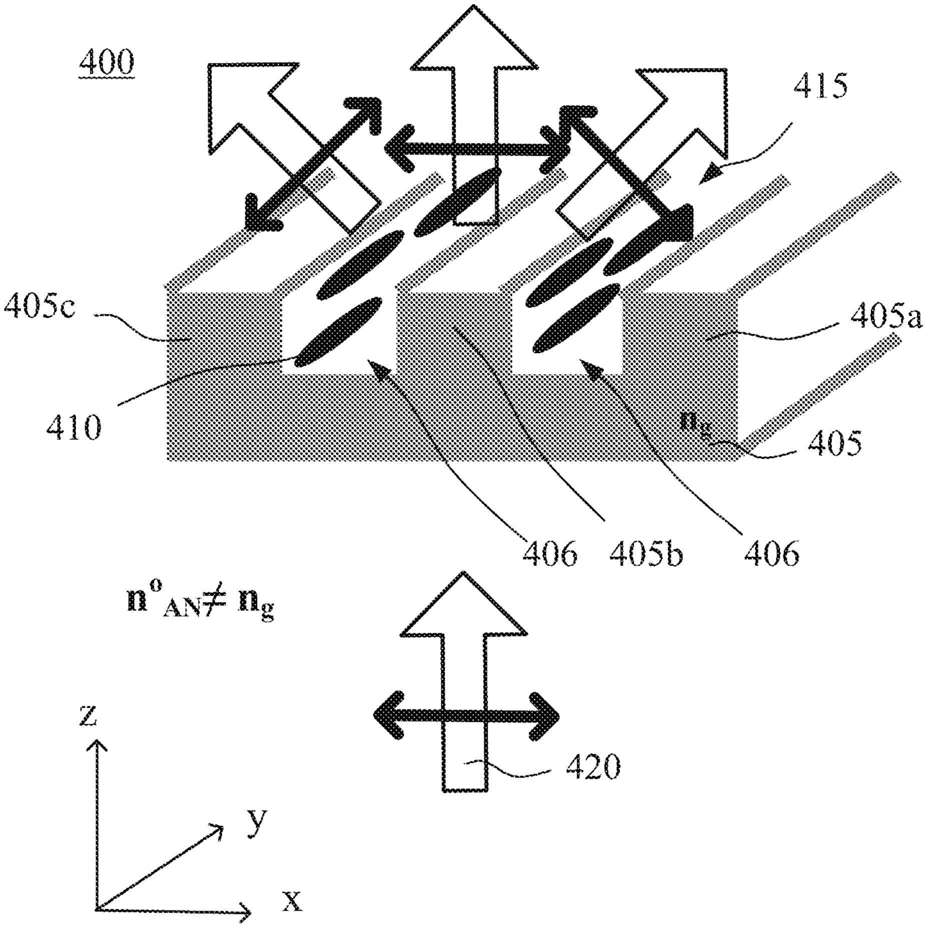
FIG. 4A illustrates a schematic diagram of a passive grating in a diffraction state, according to another embodiment of the disclosure.
Figure 4B:
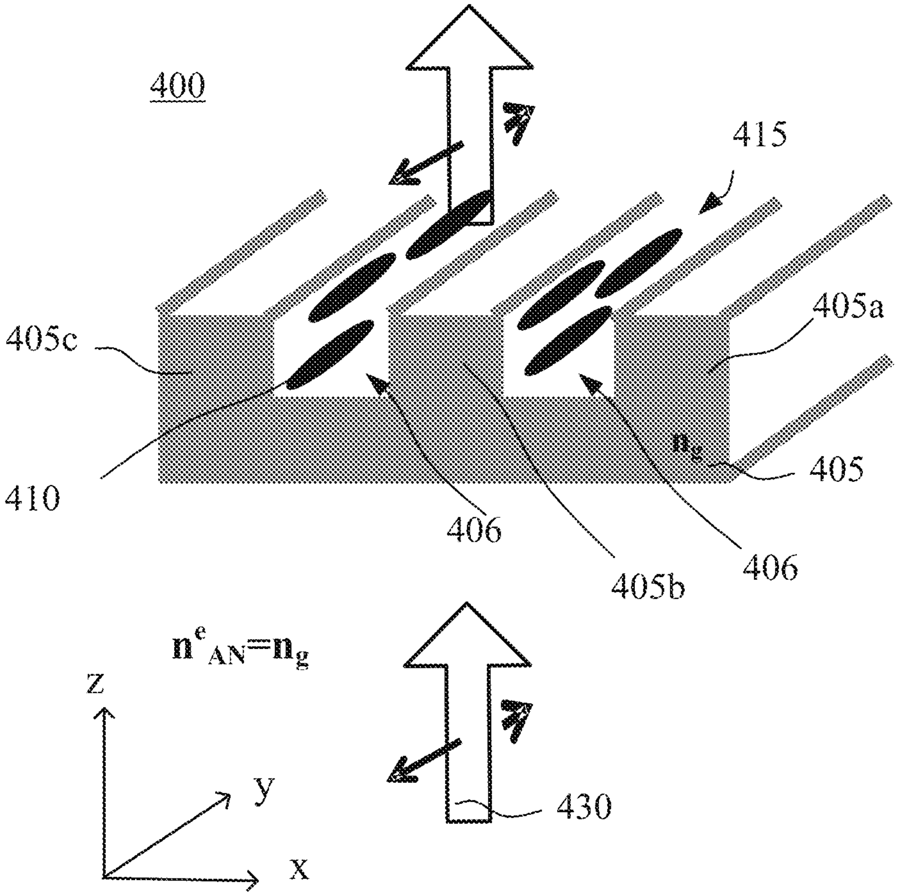
FIG. 4B illustrates a schematic diagram of the passive grating shown in FIG. 4A in a non-diffraction state, according to another embodiment of the disclosure.

FIGS. 4A and 4B illustrate a schematic diagram of a passive grating 400 in a diffraction state and a non-diffraction state, respectively. The passive grating 400 shown in FIGS. 4A and 4B may include elements or structures that are the same as or similar to those included in the passive grating 300 shown in FIGS. 3A and 3B. Descriptions of the same or similar elements can refer to the above descriptions in connection with FIGS. 3A and 3B. As shown in FIGS. 4A and 4B, the passive grating 400 may include an SRG 405. The SRG 405 may include a plurality of microstructures 405*a*, 405*b*, and 405*c* similar to the microstructures 305*a*, 305*b*, and 305*c* described above. The microstructures 405*a*, 405*b*, and 405*c* may define a plurality of grooves 406, which may be similar to the grooves 306 described above. Molecules 410 of an optically anisotropic material 415 may be homogeneously aligned within the grooves 406 in the groove direction, for example, in the y-direction as shown in FIGS. 4A and 4B. The optically anisotropic material 415 may have a first principal refractive index (e.g., $n^o_{AN}$) in the groove direction (e.g., y-direction) of the grooves 406 of the SRG 405 and a second principal refractive index (e.g., $n^o_{AN}$) along an in-plane direction perpendicular to the groove length direction (e.g., x-direction, i.e., the direction along the bottom surface of the groove, or the in-plane direction of periodicity of the microstructures) of the SRG 405. The second principal refractive index (e.g., $n^o_{AN}$) may not match with a refractive index $n_g$ of the SRG 405, and the first principal refractive index (e.g., $n^E_{AN}$) may substantially match with the refractive index $n_g$ of the SRG 405.

The passive grating 400 may be polarization selective, and hence, may be indirectly switchable between a diffraction state and a non-diffraction state. As shown in FIG. 4A, for an incident light 420 polarized in the in-plane direction (e.g., x-direction) perpendicular to the groove direction of the grooves 406 of the SRG 405, due to the refractive index difference between $n^o_{AN}$ and $n_g$, the light 420 may experience a periodic modulation of the refractive index in the passive grating 400 and, thus, may be diffracted. That is, the passive grating 400 may operate in a diffraction state for the incident light 430 polarized in the in-plane direction (e.g., x-direction) perpendicular to the groove direction of the SRG 405. The diffraction efficiency of the passive grating 400 may depend on the modulation of refractive index nm (i.e., the difference between the $n^o_{AN}$ and $n_g$) provided by the passive grating 400.

As shown in FIG. 4B, for an incident light 430 polarized in the groove direction (e.g., y-direction) of the SRG 405, due to the substantial refractive index match between $n^e_{AN}$ and $n_g$, the passive grating 400 may function as a substantially optically uniform plate for the incident light 430 with negligible or no diffraction. That is, the passive grating 400 may operate in a non-diffraction state for the incident light 430 polarized in the groove direction (e.g., y-direction) of the SRG 405. In some embodiments, the first principal refractive index (e.g., $n^o_{AN}$) may match with (or may be the same as) the refractive index $n_g$ of the SRG 405 and, thus, the incident light 430 may be transmitted through with negligible or no diffraction. That is, the diffraction effect of the grating 400 may be substantially zero.

In some embodiments, the SRG 405 shown in FIGS. 4A and 4B may be filled with an active optically anisotropic material (e.g., an active LC) that may be re-oriented when subjected to an external field, such as an electric field. The SRG filled with the active optically anisotropic material may become an active grating. The active grating may be either directly switchable between the diffraction state and the non-diffraction state, or indirectly switchable between the diffraction state and the non-diffraction state, similar to the passive grating 400 described above. That is, the active grating may function as an indirectly switchable grating.

Figure 5B:
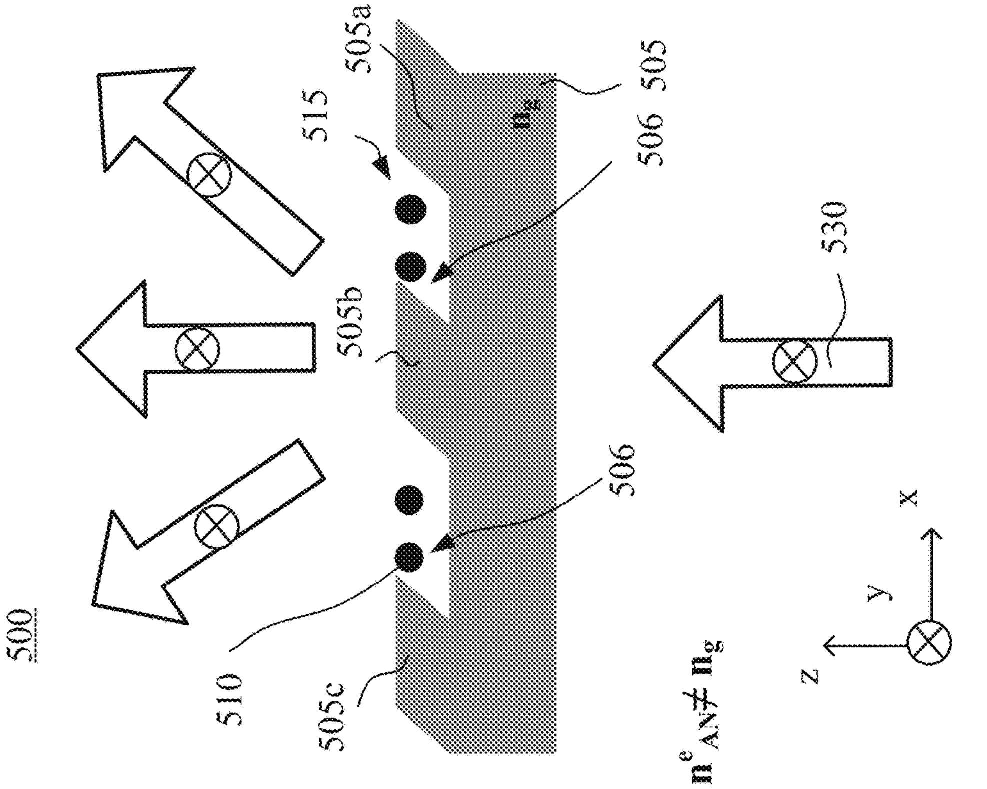
FIG. 5B illustrates a schematic diagram of the passive grating shown in FIG. 5A in a diffraction state, according to another embodiment of the disclosure.
Figure 5A:
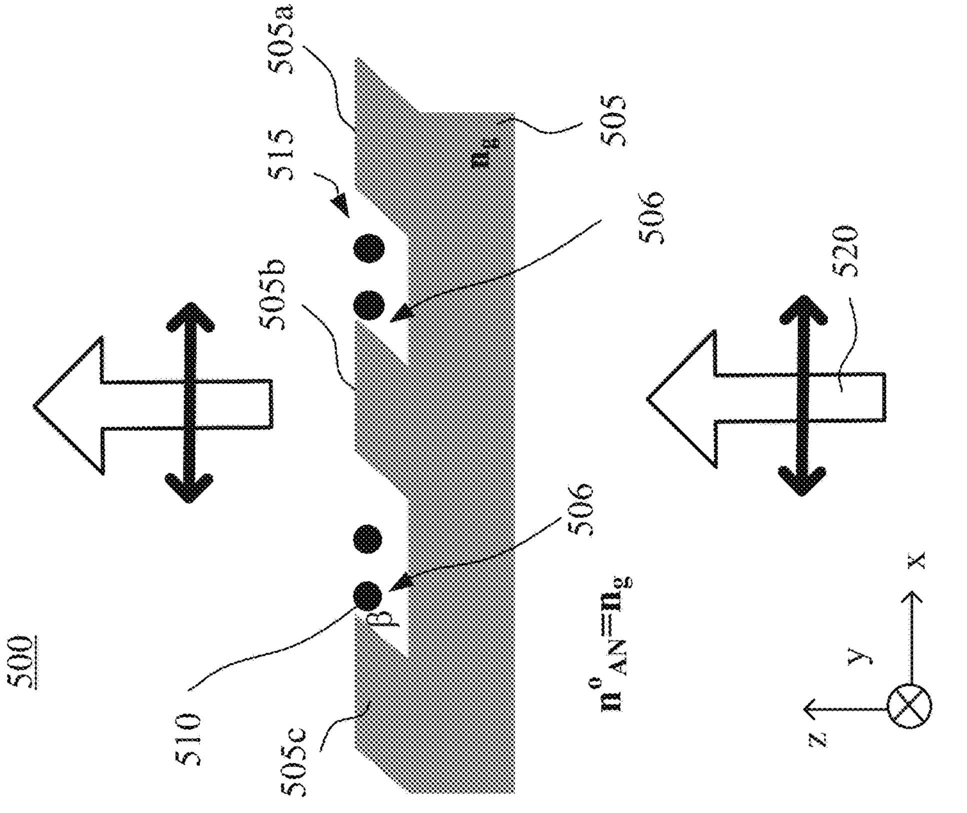
FIG. 5A illustrates a schematic diagram of a passive grating in a non-diffraction state, according to another embodiment of the disclosure.

FIGS. 5A and 5B illustrate x-z sectional views of a passive grating 500 in a non-diffraction state and a diffraction state, respectively. The passive grating 500 may include elements that are the same as or similar to those included in the passive grating 300 or 400. Descriptions of the same or similar elements can refer to the above descriptions rendered in connection with FIGS. 3A-4B. Similar to the passive grating 300 shown in FIGS. 3A and 3B, the passive grating 500 shown in FIGS. 5A and 5B may include an SRG 505 including a plurality of microstructures 505*a*, 505*b*, and 505*c*. The microstructures 505*a*, 505*b*, and 505*c* may define a plurality of grooves 506. The grooves 506 may be at least partially filled with an optically anisotropic material 515. Molecules (e.g., LC molecules) 510 of the optically anisotropic material 515 may be homogeneously aligned within the grooves 506 in the groove direction, for example, in the y-direction as shown in FIGS. 5A and 5B. Different from the binary non-slanted SRG 305 shown in FIGS. 3A and 3B, and the binary non-slanted SRG 405 shown in FIGS. 4A and 4B, the SRG 505 shown in FIGS. 5A and 5B may be a binary slanted grating. That is, as shown in FIG. 5A, each microstructure 505*a*, 505*b*, or 505*c* may form a slant angle β with respect to an in-plane direction perpendicular to the groove length direction of the SRG 505 (e.g., x-direction, i.e., the direction along the bottom surface of the groove and perpendicular to the groove length direction, or the in-plane direction of periodicity of the microstructures). In some embodiments, side surfaces of each groove 506 may be slanted at an angle β with respect to a bottom surface of the groove 506 rather than being perpendicular to the bottom surface, as shown in FIG. 3A. The slant angle β may be referred to the slant angle the microstructures or the slant angle of the side surfaces of the grooves. Descriptions of the diffraction state and the non-diffraction state of the passive grating 500 shown in FIGS. 5A and 5B may refer to those rendered above in connection with the passive grating 300 shown in FIGS. 3A and 3B. As shown in FIG. 5A, the passive grating 500 may operate in a non-diffraction state to transmit an incident light 520 polarized in the x-direction that is perpendicular to the groove direction (i.e., the y-direction). As shown in FIG. 5B, the passive grating 500 may operate in a diffraction state to diffract an incident light 530 polarized in the groove direction (i.e., the y-direction).

Figure 5D:
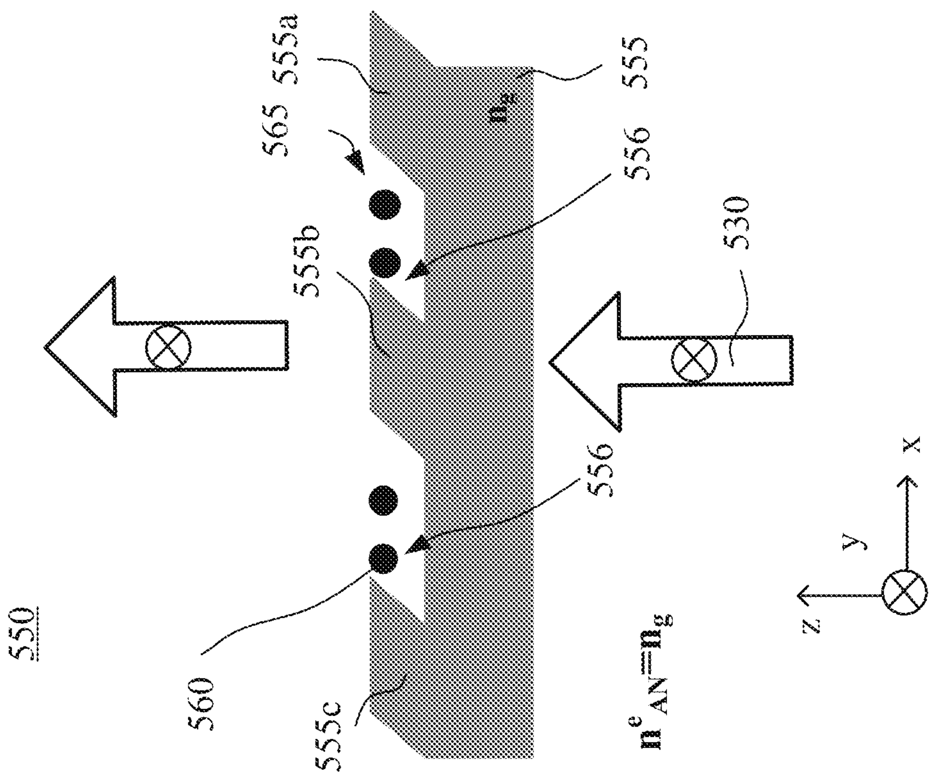
FIG. 5D illustrates a schematic diagram of the passive grating shown in FIG. 5C in a non-diffraction state, according to another embodiment of the disclosure.
Figure 5C:
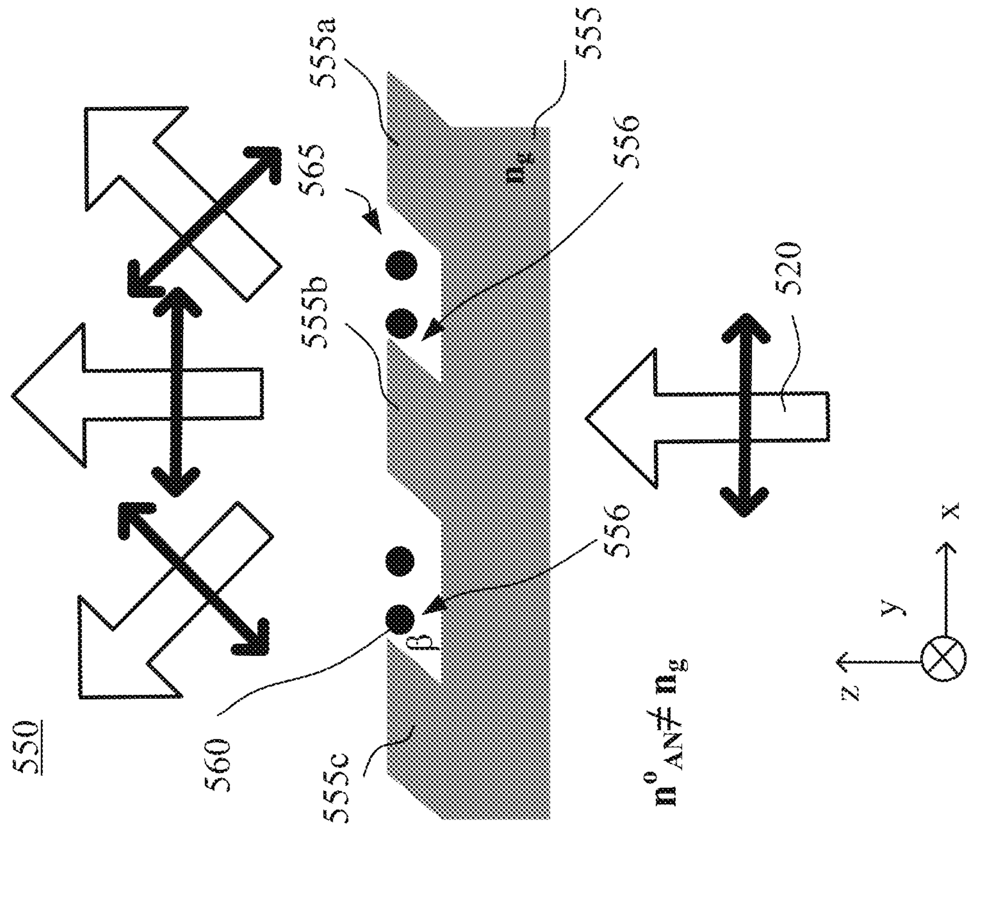
FIG. 5C illustrates a schematic diagram of a passive grating in a diffraction state, according to another embodiment of the disclosure.

FIGS. 5C and 5D illustrate x-z sectional views of a passive grating 550 in a diffraction state and a non-diffraction state, respectively. The passive grating 550 may include elements that are the same as or similar to those included in the passive grating 300, 400, or 500. Descriptions of the same or similar elements can refer to the above descriptions rendered in connection with FIGS. 3A-5B. Similar to the passive grating 400 in FIGS. 4A and 4B, the passive grating 550 shown in FIGS. 5C and 5D may include an SRG 555 including a plurality of microstructures 555*a*, 555*b*, and 555*c*, which may be similar to the microstructures 505*a*, 505*b*, and 505*c* shown in FIGS. 5A and 5B. The plurality of microstructures 555*a*, 555*b*, and 555*c* may define a plurality of grooves 556, which may be similar to the grooves 506. The grooves 556 may be at least partially filled with an optically anisotropic material 565. Molecules (e.g., LC molecules) 560 of the optically anisotropic material 565 may be homogeneously aligned within the grooves 556 in the groove direction, for example, in the y-direction as shown in FIGS. 5C and 5D. Different from the binary non-slanted SRG 405 in FIGS. 4A and 4B, the SRG 555 shown in FIGS. 5C and 5D may be a binary slanted grating (similar to the slanted grating shown in FIGS. 5A and 5B). Descriptions of the diffraction state and the non-diffraction state of the passive grating 550 shown in FIGS. 5C and 5D may refer to the descriptions rendered above in connection with the passive grating 400 shown in FIGS. 4A and 4B. As shown in FIG. 5C, the passive grating 550 may operate in a diffraction state to diffract the incident light 520 polarized in the x-direction that is perpendicular to the groove direction (i.e., the y-direction). As shown in FIG. 5D, the passive grating 550 may operate in the non-diffraction state to transmit the incident light 530 polarized in the groove direction (i.e., the y-direction).

In some embodiments, the SRG 505 and the SRG 555 shown in FIGS. 5A-5D may be filled with an active optically anisotropic material (e.g., an active LC) that may be re-oriented when subjected to an external field, such as an electric field. The SRG filled with the active optically anisotropic material may become an active grating. The active grating may be either directly switchable between the diffraction state and the non-diffraction state, or indirectly switchable between the diffraction state and the non-diffraction state, similar to the passive grating 500 and the passive grating 550 described above. That is, the active grating may function as an indirectly switchable grating.

Figure 6B:
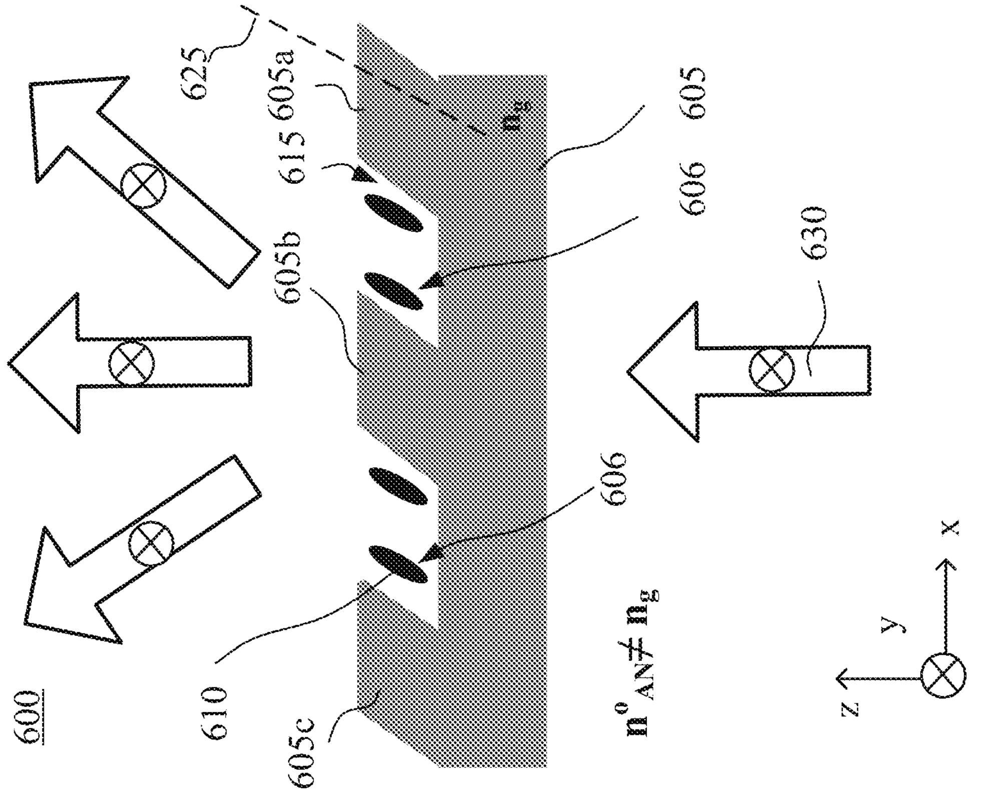
FIG. 6B illustrates a schematic diagram of a passive grating in a diffraction state, according to another embodiment of the disclosure.
Figure 6A:
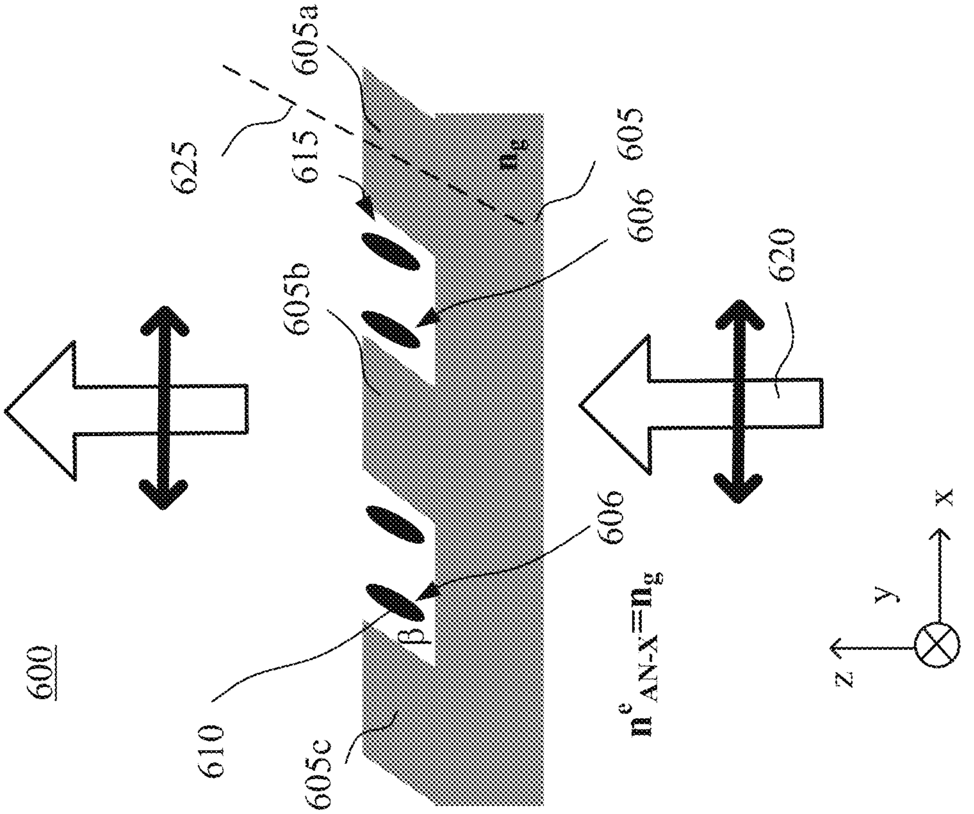
FIG. 6A illustrates a schematic diagram of a passive grating in a non-diffraction state, according to another embodiment of the disclosure.

FIGS. 6A and 6B illustrate an x-z sectional view of a passive grating 600 in a non-diffraction state and a diffraction state, respectively. The passive grating 600 may include elements that are the same as or similar to those included in the passive grating 300, 400, 500, or 550. Descriptions of the same or similar elements can refer to the above descriptions rendered in connection with FIGS. 3A-5D. Similar to the passive grating 500 shown in FIGS. 5A and 5B and the passive grating 550 shown in FIGS. 5C and 5D, the passive grating 600 shown in FIGS. 6A and 6B may include an SRG 605 including a plurality of microstructures 605*a*, 605*b*, and 605*c* defining a plurality of grooves 606. The microstructures 605*a*, 605*b*, and 605*c* may be similar to the microstructures 505*a*, 505*b*, 505*c*, or 555*a*, 555*b*, 555*c*. The grooves 606 may be similar to the grooves 506 or 556. The SRG 605 may be a binary slanted grating, in which the microstructures 605*a*, 605*b*, and 605*c* are obliquely disposed with respect to an in-plane direction (e.g., the x direction) perpendicular to the groove length direction. In other words, side surfaces of each groove 606 form an angle β with respect to a bottom surface of the groove 606. The plurality of grooves 606 may be at least partially filled with an optically anisotropic material 615. Molecules (e.g., LC molecules) 610 of the optically anisotropic material 615 may be obliquely aligned within the grooves 606. Due to an interaction between the slanted side surfaces of the grooves 606 and the molecules 610, the molecules 610 may be tilted along the slant side surfaces of the grooves 606. For example, the molecules 610 may follow the slant side surfaces to form a pretilt angle with respect to the in-plane direction perpendicular to the groove length direction (e.g., x-direction, i.e., the direction along the bottom surface of the groove and perpendicular to the groove length direction, or the in-plane direction of periodicity of the microstructures). In some embodiments, the pretilt angle of the molecules 610 may be substantially the same as the slant angle β of the side surfaces of the grooves 606. As shown in FIG. 6A, the molecules (e.g., LC molecules) 610 may be aligned in a tilting direction 625 of the grooves 606 (referred to as a groove tilting direction 625). The tilting direction 625 refers to the tilting direction of the slant side surfaces of the grooves 606. In FIG. 6A, the slant angle β of the SRG 605 may be an angle formed between the groove tilting direction 625 of the grooves 606 and an in-plane direction (e.g., x-direction) perpendicular to a groove direction (e.g., y-direction) of the SRG 605. Although not shown in FIGS. 5A-5D, a similar groove tilting direction can be defined in the embodiments shown in FIGS. 5A-5D.

The optically anisotropic material 615 may be uniaxial and may have a first principal refractive index (e.g., $n^e_{AN}$) in the groove tilting direction 625 of the SRG 605 and a second principal refractive index (e.g., $n^o_{AN}$) in a direction perpendicular to the groove tilting direction 625, such as the groove direction (e.g., y-direction) of the SRG 605. The first principal refractive index (e.g., $n^e_{AN}$) may be decomposed into two components: a first component (e.g., $n^e_{AN\text{-}X}$) in the in-plane direction (e.g., x-direction) perpendicular to a groove direction (e.g., y-direction) and a second component (e.g., $n^e_{AN\text{-}z}$) in the thickness direction (e.g., z-direction) of the SRG 605. The first component (e.g., $n^e_{AN\text{-}X}$) of the first principal refractive index (e.g., $n^e_{AN}$) may substantially match with a refractive index $n_g$ of the SRG 605, and the second principal refractive index (e.g., $n^o_{AN}$) may not match with the refractive index $n_g$ of the SRG 605.

As shown in FIG. 6A, for an incident light 620 polarized in the in-plane direction (e.g., x-direction) perpendicular to the groove direction (e.g., y-direction) of the grooves 606, due to the substantial refractive index match between $n^e_{AN\text{-}X}$ and $n_g$, the passive grating 600 may function as a substantially optically uniform plate for the incident light 620 with negligible or no diffraction. That is, the passive grating 600 may operate in a non-diffraction state for the incident light 620 polarized in the in-plane direction (e.g., x-direction) perpendicular to the groove direction (e.g., y-direction) of the grooves 606 of the SRG 605. As shown in FIG. 6B, for an incident light 630 polarized in the groove direction (e.g., y-direction) of the SRG 605, due to the refractive index difference between $n^o_{AN}$ and $n_g$, the light 630 may experience a periodic modulation of the refractive index in the grating 600 and may be diffracted. That is, the passive grating 600 may operate in a diffraction state for the incident light 630 polarized in the groove direction (e.g., y-direction) of the SRG 605. The diffraction efficiency of the light 630 may depend on the modulation of refractive index nm (i.e., the difference between the $n^o_{AN}$ and $n_g$) provided by the passive grating 600.

Figure 6D:
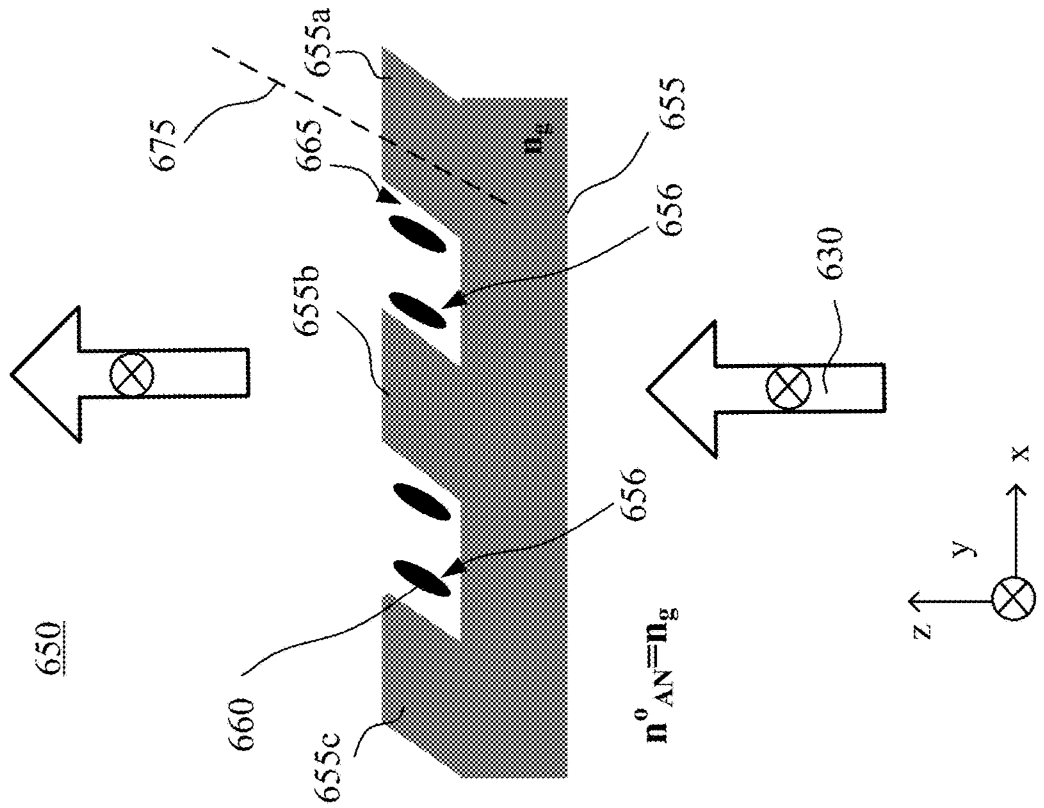
FIG. 6D illustrates a schematic diagram of a passive grating in a non-diffraction state, according to another embodiment of the disclosure.
Figure 6C:
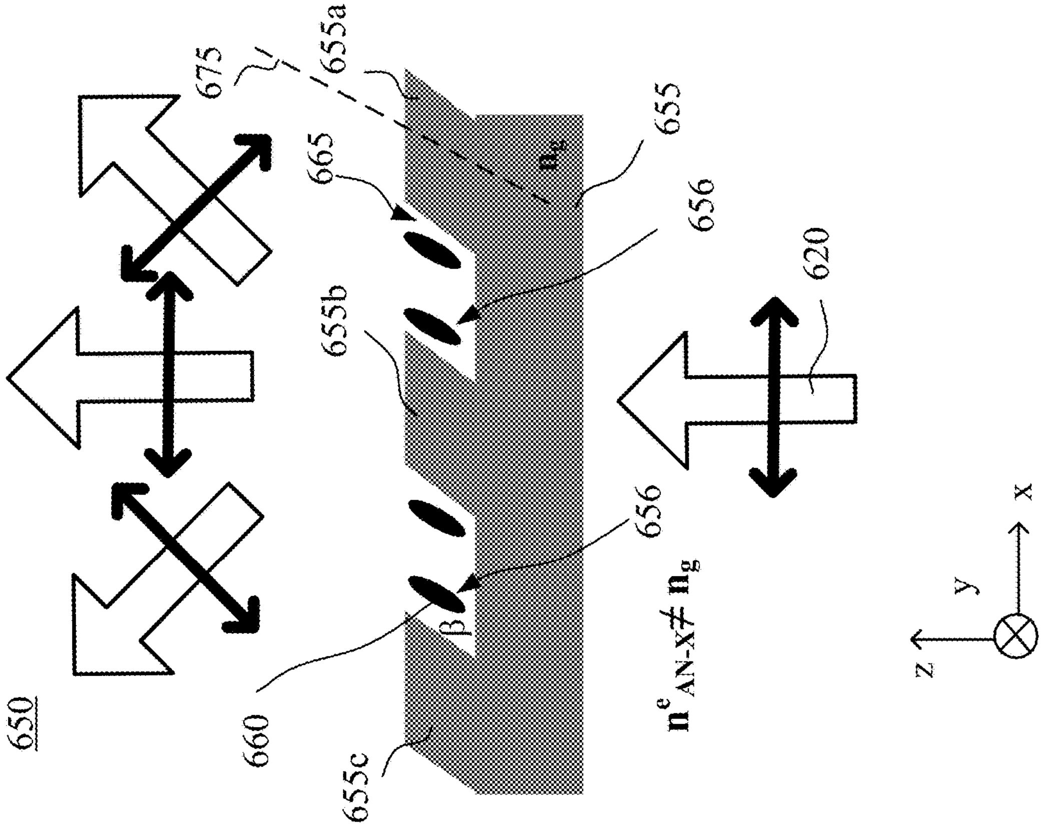
FIG. 6C illustrates a schematic diagram of a passive grating in a diffraction state, according to another embodiment of the disclosure.

FIGS. 6C and 6D illustrate an x-z sectional view of a passive grating 650 in a diffraction state and a non-diffraction state, respectively. The passive grating 650 may include elements that are the same as or similar to those included in the passive grating 300, 400, 500, 550, or 600. Descriptions of the same or similar elements can refer to the above descriptions rendered in connection with FIGS. 3A-6B. Similar to the passive grating 600 shown in FIGS. 6A and 6B, the passive grating 650 shown in FIGS. 6C and 6D may include an SRG 655 including a plurality of microstructures 655*a*, 655*b*, and 655*c* defining a plurality of grooves 656. The microstructures 655*a*, 655*b*, and 655*c* may be similar to the microstructures 605*a*, 605*b*, and 605*c*. The grooves 656 may be similar to the grooves 606. The SRG 655 may be a binary slanted grating, similar to the SRG 605 shown in FIG. 6A. The grooves 656 may be at least partially filled with an optically anisotropic material 665. Similar to the molecules 610, molecules (e.g., LC molecules) 660 of the optically anisotropic material 665 may be obliquely aligned within the grooves 656. Due to an interaction between the slanted side surfaces of the grooves 656 and the molecules 660, the molecules 610 may follow the slant side surfaces to form a pretilt angle with respect to the in-plane direction perpendicular to the groove length direction. The pretilt angle of the molecules 610 may be substantially the same as the slant angle β of the side surfaces of the grooves 606. That is, the molecules (e.g., LC molecules) 660 may be aligned in a tilting direction 675 of the grooves 656 (referred to as a groove tilting direction 675), similar to the embodiment shown in FIG. 6A.

The optically anisotropic material 665 may be uniaxial and may have a first principal refractive index (e.g., $n^o_{AN}$) in the groove tilting direction 675 of the SRG 655 and a second principal refractive index (e.g., $n^o_{AN}$) in a direction perpendicular to the groove tilting direction 675, such as in the groove direction (e.g., y-direction) of the SRG 655. The first principal refractive index (e.g., $n^o_{AN}$) may be decomposed into two components: a first component (e.g., near-x) in the in-plane direction (e.g., x-direction) perpendicular to a groove direction (e.g., y-direction) and a second component (e.g., $n^e_{AN-z}$) in the thickness direction (e.g., z-direction) of the SRG 655. The first component (e.g., near-x) of the first principal refractive index (e.g., $n^o_{AN}$) may not match with a refractive index $n_g$ of the SRG 655, and the second principal refractive index (e.g., $n^o_{AN}$) may substantially match with the refractive index $n_g$ of the SRG 655.

As shown in FIG. 6C, for an incident light 620 polarized in the in-plane direction (e.g., x-direction) perpendicular to the groove direction (e.g., y-direction) of the grooves 656, due to the refractive index difference between near-x and $n_g$, the light 620 may experience a periodic modulation of the refractive index in the passive grating 650 and may be diffracted. That is, the passive grating 650 may operate in a diffraction state for the incident light 620 polarized in the in-plane direction perpendicular to the groove length direction of the SRG 655. The diffraction efficiency of the light 620 may depend on the modulation of refractive index nm (i.e., the difference between the $n^e_{AN-X}$ and $n_g$) provided by the passive grating 650. As shown in FIG. 6D, for an incident light 630 polarized in the groove direction (e.g., y-direction) of the SRG 655, due to the substantial refractive index match between $n^o_{AN-X}$ and $n_g$, the passive grating 650 may function as a substantially optically uniform plate for the incident light 630 with negligible or no diffraction. That is, the passive grating 650 may operate in a non-diffraction state for the incident light 630 polarized in the groove direction of the grooves 656 of the SRG 655.

In some embodiments, the SRG 605 and the SRG 655 shown in FIGS. 6A-6D may be filled with an active optically anisotropic material (e.g., an active LC) that may be reoriented when subjected to an external field, such as an electric field. The SRG filled with the active optically anisotropic material may become an active grating. The active grating may be either directly switchable between the diffraction state and the non-diffraction state, or indirectly switchable between the diffraction state and the non-diffraction state, similar to the passive grating 600 and the passive grating 650 described above. That is, the active grating may function as an indirectly switchable grating.

Figure 7:
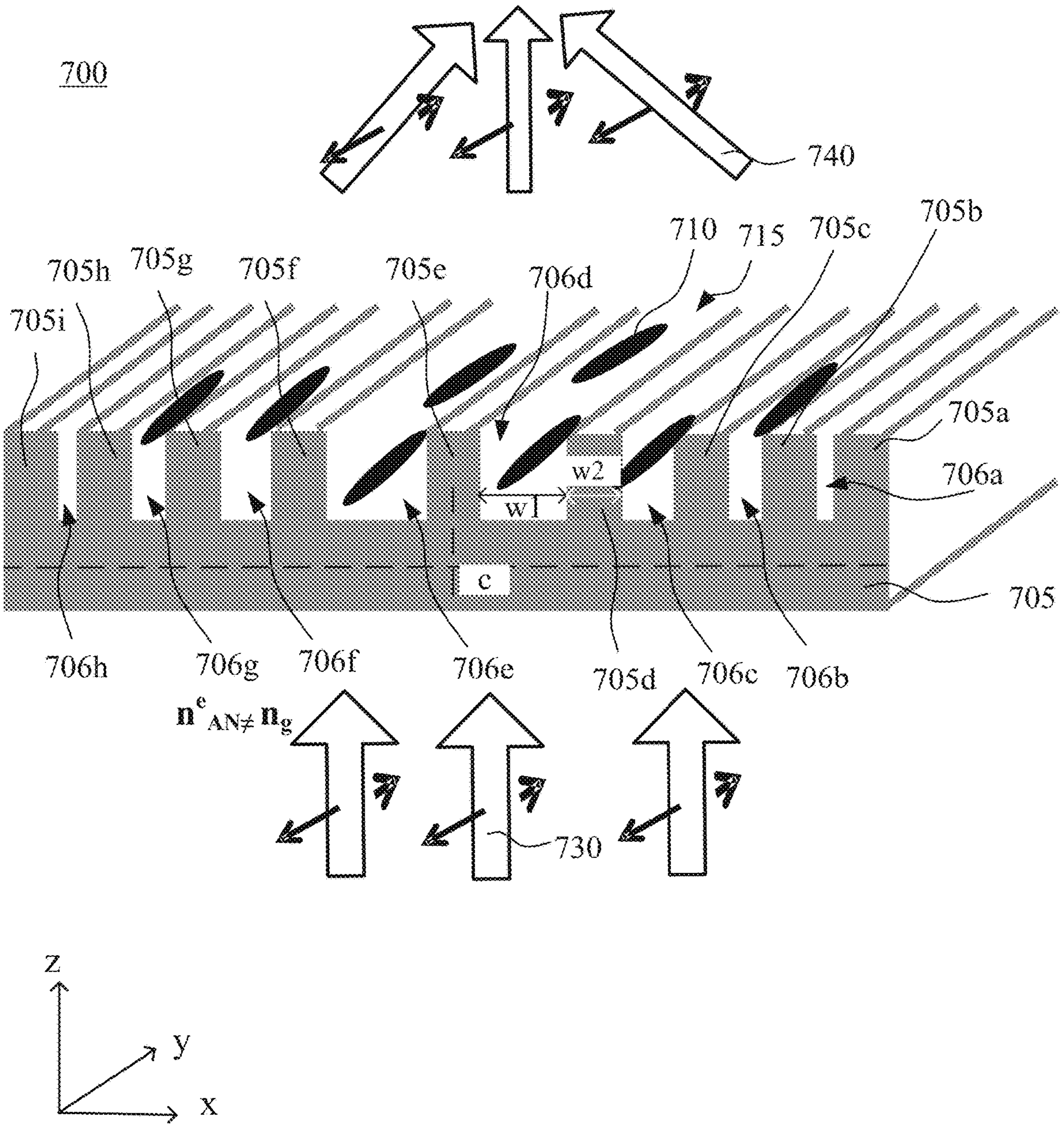
FIG. 7 illustrates a schematic diagram of a passive diffractive optical element, according to another embodiment of the disclosure.

FIGS. 3A-6D show that the passive diffractive optical element may be a passive grating including an SRG having a constant periodicity. The period of the SRG may be defined as a distance between two adjacent microstructures (e.g., protrusions). The cross-sectional profile of the grooves of the SRG may have a rectangle shape or a parallelogram shape. That is, the cross-sectional profile of the grooves of the SRG may include periodically distributed rectangle shapes or parallelogram shapes. In some embodiments, the passive diffractive optical element may be configured without an optical power. In some embodiments, the cross-sectional profile of the grooves of the SRG may include any suitable shapes, such as any regular or non-rectangular shapes. For example, the cross-sectional profile of the grooves of the SRG may include sinusoidal shapes, triangular shapes, trapezoidal shapes, or saw-tooth shapes, depending on the applications. In some embodiments, the SRG (i.e., the microstructures or grooves included in the SRG) may have a varying periodicity rather than a constant periodicity. An exemplary passive diffractive optical element with an SRG having a varying periodicity is shown in FIG. 7. In some embodiments, the passive diffractive optical element may be configured with an optical power. The disclosed diffractive optical elements may realize substantially the same optical functions as conventional refractive optics, such as lenses, prisms, or aspheres, with a much smaller and lighter configuration. In some embodiments, the passive diffractive optical element may be a one-dimensional grating. In some embodiments, the passive diffractive optical element may be a two-dimensional grating including at least two SRGs that are patterned and/or stacked.

FIG. 7 illustrates a schematic diagram of a passive diffractive optical element 700, according to another embodiment of the disclosure. As shown in FIG. 7, the passive diffractive optical element 700 may be a passive grating that includes an SRG 705. The SRG 705 may include a plurality of microstructures 705*a*-705*i*. The microstructures may define a plurality of grooves 706*a*-706*h*. The number of the microstructures and the grooves are for illustrative purposes only. The SRG 705 may include any suitable number of microstructures. The SRG 705 (i.e., the microstructures or grooves of the SRG 705) may have a varying periodicity. That is, the grooves 706*a*-706*h* may not be the same. For example, the widths of at least two grooves may be different. In some embodiments, a first group of grooves may have a first width (associated with a first periodicity), and a second group of grooves may have a second width (associated with a second periodicity). The second width (hence the second periodicity) may be different from the first width. The grooves 706*a*-706*h* may be at least partially filled with an optically anisotropic material 715. Molecules 710 (shown as black rods) of the optically anisotropic material 715 may be homogeneously aligned within the grooves 706*a*-706*h*, similar to the embodiments shown in FIG. 3B or 4A. For example, in some embodiments, the molecules 710 may be homogeneously aligned in a groove direction (e.g., y-direction) of the grooves 706*a*-706*h* of the SRG 705.

The optically anisotropic material 715 may have a first principal refractive index (e.g., an extraordinary refractive index $n^o_{AN}$) in the groove direction (e.g., y-direction) of the SRG 705 and a second principal refractive index (e.g., an ordinary refractive index $n^o_{AN}$) along an in-plane direction (e.g., x-direction) perpendicular to the groove direction. One of the first principal refractive index or the second principal refractive index may substantially match with a refractive index $n_g$ of the SRG 705, and the other one of the first principal refractive index or the second principal refractive index may not match with the refractive index $n_g$ of the SRG 705. For discussion purposes, in the passive diffractive optical element 700, the second principal refractive index (e.g., $n^o_{AN}$) of the optically anisotropic material 715 may substantially match with the refractive index $n_g$ of the SRG 705, and the first principal refractive index (e.g., $n^o_{AN}$) in the groove direction (e.g., y-direction) of the SRG 705 may not match with the refractive index $n_g$ of the SRG 705.

The cross-sectional profile of the grooves of the SRG 705 may have a non-periodic rectangular profile or shape. As shown in FIG. 7, a width of a groove may be denoted as w1, and a width of microstructure may be denoted as w2. In the in-plane direction (e.g., x-direction, i.e., the direction along the bottom surface of the groove, or the in-plane direction of periodicity of the microstructures) perpendicular to the groove direction (e.g., y-direction) of the SRG 705, a periodicity (w1+w2) of the SRG 705 may monotonically decrease from a center (denoted by "c" in FIG. 7) to a periphery (e.g., the left end and the right end) of the SRG 705, through which a light focusing effect is achieved (or a positive optical power is provided). For an incident light 730 polarized in the groove direction (e.g., y-direction) of the SRG 705, due to the refractive index difference between $n^e_{AN}$ and $n_g$, the light 730 may experience a modulation of the refractive index in the passive diffractive optical element 700 and may be diffracted. Through configuring the cross-sectional profile of the grooves 706*a*-706*h* of the SRG 705, as well as the refractive indices of the optically anisotropic material 715 and the SRG 705, diffracted light beams 740 may be further focused. That is, the passive diffractive optical element 700 may function as a cylindrical diffractive lens. In some embodiments, the passive diffractive optical element 700 may also include other elements, such as substrates, alignment layers, etc., which may not have been shown in FIG. 7 for simplicity. Although varying periodicity configuration shown in FIG. 7 is illustrated with grooves with side surfaces perpendicular to the bottom surface, similar to the grooves shown in FIGS. 3A-4B, it is understood that the varying periodicity configuration may also be based on the slanted microstructures shown in FIGS. 5A-6D.

In some embodiments, the SRG 705 shown in FIG. 7 may be filled with an active optically anisotropic material (e.g., an active LC) that may be re-oriented when subjected to an external field, such as an electric field. The SRG filled with the active optically anisotropic material may become an active grating. The active grating may be either directly switchable between the diffraction state and the non-diffraction state, or indirectly switchable between the diffraction state and the non-diffraction state, similar to the passive grating 700 described above. That is, the active grating may function as an indirectly switchable grating.

Figure 8A:
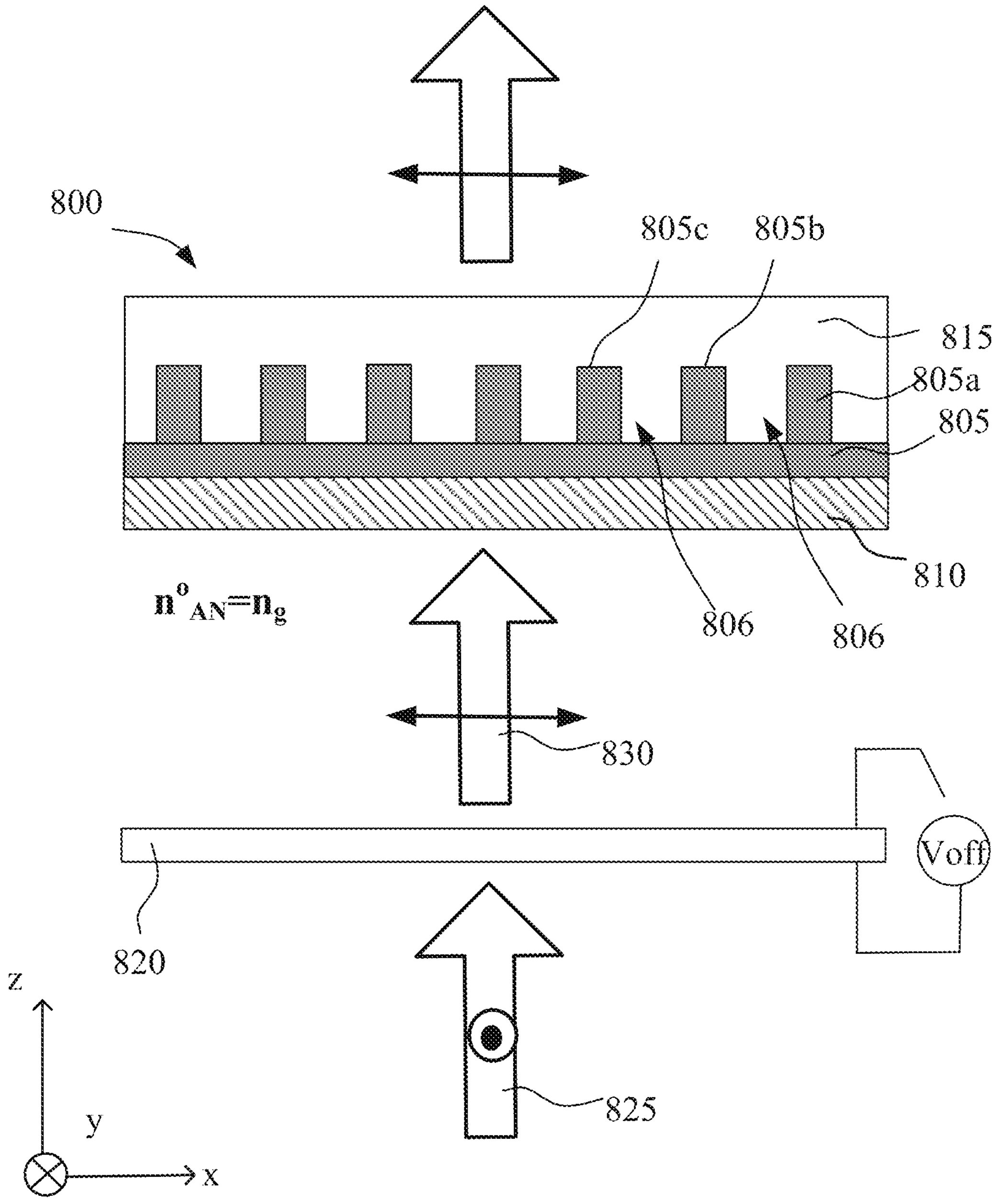
FIGS. 8A-8B illustrate schematic diagrams of a system for indirectly switching a passive grating, according to an embodiment of the present disclosure.
Figure 8B:
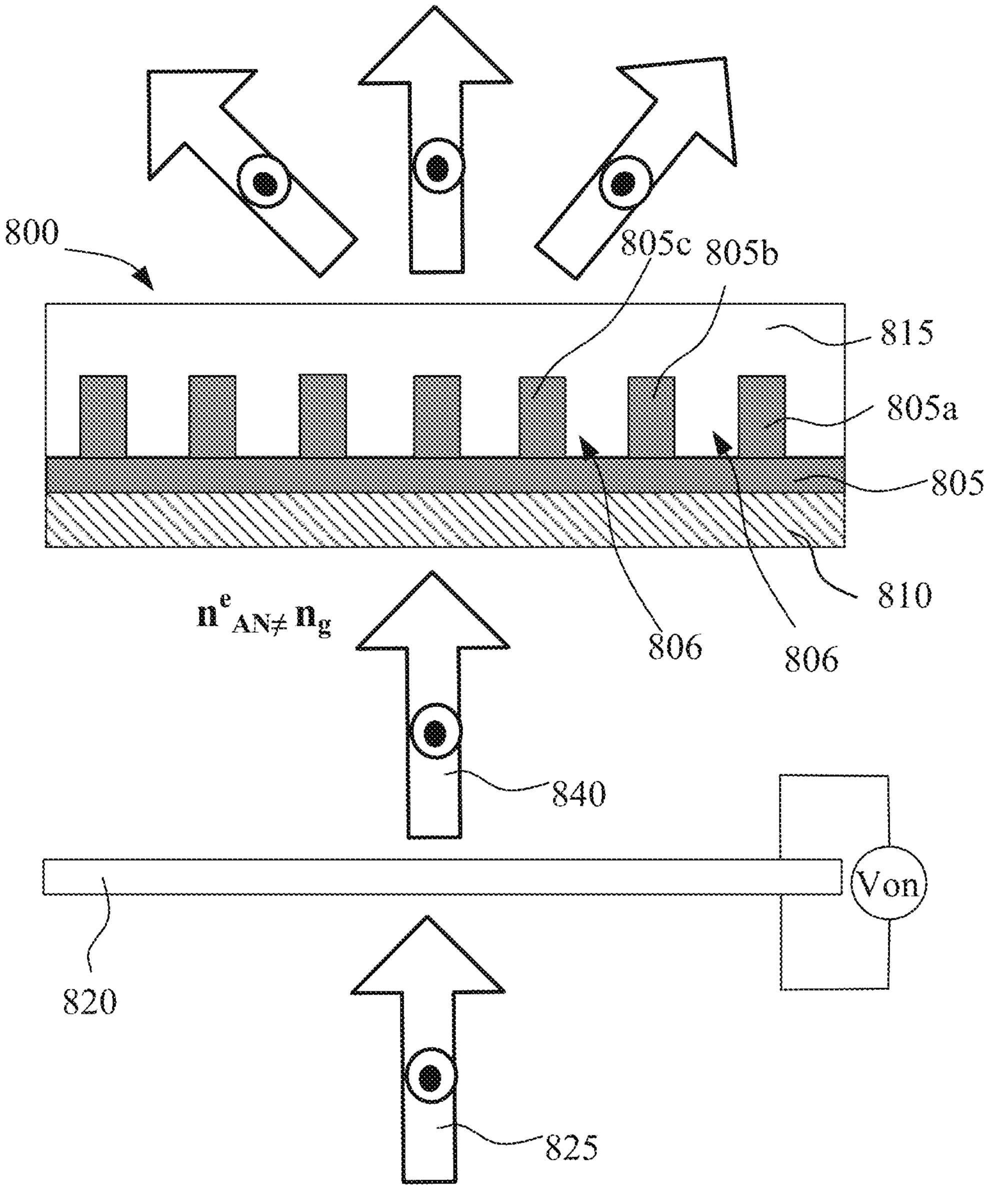

A passive diffractive optical element in accordance with an embodiment of the present disclosure may be indirectly switched between a diffraction state and a non-diffraction state via an external polarization rotator or polarization switch. For discussion purposes, a passive binary diffraction grating is used as an example of the disclosed passive diffractive optical elements to explain the indirect switching. The switching configuration shown in FIGS. 8A and 8B may be applicable to any of the disclosed indirectly switchable diffractive optical elements shown in other figures. FIGS. 8A and 8B illustrate schematic diagrams of a system for indirectly switching the passive grating 800, according to an embodiment of the present disclosure. For discussion purposes, the passive grating 800 may be a single substrate grating. As shown in FIGS. 8A and 8B, the passive grating 800 may have a configuration similar to that of the passive grating 300 shown in FIGS. 3A-3B. For example, the passive grating 800 may include an SRG 805 including a plurality of microstructures 805*a*, 805*b*, 805*c*, etc. The plurality of microstructures 805*a*, 805*b*, 805*c*, etc., may be similar to the microstructures 305*a*, 305*b*, and 305*c*. The plurality of microstructures 805*a*, 805*b*, 805*c*, etc. may define a plurality of grooves 806, which may be similar to the grooves 306 shown in FIG. 3A. The SRG 805 may be provided on a substrate 810, and may be filled with an optically anisotropic material 815. The optically anisotropic material 815 may be similar to the optically anisotropic material 315. Although the configuration similar to that shown in FIGS. 3A and 3B is shown in FIGS. 8A and 8B as an example passive grating for explaining the indirectly switching, it is understood that the indirect switching shown in FIGS. 8A and 8B may be similarly applicable to the gratings shown in FIGS. 4A and 4B, 5A and 5B, 5C and 5D, 6A and 6B, 6C and 6D, and 7.

As shown in FIGS. 8A and 8B, a polarization switch 820 may be coupled (e.g., optically coupled) to the passive grating 800. The polarization switch 820 may be configured to control the polarization of a light incident onto the passive grating 800. The polarization switch 820 may be an active element configured to switch the polarization of an incoming light between a first polarization and a second polarization different from the first polarization in accordance with an operation state (e.g., switching or non-switching state) of the polarization switch 820. In the switching state, the polarization switch 820 may switch the polarization of the incoming light from the first polarization to the second polarization or vice versa. In the non-switching state, the polarization switch 820 may maintain the polarization of the incoming light. In some embodiments, the first polarization and the second polarization may be linear polarizations, and the second polarization may be orthogonal to the first polarization. In some embodiments, the first polarization and the second polarization may be circular or elliptical polarizations, and the first polarization and the second polarization may have reversed or opposite handednesses (e.g., left-handedness and right-handedness).

Any suitable polarization switches may be used as the polarization switch 820. In some embodiments, the polarization switch 820 may include an LC-based polarization switch, such as a 90° twist-nematic liquid crystal ("TNLC") cell configured to switch the incoming light between two orthogonal linear polarizations. The TNLC cell may have a light incidence surface and a light exiting surface providing substantially orthogonal alignment directions to LCs in the TNLC cell. The alignment direction of the light incidence surface of the TNLC cell may be oriented relative to the polarization direction of a linearly polarized incoming light (e.g., the first polarization), thereby rotating the polarization of the incoming light by about 90° when the TNLC cell operates at the switching state, or maintaining the polarization of the incoming light when the TNLC cell operates at the non-switching state. In some embodiments, the TNLC cell may operate at the switching state when an externally applied voltage is lower than a threshold voltage of the TNLC cell, and the TNLC cell may operate at the non-switching state when an externally applied voltage is sufficiently high to reorient the LCs along the electric field direction.

In some embodiments, the polarization switch 820 may include a switchable half-wave plate ("SHWP") having a polarization axis oriented relative to the polarization direction of the incoming light, thereby rotating the incoming light from the first polarization to the second polarization when the SHWP operates at the switching state, and maintaining the first polarization when the SHWP operates at the non-switching state. The SHWP may be configured to switch a polarization of the light between two orthogonal polarizations. For example, the SHWP may switch a linearly polarized incoming light between two orthogonal polarization directions, and switch a circularly polarized incoming light between two reversed or opposite handednesses. In some embodiments, the SHWP may include an LC layer, where an external electrical field (e.g., a voltage) may be applied to change the orientation of the LCs in the LC layer, thereby switching the polarization switch 820 between a switching state and a non-switching state. For example, the SHWP may operate at the switching state when an externally applied voltage is lower than the threshold voltage of the LCs included in the LC layer. The SHWP may operate at the non-switching state when an externally applied voltage is sufficiently high to reorient the LCs along the electric field direction.

For discussion purposes, FIGS. 8A and 8B show that the polarization switch 820 may include a TNLC cell. The alignment direction of the light incidence surface of the TNLC cell may be oriented to be parallel to a polarization direction (e.g., y-direction) of an incoming light 825. As shown in FIG. 8A, in a voltage-off state, the TNLC cell may operate at the switching state. The polarization direction of the incoming light 825 may be rotated through the twisted structure of the TNLC cell by about 90°. Thus, the TNLC cell may rotate the polarization of the incoming light 825 from a first polarization (e.g., polarized in a y-direction shown in FIG. 8A) to a second polarization (e.g., polarized in an x-direction shown in FIG. 8A) perpendicular to the first direction. That is, the incoming light 825 having the first polarization may be transmitted as an outgoing light 830 having the second polarization toward the passive grating 800. Due to the substantial refractive index match between $n^o_{AN}$ and $n_g$, the passive grating 800 may function as a substantially optically uniform plate for the light 830. That is, the passive grating 800 may operate in a non-diffraction state for the light 830 having the second polarization. In some embodiments, the second principal refractive index (e.g., $n^o_{AN}$) of the optically anisotropic material 815 may be the same as (or match with) the refractive index $n_g$ of the SRG 80 and, thus, the light 830 may be transmitted through the passive grating 800 with negligible or no diffraction. That is, the diffraction effect of the passive grating 800 may be substantially zero.

The twisted structure of the TNLC cell may become untwisted due to an external force, such as an external field. Accordingly, the polarization of the incoming light 825 may be maintained. As shown in FIG. 8B, at a voltage-on state, the TNLC cell may be at a non-switching state, and an electric field may be generated between two opposite substrates of the TNLC cell. LC molecules in the TNLC cell may be reoriented by the electric field and trend to be parallel to the electric field direction when the voltage is sufficiently high. Thus, the twisted structure of the TNLC cell may become untwisted, and the incoming light 825 having the first polarization (e.g., polarized in the y-direction shown in FIG. 8B) may be transmitted through the TNLC cell as an outgoing light 840 without changing the polarization. That is, the light 840 incident onto the passive grating 800 may also have the first polarization (e.g., polarized in the y-direction shown in FIG. 8B). Due to the refractive index difference between $n^e_{AN}$ and $n_g$, the light 840 may experience a periodic modulation of the refractive index in the grating 800 and, thus, may be diffracted.

In some embodiments, the polarization switch 820 may include the SHWP. Then, at the non-switching state (e.g., voltage-on state), the polarization switch 820 may transmit the linearly polarized incoming light 825 having the first polarization (e.g., polarized in the y-direction shown in FIGS. 8A and 8B) without affecting the polarization. Accordingly, an outgoing light may experience a periodic modulation of the refractive index in the passive grating 800 and may be diffracted. At the switching state (e.g., voltage-off state), the polarization switch 820 may transmit the linearly polarized incoming light 825 having the first polarization (e.g., polarized in the y-direction shown in FIGS. 8A and 8B) to a linearly polarized outgoing light having the second polarization (e.g., polarized in the x-direction shown in FIGS. 8A and 8B), which may be transmitted through the passive grating 800 with negligible or no diffraction.

Referring to FIGS. 8A and 8B, by switching the polarization switch 820 between the switching state and the non-switching state, the passive grating 800 may be switched between the non-diffraction state and the diffraction state for the incoming light 825 polarized in the groove direction (e.g., y-direction) of the SRG 805. In some embodiments, the incoming light 825 may be polarized in an in-plane direction (e.g., x-direction) perpendicular to the groove direction of the SRG 805. Accordingly, the passive grating 800 may operate in the diffraction state when the polarization switch 820 is at the switching state, or operate in the non-diffraction state when the polarization switch 820 is at the non-switching state. The switching time of the TNLC cell may be about 3-5 milliseconds ("ms"). In some embodiments, to further increase the switching speed of the passive grating 800, a polarization switch based on ferroelectric liquid crystal ("FLCs") may be adopted, such as an SHWP based on FLCs. The switching time may be reduced to an order of microseconds ("μs"), e.g., less than 100 μs. Further, by switching the passive grating 800 between the diffraction state and the non-diffraction state through the external polarization switch 820, electrodes that may be included in an active grating may be omitted from the passive grating 800, such that undesirable light absorption and modification of refractive index may be significantly suppressed.

Figure 9A:
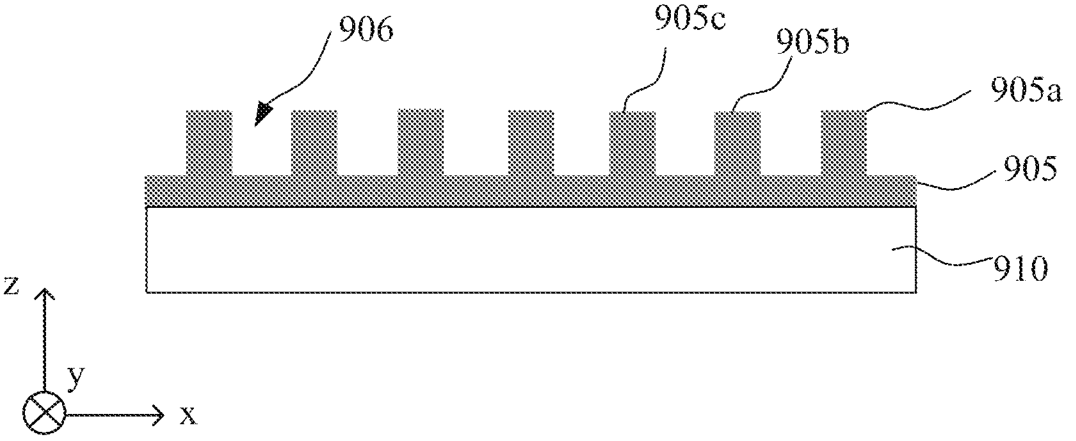
FIGS. 9A-9D illustrate schematic diagrams showing processes of fabricating a passive diffractive optical element, according to an embodiment of the present disclosure.

FIGS. 9A-9D illustrate schematic diagrams showing processes of fabricating an indirectly switchable diffractive optical element, which may be a passive optical element, according to an embodiment of the present disclosure. As shown in FIG. 9A, an SRG 905 may be disposed at (e.g., bonded to or formed on) a substrate 910. The SRG 905 may include a plurality of microstructures 905*a*, 905*b*, 905*c*, etc. The plurality of microstructures 905*a*, 905*b*, 905*c*, etc. may be similar to the microstructures 305*a*, 305*b*, 305*c* shown in FIG. 3A. In some embodiments, although not shown, the microstructures 905*a*, 905*b*, 950*c*, etc., may be the slanted microstructures shown in FIGS. 5A-6D or FIG. 7. The microstructures 905*a*, 905*b*, 905*c*, etc. may define a plurality of grooves 906, as shown in FIG. 9A. The substrate 910 may be transparent and/or reflective in the visible wavelength band (about 380 nm to about 700 nm). In some embodiments, the substrate 910 may also be transparent and/or reflective in some or all of the infrared ("IR") wavelength band (about 700 nm to about 1 mm). The substrate 910 may include an organic and/or inorganic material that is substantially transparent to the light of the above-listed wavelength ranges. In some embodiments, the substrate 910 may be a rigid waveguide plate based on a material including, for example, a glass, a plastic, a sapphire, etc. In some embodiments, the substrate 910 may be a flexible or stretchable substrate based on a material including, for example, an elastomer, which may facilitate tuning of a pitch of the SRG 905, thereby enabling the applications of the fabricated diffractive optical element for different incident wavelengths or for steering light beams.

In some embodiments, the SRG 905 may be fabricated based on an organic material, such as a polymer, photo-crosslinkable polymeric and/or pre-polymeric compositions, a reactive mesogen ("RM"), or a combination thereof. In some embodiments, the SRG 905 may be fabricated based on an inorganic material, such as an inorganic material for manufacturing metasurfaces. In some embodiments, the materials of the SRG 905 may be isotropic, such as an amorphous polymer. In some embodiments, the materials of the SRG 905 may be anisotropic, e.g., liquid crystal polymers, or reactive mesogens ("RMs"). In some embodiments, the SRG 905 may be nanofabricated from a resist material that may be at least partially transparent (e.g., fully transparent or partially transparent) to lights in a range of electromagnetic frequencies, such as lights in the visible wavelength band. The resist material may be in a form of a thermoplastic, a polymer, an optically transparent photoresist, or a combination thereof. In some embodiments, after being set or cured, the resist material may provide an alignment for an optically anisotropic material disposed in the grooves 906 of the SRG 905. That is, the SRG 905 may function as an alignment layer for an optically anisotropic material disposed in the grooves 906 of the SRG 905. Various alignment patterns and features (e.g., sub-10 nm) of the SRG 905 may be formed using the nanofabrication techniques, which allows for the creation of an alignment pattern of the optically anisotropic material with high customizability.

Figure 9B:
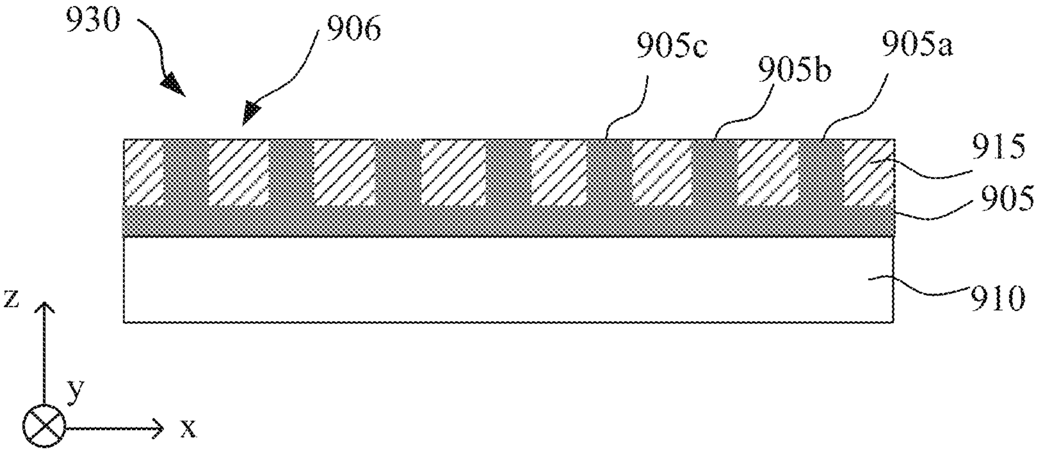

After the SRG 905 is disposed at (e.g., bonded to or formed on) the substrate 910, as FIG. 9B shows, a layer of an optically anisotropic material 915 may be disposed (e.g., formed, or coated) on the SRG 905. The optically anisotropic material 915 may at least partially fill the grooves 906 of the SRG 905. The optically anisotropic material 915 may include polymerizable pre-polymeric compositions or polymerizable liquid crystal ("LC") precursors. In some embodiments, the polymerizable liquid crystal precursors may include reactive mesogens ("RMs") that are polymerizable molecules with optical properties similar to those of LC materials. Due to the alignment pattern provided by the SRG 905, the optically anisotropic material 915 may be aligned in the grooves 906 of the SRG 905, in accordance with the alignment pattern. For example, molecules of the optically anisotropic material 915 may be homeotropically aligned, homogeneously aligned, or aligned in a hybrid manner (for example, some molecules may be homeotropically aligned and some other molecules may be homogeneously aligned) within the grooves 906 of the SRG 905. In some embodiments, the molecules of the optically anisotropic material 915 may be aligned within the grooves 906 of the SRG 905 by a suitable aligning method, such as a stretch, a light (e.g., photoalignment), an electric field, or a combination thereof. The optically anisotropic material 915 may be aligned to exhibit a first principal refractive index in a groove direction (e.g., y-direction) of the SRG 905 and a second principal refractive index in an in-plane direction (e.g., x-direction) perpendicular to the groove direction. One of the first principal refractive index or the second principal refractive index may substantially match with a refractive index of the SRG 905, and the other one of the first principal refractive index or the second principal refractive index may not match with the refractive index of the SRG 905. Then the aligned optically anisotropic material 915 may be polymerized, for example, thermo- or photo-polymerized, to stabilize the alignment or orientation of the molecules of the optically anisotropic material 915. As a result, a passive diffractive optical element that may be indirectly switched via an external polarization rotator may be fabricated.

Figure 9C:
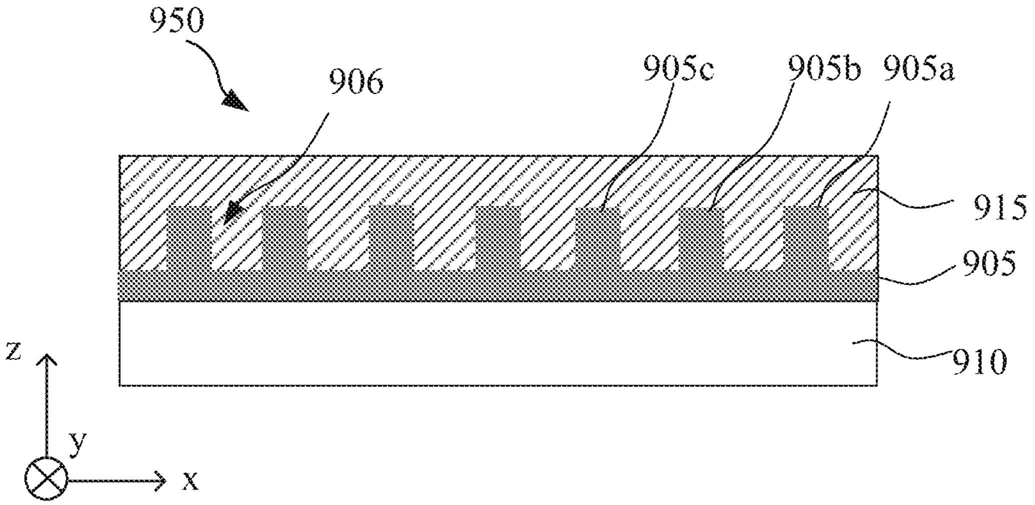
Figure 9D:
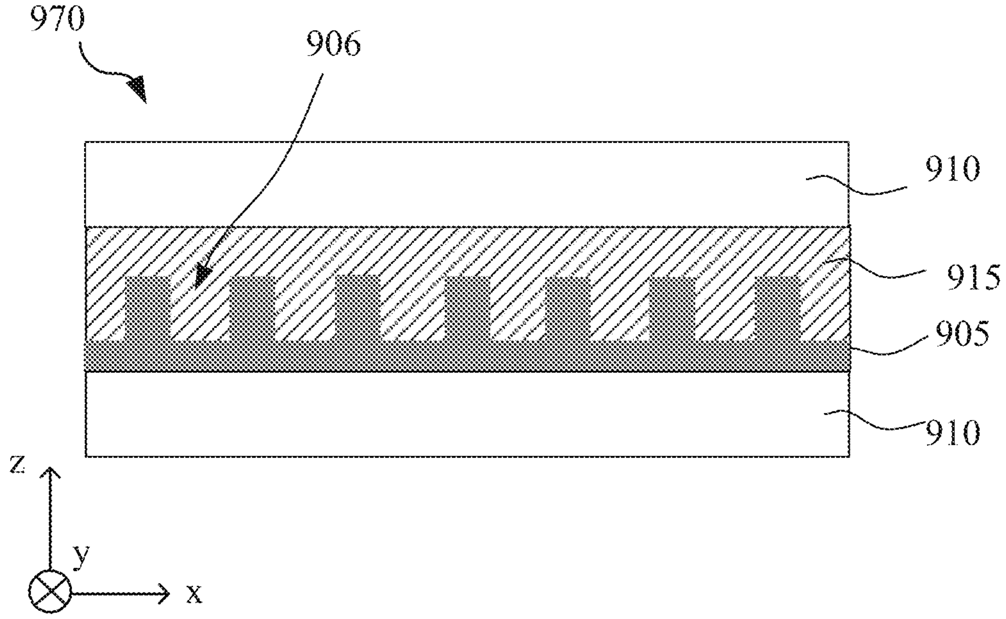

In some embodiments, as shown in FIG. 9B, in a fabricated single-substrate diffractive optical element 930, the thickness of the layer of the optically anisotropic material 915 may be the same as the depth of the grooves 906 of the SRG 905. In some embodiments, as shown in FIG. 9C, in a fabricated single-substrate diffractive optical element 950, the thickness of the layer of the optically anisotropic material 915 may be greater than the depth of the grooves of the SRG 905. The optically anisotropic material 915 disposed over the top surface of the grooves 906 of the SRG 905 may be uniform and may not contribute to the diffraction. In some embodiments, the substrate 910 may be removed after the passive diffractive optical element is fabricated. In some embodiments, as shown in FIG. 9D, a fabricated diffractive optical element 950 may include two substrates 910 (e.g., upper and lower substrates 910) for support and protection purpose.

Figure 10A:
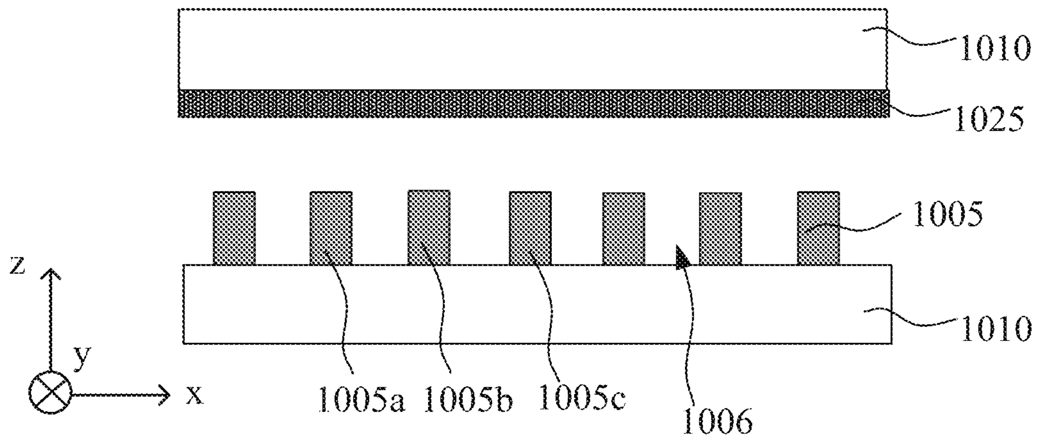
FIGS. 10A-10C illustrate schematic diagrams showing processes of fabricating a passive diffractive optical element, according to another embodiment of the present disclosure.
Figure 10B:
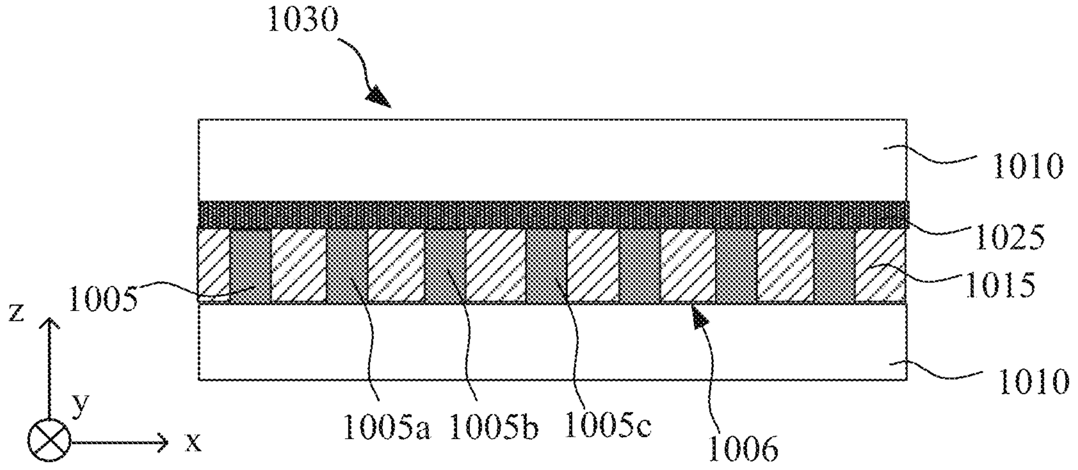
Figure 10C:
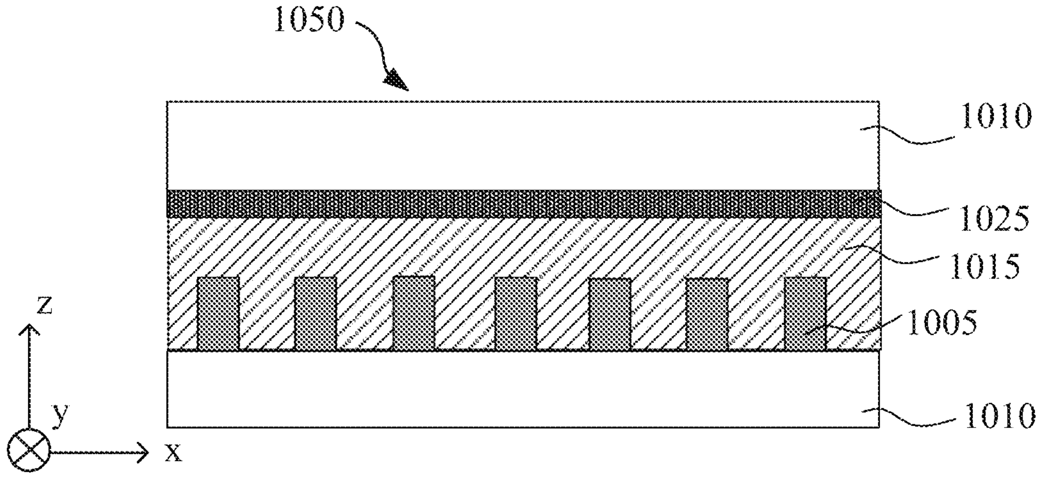

FIGS. 10A-10C illustrate schematic processes of fabricating a passive diffractive optical element, according to another embodiment of the present disclosure. The similarities between the processes shown in FIGS. 9A-9D and FIGS. 10A-10C are not repeated. As shown in FIG. 10A, first, an upper substrate 1010 provided with an alignment layer 1025 and a lower substrate 1010 provided with an SRG 1005 may be assembled to form a cell. The SRG 1005 may include a plurality of microstructures 1005*a*, 1005*b*, 1005*c*, etc., which may be in the forms of the microstructures shown in FIG. 3A, the slanted microstructures shown in FIG. 5A, or the microstructures shown in FIG. 7 with a varying periodicity. The microstructures 1005*a*, 1005*b*, 1005*c*, etc. may define a plurality of grooves 1006, which may be in the forms of the grooves 306 shown in FIG. 3A, the grooves 506 shown in FIG. 5A, or the grooves 706*a*-706*h* shown in FIG. 7. For illustrative purposes, the microstructures and grooves are shown to be similar to those shown in FIG. 3A.

The alignment layer 1025 may provide a uniform homeotropic or homogeneous alignment to an optically anisotropic material to be filled into the grooves 1006 of the SRG 1005 in the next step. As shown in FIG. 10B, after the cell is assembled, an optically anisotropic material 1015 may be filled into the grooves 1006 of the SRG 1005. The optically anisotropic material 1015 may be similar to the optically anisotropic material 915 shown in other figures (e.g., FIGS. 9B and 9C). The optically anisotropic material 1015 may be aligned by the alignment layer 1025 to exhibit, for example, a first principal refractive index in a groove direction (e.g., y-direction) of the grooves 1006 of the SRG 1005 and a second principal refractive index in an in-plane direction (e.g., x-direction) perpendicular to the groove direction. One of the first principal refractive index or the second principal refractive index may substantially match with a refractive index of the SRG 1005, and the other one of the first principal refractive index or the second principal refractive index may not match with the refractive index of the SRG 1005. Then the aligned optically anisotropic material 1015 may be polymerized to stabilize the alignment or orientation of the molecules of the optically anisotropic material 1015, and a passive diffractive optical element may be fabricated. In some embodiments, as shown in FIG. 10B, in a fabricated diffractive optical element 1030, the thickness of the layer of the optically anisotropic material 1015 may be the same as the depth of the grooves of the SRG 1005. In some embodiments, as shown in FIG. 10C, in a fabricated diffractive optical element 1050, the thickness of the layer of the optically anisotropic material 1015 may be greater than the depth of the grooves of the SRG 1005. In some embodiments, the optically anisotropic material 1015 disposed over the top surface of the grooves of the SRG 1005 may also be aligned by the alignment layer 1025.

Indirectly switchable gratings (which may be passive gratings in some embodiments) in accordance with an embodiment of the present disclosure may enable time-multiplexing and/or polarization-multiplexing of a plurality of different portions of the image light delivered by one or more waveguides. The different portions of the image light may include, e.g., single-color/monochromatic images of different colors, different portions of an FOV of a multi-color/polychromatic image (e.g., a full-color image), different portions of an FOV of a single-color/monochromatic image, etc. An FOV provided the waveguides is typically limited by the angular bandwidth of gratings, as well as the angular limitation of waveguides that may be determined by refractive indices of the waveguides. One method to expand an FOV is to split the FOV into several portions and to deliver the portions by different gratings or sets of gratings in a time-multiplexing manner and/or a polarization-multiplexing. To reduce or mitigate crosstalk between the gratings, the portions of the image light corresponding to different portions of the FOV may be delivered in different time frames, e.g., in a time-multiplexing manner. Exemplary assemblies or systems configured to deliver a plurality of different portions of the image light to an eye-box in a time-multiplexing manner and/or a polarization-multiplexing manner will be described. The following exemplary assemblies or systems may be referred to as a "symmetrical" configuration, in which a pair of an in-coupling grating and an out-coupling grating (or a pair of an in-coupling sub-grating and an out-coupling sub-grating) are configured to deliver respective portions of an image light to an eye-box. The grating vectors of the in-coupling grating/sub-grating and one out-coupling grating/sub-grating may satisfy the condition $\vec{k}_{in}+\vec{k}_{out}$=null vector, where $\vec{k}_{in}$ represents a grating vector of the in-coupling grating/sub-grating, and $\vec{k}_{out}$ represents a grating vector of the out-coupling grating/sub-grating. That is, a vector sum of the grating vectors of the gratings/sub-gratings which direct respective portions of an image light into and out of a waveguide may be substantially equal to zero. In the "symmetrical" configuration the FOV may not be rotated after translation through the waveguide. Indirectly switchable gratings (which may be passive gratings in some embodiments) in accordance with an embodiment of the present disclosure may be included in the in-coupling grating and/or the out-coupling grating to allow for expansion of the FOV by time-multiplexing and/or polarization-multiplexing different portions of the FOV. The FOV may be delivered in a time-multiplexing manner by the indirectly switchable gratings (which may be passive gratings in some embodiments) arranged in different configurations. For example, a plurality of gratings may be tiled at a common waveguide, or stacked at a common waveguide or different waveguides. Similar principles may be applied to delivering single-color images of different colors.

Figure 11A:
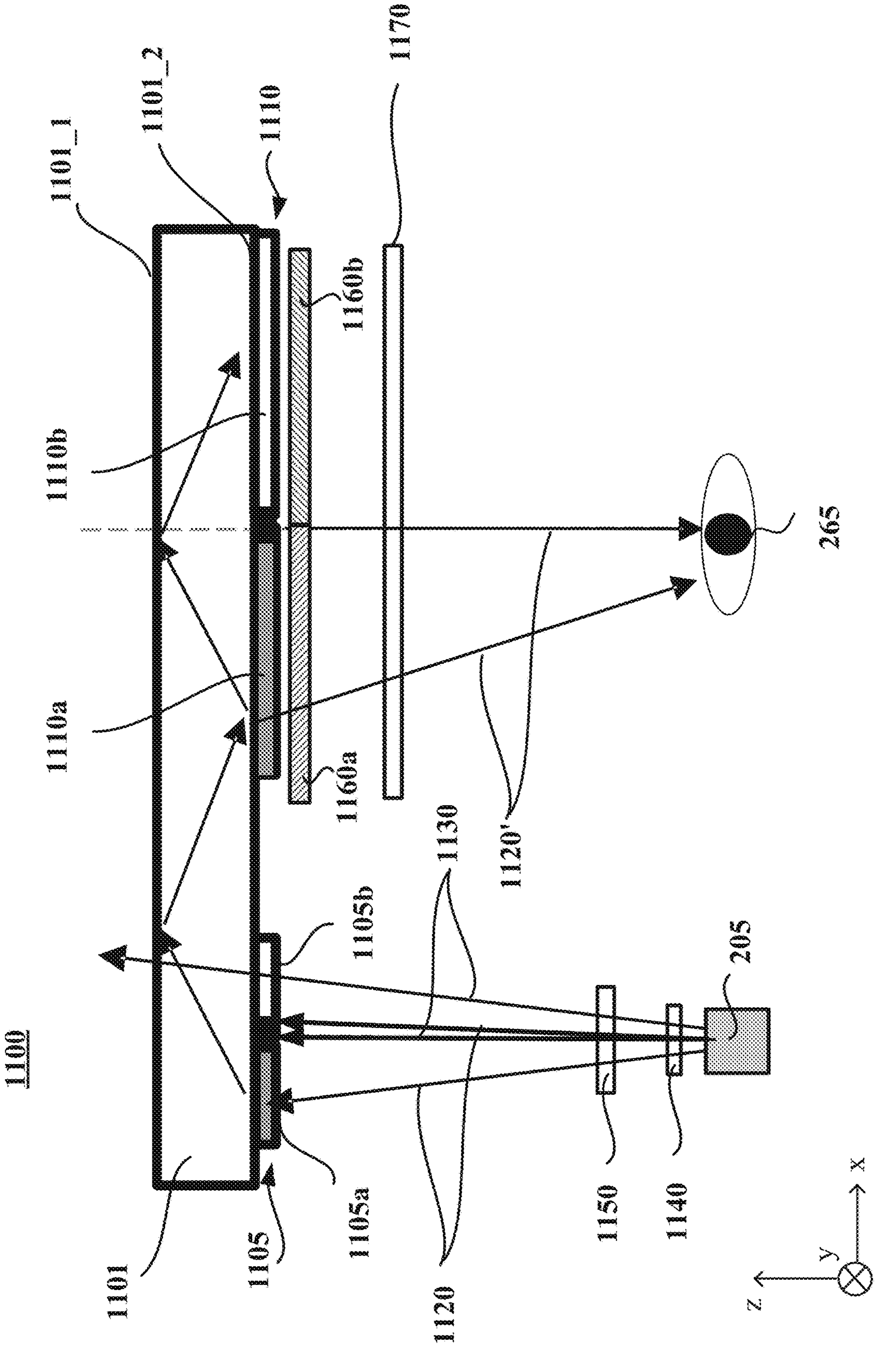
FIGS. 11A-11B illustrate an optical system including a waveguide configured to deliver different portions of a field of view ("FOV") in a time-multiplexing manner, according to an embodiment of the present disclosure.
Figure 11B:
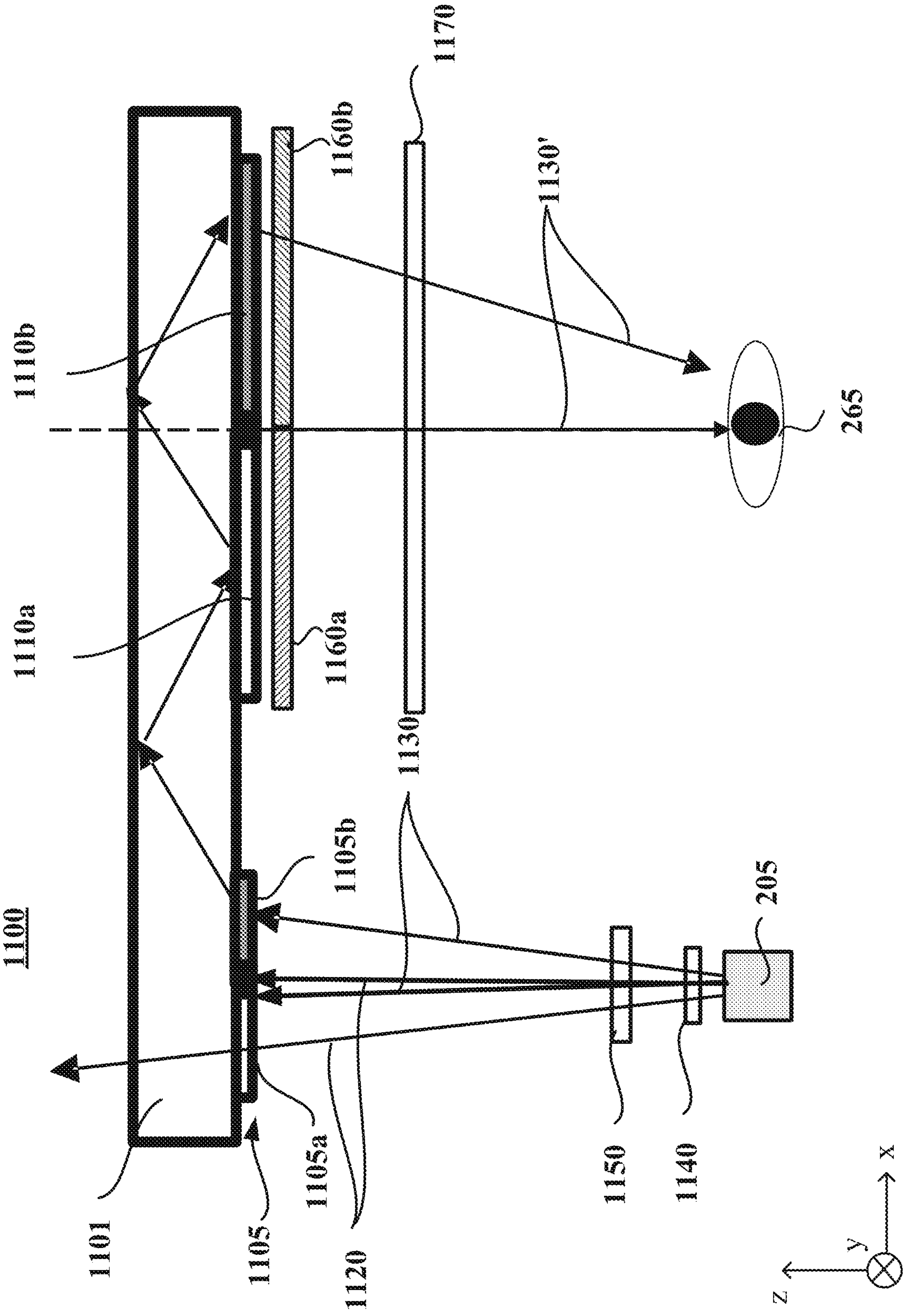

FIGS. 11A and 11B illustrate an optical system 1100 including a waveguide 1101 and a plurality of gratings coupled with the waveguide 1101, according to an embodiment of the present disclosure. The waveguide 1101 and the gratings may be configured to deliver different portions of an FOV in a time-multiplexing manner. In some embodiments, the optical system 1100 may also be referred to as a waveguide display system. The waveguide 1101 may be an embodiment of any other disclosed waveguide, such as the waveguide 210 shown in FIGS. 2A and 2B. As shown in FIG. 11A, the waveguide 1101 may be configured to receive an image light from the light source assembly 205 via an in-coupling grating 1105, and guide the image light toward the eye 265 via an out-coupling grating 1110. The in-coupling grating 1105 and the out-coupling 1110 may be coupled with the waveguide 1101 at different portions of the waveguide 1101. At least one (e.g., each) of the in-coupling grating 1105 or the out-coupling grating 1110 may be or may include an embodiment of the disclosed indirectly switchable gratings (which may be passive gratings in some embodiments). At least one (e.g., each) of the in-coupling grating 1105 or the out-coupling grating 1110 may include one or more sub-gratings that may overlap with (e.g., at least partially overlap with) one another to provide a continuous FOV. For example, the sub-gratings may be disposed at different planes in the grating, such that the neighboring sub-gratings may partially overlap with one another. A space around the sub-gratings may be at least partially filled with an index-matching material, which may suppress the light reflection in the space. Exemplary overlapping configurations of the sub-gratings will be explained below with reference to FIGS. 12D and 12E.

Referring to FIG. 11A, the in-coupling grating 1105 may include a plurality of sub-gratings 1105*a* and 1105*b* (or referred to as a first in-coupling sub-grating 1105*a* and a second in-coupling sub-grating 1105*b*). The out-coupling grating 1110 may include a plurality of sub-gratings 1110*a* and 1110*b* (or referred to as a first out-coupling sub-grating 1110*a* and a second out-coupling sub-grating 1110*b*). The sub-gratings 1105*a* and 1105*b* of the in-coupling grating 1105 may correspond to the sub-gratings 1110*a* and 1110*b* of the out-coupling grating 1110 on a one-to-one basis. Any suitable number of sub-gratings may be included in the in-coupling grating 1105. Any suitable number of sub-gratings may be included in the out-coupling grating 1110. The number of the sub-gratings included in the respective in-coupling grating 1105 and the out-coupling grating 1110 may correspond to the number of portions of the FOV that is split or divided. The sub-gratings included in the in-coupling grating 1105 and out-coupling grating 1110 may be disposed at a first surface 1101_1 and/or a second surface 1101_2 of the waveguide 1101. The sub-gratings 1105*a* and 1105*b* of the in-coupling grating 1105 may be disposed at the same surface or different surfaces of the waveguide 1101. The sub-gratings 1110*a* and 1110*b* of the out-coupling grating 1110 may be disposed at the same surface or different surfaces of the waveguide 1101. In some embodiments, the sub-gratings in each of the in-coupling grating 1105 and the out-coupling grating 1110 may be arranged in a one-dimensional grating pattern to tile the FOV in one dimension.

For discussion purposes, the in-coupling grating 1105 and the out-coupling grating 1110 may be disposed at the second surface 1101_2 of the waveguide 1101, and both of the in-coupling grating 1105 and the out-coupling grating 1110 may be an embodiment of the disclosed indirectly switchable gratings (which may be passive gratings in some embodiments). The first in-coupling sub-grating 1105*a* and the second in-coupling sub-grating 1105*b* of the in-coupling grating 1105 may be configured to operate in the diffraction state in response to incoming lights with two orthogonal polarizations. The first out-coupling sub-grating 1110*a* and the second out-coupling sub-grating 1110*b* of the out-coupling grating 1110 may correspond to the first in-coupling sub-grating 1105*a* and the second in-coupling sub-grating 1105*b*, respectively. The first out-coupling sub-grating 1110*a* and the second out-coupling sub-grating 1110*b* may have the same polarization selectivity as the first in-coupling sub-grating 1105*a* and the second in-coupling sub-grating 1105*b*, respectively. An in-coupling sub-grating and a corresponding out-coupling sub-grating may be considered as a pair of sub-gratings configured to transfer a predetermined portion of the FOV. Each pair of the in-coupling sub-grating and the out-coupling sub-grating may have a substantially same grating period to satisfy the condition $\vec{k}_{in}+\vec{k}_{out}$=null vector.

The light source assembly 205 may emit an image light from a light source (e.g., a display) toward the in-coupling grating 1105. In some embodiments, the image light may be an unpolarized image light, and a linear polarizer 1140 may be disposed between the light source assembly 205 and the waveguide 1101 to convert the unpolarized image light into a linearly polarized image light having a predetermined polarization. In some embodiments, a polarization rotator or polarization switch 1150 may be disposed between the linear polarizer 1140 and the waveguide 1101. The polarization switch 1150 may be an active element configured to switch the polarization of the linearly polarized image light received from the linear polarizer 1140 between two orthogonal polarizations in accordance with an operation state (e.g., switching or non-switching state) of the polarization switch 1150. The polarization switch 1150 may be similar to the polarization switch 820 shown in FIGS. 8A and 8B.

The image light emitted from the light source assembly 205 may include rays corresponding to different portions of the FOV of the display. In the embodiment shown in FIGS. 11A and 11B, the FOV may include two portions: a left portion and a right portion. As shown in FIGS. 11A and 11B, an angular range encompassed by rays 1120 and an angular range encompassed by rays 1130 may correspond to the left portion and the right portion of the FOV provided by the image light, respectively. In some embodiments, a display frame may be divided into two consecutive subframes (e.g., a first subframe and a second subframe) for sequential transmission of rays corresponding to different portions of the FOV provided by the image light, thereby realizing sequential transmission of different portions of the FOV in a time-multiplexing manner.

For discussion purposes, the linear polarizer 1140 may convert an unpolarized image light emitted from the light source assembly 1140 to a linearly polarized image light having a first polarization (e.g., polarized in the x-direction shown in FIG. 11A). When the polarization switch 1150 operates at a switching state, the polarization switch 1150 may convert the linearly polarized image light having the first polarization to a linearly polarized image light having a second polarization (e.g., polarized in the y-direction shown in FIG. 11A). When the polarization switch 1150 operates at a non-switching state, the polarization switch 1150 may maintain the polarization of the linearly polarized image light having the first polarization. The first in-coupling sub-grating 1105*a* and the first out-coupling sub-grating 1110*a* may be configured to diffract a linearly polarized light having the first polarization and transmit a linearly polarized light having the second polarization. The second in-coupling sub-grating 1105*b* and the second out-coupling sub-grating 1110*b* may be configured to diffract a linearly polarized light having the second polarization and transmit a linearly polarized light having the first polarization. In some embodiments, the light source assembly 205 may emit a linearly polarized image light having a first polarization (e.g., polarized in the x-direction shown in FIG. 11A) or a second polarization (e.g., polarized in the y-direction shown in FIG. 11A) orthogonal to the first polarization, and the linear polarizer 1140 may be omitted. The power efficiency of the optical system 1100 may be improved.

During the first subframe of a display frame, referring to FIG. 11A, the polarization switch 1150 may be configured to operate in the non-switching state to transmit linearly polarized image lights having the first polarization (e.g., polarized in the x-direction shown in FIG. 11A) received from the linear polarizer 1140 without affecting the polarization. Thus, the linearly polarized image lights having the first polarization may be diffracted by the first in-coupling sub-grating 1105*a*, and may be transmitted through the second in-coupling sub-grating 1105*b* with negligible or no diffraction. Thus, the image lights in the angular range encompassed by the rays 1120 may be coupled into a TIR path inside the waveguide 1101 via the first in-coupling sub-grating 1105*a* and may propagate inside the waveguide 1101 via TIR. The image lights propagating inside the waveguide 1101 may be coupled out of the waveguide 1101 via the first out-coupling sub-grating 1110*a* into an angular range encompassed by rays 1120', which may be received by the eye 265. The image lights in the angular range encompassed by the rays 1130 may not be coupled into a TIR path inside the waveguide 1101. The angular range encompassed by the rays 1120' may correspond to the left portion of the FOV.

During the second subframe of the display frame, referring to FIG. 11B, the polarization switch 1150 may be configured to operate in the switching state to convert linearly polarized image lights having the first polarization (e.g., polarized in the x-direction shown in FIG. 11B) into linearly polarized image lights having the second polarization (e.g., polarized in the y-direction shown in FIG. 11B) toward the in-coupling grating 1105. Thus, the linearly polarized image light having the second polarization may be diffracted by the second in-coupling sub-grating 1105*b*, and may be transmitted by the first in-coupling sub-grating 1105*a* with negligible or no diffraction. Accordingly, the image lights in the angular range encompassed by the rays 1130 may be coupled into a TIR path inside the waveguide 1101 via the second in-coupling sub-grating 1105*b*, and coupled out of the waveguide 1101 via the second out-coupling sub-grating 1110*b* into an angular range encompassed by rays 1130', which may be received by the eye 265. The image lights in the angular range encompassed by the rays 1120 may not be coupled into a TIR path inside the waveguide 1101. The angular range encompassed by the rays 1130' may correspond to the right portion of the FOV.

Thus, by sequentially switching the polarization switch 1150 between the switching state and the non-switching state in two consecutive subframes in a display frame, the two pairs of the in-coupling and out-coupling sub-gratings may be switched to the diffraction state in the consecutive, adjacent subframes, respectively. Through this configuration, a sequential transmission of different portions of the FOV via a common waveguide may be realized by tiling the FOV. Further, a time-multiplexing scheme realized through the disclosed indirectly switchable gratings (which may be passive gratings in some embodiments) may eliminate cross-talk between the sub-gratings configured for tiling the FOV.

Referring back to FIG. 11A, in some embodiments, a pair of polarizers 1160*a* and 1160*b* may be disposed at a side of the out-coupling grating 1110 facing the eye 265 to suppress ghost images, which may be caused by diffraction of light by the sub-gratings configured for different portions of the FOV. The polarizers 1160*a* and 1160*b* may be also referred to as clean-up polarizers. The polarizers 1160*a* and 1160*b* may cover a light exiting area of the first out-coupling sub-grating 1110*a* and the second out-coupling sub-grating 1110*b*, respectively. The polarizer 1160*a* may be configured to transmit the linearly polarized image lights coupled out from the waveguide 1101 by the first out-coupling sub-grating 1110*a*, and block the linearly polarized image lights coupled out from the waveguide 1101 by the second out-coupling sub-grating 1110*b*. The polarizer 1160*b* may be configured to transmit the linearly polarized image lights coupled out from the waveguide 1101 by the second out-coupling sub-grating 1110*b*, and block the linearly polarized image lights coupled out from the waveguide 1101 by the first out-coupling sub-grating 1110*a*. That is, the polarizers 1160*a* and 1160*b* may be oriented to have orthogonal transmission axes. Thus, when transmitting an image light corresponding to the left portion of the FOV via the first in-coupling sub-grating 1105*a*, the waveguide 1101, and the first out-coupling sub-grating 1110*a*, the ghost images caused by lights diffracted by the second in-coupling sub-grating 1105*b* and/or the second out-coupling sub-grating

1110*b* configured for the right portion of the FOV may be suppressed. In some embodiments, the polarizers 1160*a* and 1160*b* may be omitted.

Likewise, when transmitting an image light corresponding to the right portion of the FOV via the second in-coupling sub-grating 1105*b*, the waveguide 1101, and the second out-coupling sub-grating 1110*b*, the ghost images caused by lights diffracted by the first in-coupling sub-grating 1105*a* and/or the first out-coupling sub-grating 1110*a* configured for the left portion of the FOV may be suppressed. That is, the ghost images caused by lights diffracted by the sub-gratings configured for different portions of the FOV may be suppressed. In some embodiments, a patterned polarizer, rather than the two polarizers 1160*a* and 1160*b*, may be disposed between the out-coupling grating 1110 and the eye 265 to suppress ghost images, which may be caused by diffraction of light by the sub-gratings configured for different portions of the FOV. The patterned polarizer may include two regions with different orthogonal transmission axes. The two regions may function in a manner similar to that of the polarizers 1160*a* and 1160*b*, respectively. In some embodiments, the patterned polarizer may be omitted.

In some embodiments, a polarization switch or a polarization rotator 1170 may be disposed at a surface of the out-coupling grating 1110 facing the eye 265 (or a surface of the pair of the polarizers 1160*a* and 1160*b*, or a surface of the patterned polarizer). For illustrative purposes, the polarization rotator 1170 is shown as separate from the polarizers 1160*a* and 1160*b*. The polarization rotator 1170 may be configured to convert the polarization of linearly polarized image lights corresponding to a portion of the FOV (e.g., the left or right portion) output from the out-coupling grating 1110 or the polarizers 1160*a* and 1160*b* into an orthogonal polarization, such that the image lights corresponding to a full FOV may have one polarization rather than two polarizations. For example, the polarization rotator 1170 operating at the switching state may be configured to convert the linearly polarized image lights having the first polarization to linearly polarized image lights having the second polarization. The polarization rotator 1170 operating at the non-switching state may maintain the polarization of the linearly polarized image lights having the second polarization, such that the image lights corresponding to the full FOV to be received by the eye 265 may have the second polarization.

FIG. 11A shows that both of the in-coupling grating 1105 and the out-coupling grating 1110 include one or more of the disclosed indirectly switchable gratings (which may be passive gratings in some embodiments), which are indirectly switchable via an external polarization switch. This configuration is for illustrative purposes and is not intended to limit the scope of the present disclosure. In some embodiments, one of the in-coupling grating 1105 or the out-coupling grating 1110 may include one or more of the disclosed indirectly switchable gratings (which may be passive gratings in some embodiments), and the other one of the in-coupling grating 1105 or the out-coupling grating 1110 may include one or more non-switchable passive gratings or directly switchable active gratings. For example, different portions of the FOV may be introduced into the waveguide by a non-switchable passive in-coupling grating. The out-coupling grating 1110 may include two out-coupling sub-gratings that may be indirectly switchable gratings (which may be passive gratings in some embodiments). The two out-coupling sub-gratings may be configured to operate in the diffraction state in response to incoming image lights with two orthogonal polarizations, respectively. A display frame may include two consecutive subframes. During the two consecutive subframes, the in-coupling grating 1105 may receive image lights with orthogonal polarizations (e.g., the first polarization and second polarization), respectively, and couple the image lights into the waveguide 1101. In at least one (e.g., each) of the two consecutive subframes, one of the first out-coupling sub-grating 1110*a* or the second out-coupling sub-grating 1110*b* may operate in the diffraction state to couple the image lights with a corresponding polarization out of the waveguide 1101, and the other one of the first out-coupling sub-grating 1110*a* or the second out-coupling sub-grating 1110*b* may operate in the non-diffraction state.

Referring back to FIGS. 11A and 11B, in some embodiments, the first in-coupling grating 1105*a*, the second in-coupling grating 1105*b*, the first out-coupling sub-grating 1110*a*, and the second out-coupling sub-grating 1110*b* may be configured to be substantially angularly selective and polarization selective, such that the optical system 1100 may deliver different portions of the FOV of the image light emitted from the light source assembly 205 to the eye-box simultaneously during a same time period (e.g., same display frame), e.g., in a polarization-multiplexing manner. The display frame may not be divided into sub-frames. For example, the first in-coupling grating 1105*a* and the first out-coupling sub-grating 1110*a* may be configured to diffract an image light having an angular range corresponding to the first portion (e.g., left portion) of the FOV and having the first polarization (e.g., polarized in the x-direction shown in FIG. 11A), and transmit an image light having an angular range corresponding to the second portion (e.g., right portion) of the FOV and having the second polarization (e.g., polarized in the y-direction shown in FIG. 11A) with negligible diffraction. The second in-coupling grating 1105*b* and the second out-coupling grating 1110*b* may be configured to diffract an image light having an angular range corresponding to the second portion (e.g., right portion) of the FOV and having the second polarization (e.g., polarized in the y-direction shown in FIG. 11A) into the waveguide 1101 via diffraction, and transmit an image light having an angular range corresponding to the first portion (e.g., left portion) of the FOV and having the first polarization (e.g., polarized in the x-direction shown in FIG. 11A) with negligible diffraction.

In some embodiments, the light source assembly 205 may emit an unpolarized image light toward the waveguide 1101. The polarizer 1140 and the polarization switch 1150 may be omitted. The unpolarized image light may include a first portion having an angular range corresponding to the first portion of the FOV of the unpolarized image light, and a second portion having an angular range corresponding to the second portion of the FOV of the unpolarized image light. Each of the first portion and the second portion of the unpolarized image light may include two components, a first component having the first polarization and a second component having the second polarization. When the unpolarized image light emitted by the light source assembly 205 is incident onto the first in-coupling grating 1105*a* and the second in-coupling grating 1105*b* simultaneously, an image light having an angular range corresponding to the left portion of the FOV (e.g., encompassed by the rays 1120) and having the first polarization (which is the first component of the first portion of the unpolarized image light) may be coupled into a TIR path inside the waveguide 1101 via the first in-coupling sub-grating 1105*a*, and coupled out of the waveguide 1101 via the first out-coupling sub-grating 1110*a* into an angular range encompassed by rays 1120' which may be received by the eye 265. The image light having an angular range corresponding to the right portion of the FOV (e.g., encompassed by the rays 1130) and having the second polarization (which is the second component of the second portion of the unpolarized image light) may be coupled into a TIR path inside the waveguide 1101 via the second in-coupling sub-grating 1105*b*, and coupled out of the waveguide 1101 via the second out-coupling sub-grating 1110*b* into an angular range encompassed by rays 1130', which may be received by the eye 265. At the output side of the waveguide 1101, the angular range encompassed by the rays 1120' may correspond to the left portion of the FOV, and the angular range encompassed by the rays 1130' may correspond to the right portion of the FOV. Thus, the two portions of the FOV of the unpolarized image light emitted by the light source assembly 205 may be delivered to the eye-box simultaneously.

Figure 12A:
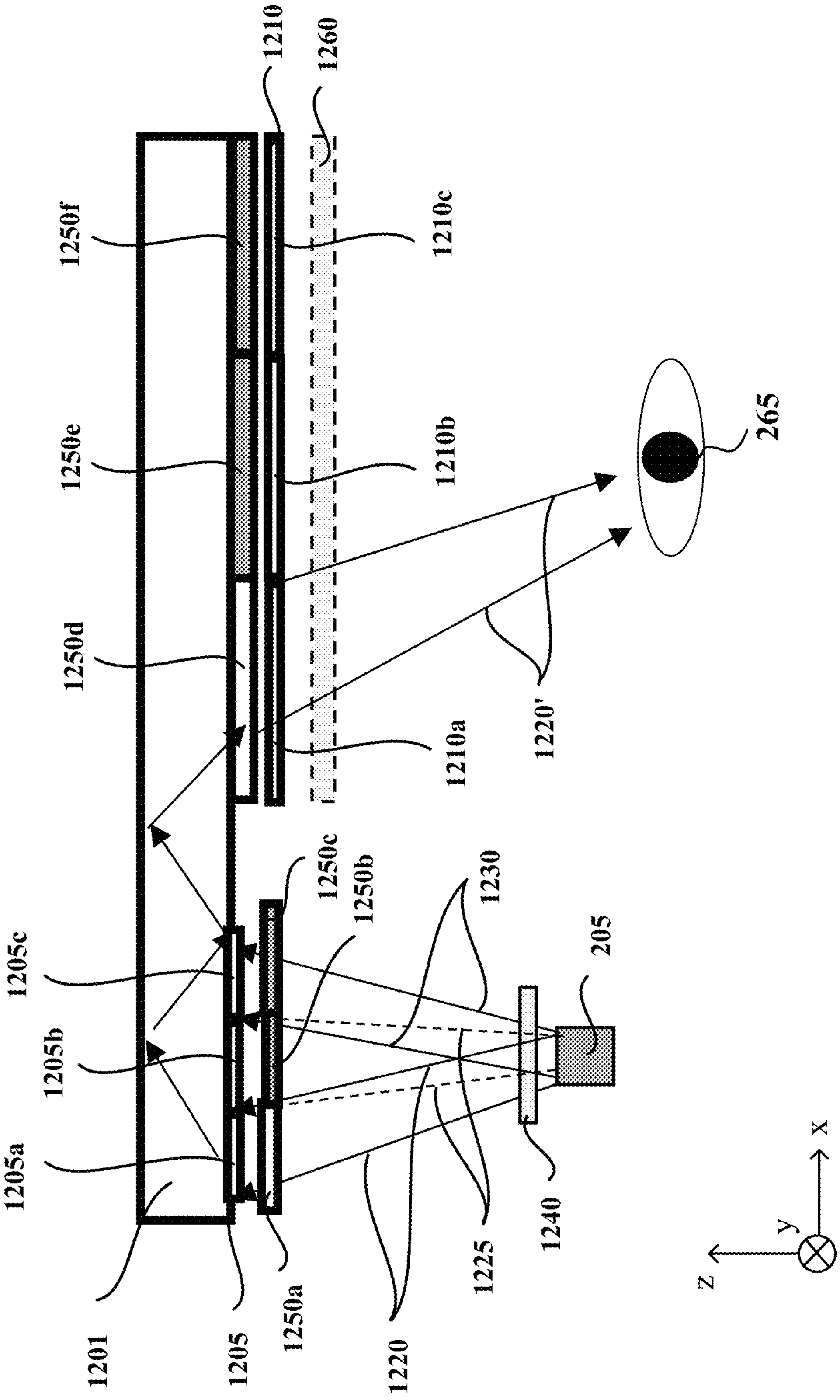
FIGS. 12A-12C illustrate an optical system including a waveguide configured to deliver different portions of the FOV in a time-multiplexing manner, according to another embodiment of the present disclosure.
Figure 12B:
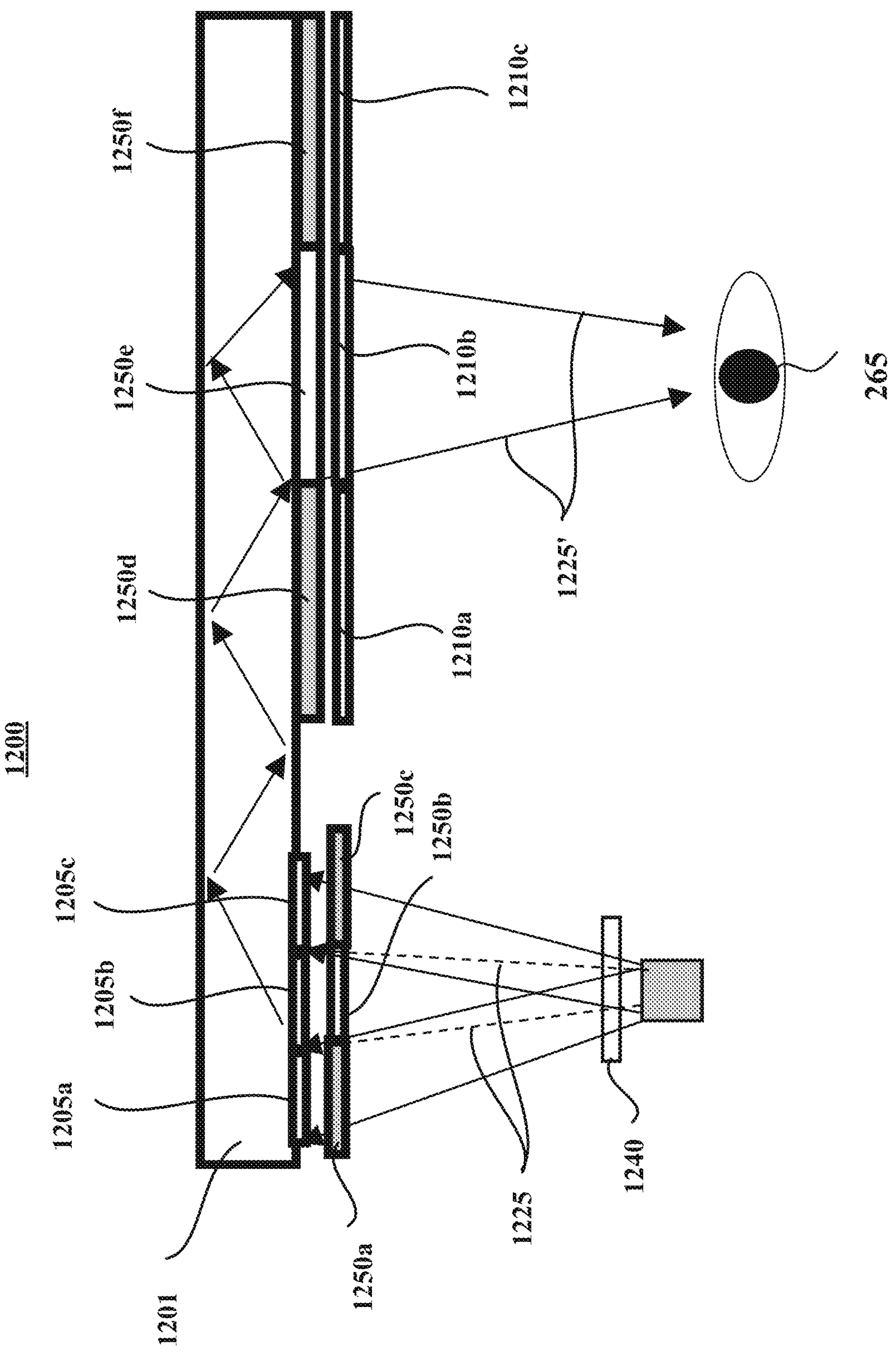
Figure 12C:
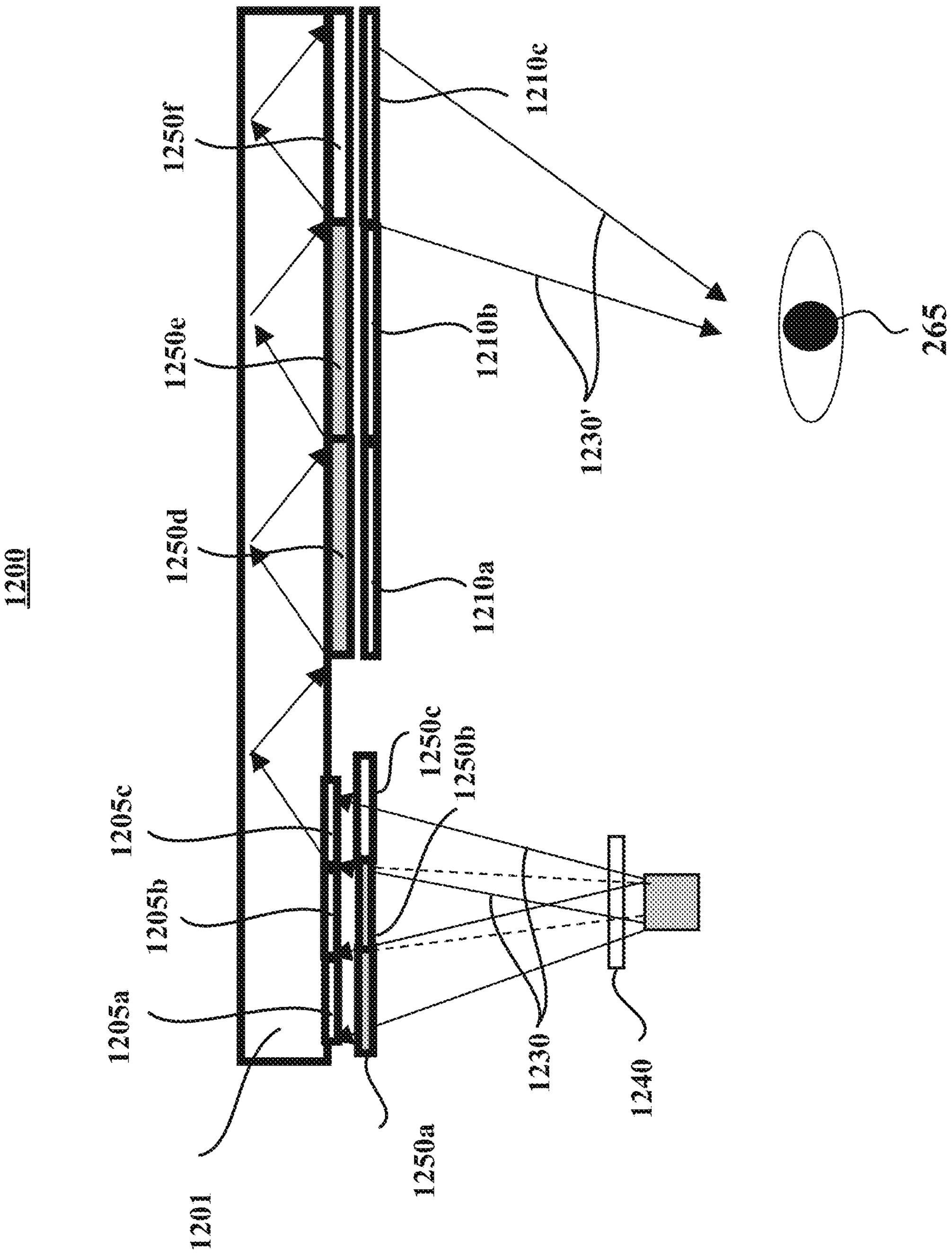

In some embodiments, the FOV may be divided into three portions, e.g., a left portion, a center portion, and a right portion, which may be transferred to the eye(s) through tiled in-coupling and out-coupling indirectly switchable gratings (which may be passive gratings in some embodiments). FIG. 12A-12C illustrate an optical system 1200 including a waveguide 1201 configured to deliver different portions of a full FOV in a time-multiplexing manner, according to another embodiment of the present disclosure. The waveguide 1201 may be an embodiment of the waveguide 210 shown in FIGS. 2A and 2B. Descriptions of the similar or the same structures and components between the embodiments shown in FIGS. 11A and 11B and the embodiments shown in FIGS. 12A-12C are not repeated. The gratings included in the embodiment shown in the optical system 1200 may be any of the disclosed indirectly switchable gratings (which may be passive gratings in some embodiments).

As shown in FIG. 12A, the waveguide 1201 may be configured to receive an image light from the light source assembly 205 via an in-coupling grating 1205 and may guide the image light toward the eye 265 via an out-coupling grating 1210. The in-coupling grating 1205 and the out-coupling grating 1210 may be coupled with the waveguide 1201. At least one of the in-coupling grating 1205 or the out-coupling grating 1210 may be an embodiment of the disclosed indirectly switchable gratings (which may be passive gratings in some embodiments). At least one (e.g., each) of the in-coupling grating 1205 or the out-coupling grating 1210 may include a plurality of sub-gratings configured to transfer predetermined portions of the FOV, respectively. An in-coupling sub-grating and a corresponding out-coupling sub-grating may be considered as a pair of sub-gratings configured to transfer a predetermined portion of the FOV. For example, the FOV may include three portions, a left portion, a center portion, and a right portion. The waveguide 1201 may include three pairs of sub-gratings. At least one (e.g., each) of the in-coupling grating 1205 or the out-coupling grating 1210 may include three sub-gratings configured to transfer the left, center, and right portions of the FOV, respectively. The neighboring portions of the FOV may partially overlap to form a continuous FOV at the eye 265. The partial overlapping of the neighboring portions of the FOV may be achieved, for example, by partially overlapping the sub-gratings in the recording material (e.g., an overlapping area of the sub-gratings configured to diffract lights of orthogonal polarizations may be multiplexed). At least one (e.g., each) of the sub-gratings may be coupled with a polarization switch, which may be configured to indirectly switch the at least one (e.g., each) of the sub-gratings between a diffraction state and a non-diffraction state. Polarization switches 1250*a* to 1250*f* may be disposed at a side of the corresponding sub-gratings from which the image light is incident onto the sub-gratings, thereby controlling the polarization of the image light before the image light is incident onto the corresponding sub-gratings. Thus, the polarization switches 1250*a* to 1250*f* may be configured to control the corresponding sub-gratings to operate at a diffraction state or a non-diffraction state. In some embodiments, each of the polarization switches 1250*a* to 1250*f* may be configured with a size that is substantially the same as the size of the corresponding sub-grating. Each of the polarization switches 1250*a* to 1250*f* may be aligned with the corresponding sub-grating. The neighboring in-coupling sub-gratings may partially overlap with one another, and the neighboring polarization switches corresponding to the neighboring in-coupling sub-gratings may partially overlap with one another. The neighboring out-coupling sub-gratings may partially overlap with one another, and the corresponding neighboring polarization switches corresponding to the neighboring out-coupling sub-gratings may partially overlap with one another. In some embodiments, the polarization switches 1250*a* to 1250*f* may be configured to have a substantially same size.

In some embodiments, as shown in FIGS. 12A-12C, the light source assembly 205 may emit an unpolarized image light having a predetermined FOV. In some embodiments, a linear polarizer 1240 may be disposed between the light source assembly 205 and the waveguide 1201 to convert the unpolarized image light into a linearly polarized image light. In some embodiments, the linearly polarized image light may be configured to have a first polarization (e.g., polarized in the x-direction shown in FIGS. 12A-12C) or a second polarization (e.g., polarized in the y-direction shown in FIGS. 12A-12C) orthogonal to the first polarization, according to the transmission axis of the linear polarizer 1240. A display frame may be divided into three subframes. During each respective subframe, respective pairs of sub-gratings may be sequentially configured to operate in a diffraction state via the corresponding polarization switches to transmit respective portions of the FOV via the waveguide 1201. During at least one (e.g., each) of the three subframes, one of the three pairs of sub-gratings may be configured to operate in the diffraction state to transmit a predetermined portion of the FOV, and the remaining pairs may be configured to operate in the non-diffraction state.

In some embodiments, the neighboring in-coupling sub-gratings coupled with the waveguide 1201 may be configured to selectively diffract lights having orthogonal polarizations, e.g., orthogonal linear polarizations. The neighboring out-coupling sub-gratings coupled with the waveguide 1201 may be configured to selectively diffract lights having orthogonal polarizations, e.g., orthogonal linear polarizations. In some embodiments, the pair of sub-gratings configured to transfer a predetermined portion of the FOV may be configured to diffract lights having a same first polarization, and transmit lights having a second polarization that is orthogonal to the first polarization with negligible diffraction. In some embodiments, during each subframe, a single pair of the in-coupling sub-grating and the out-coupling sub-grating may be configured to operate at the diffraction state, while the remaining pairs may be configured to operate at the non-diffraction state. The three portions of the FOV may be transmitted in a time sequential manner in three consecutive subframes, with a crosstalk between neighboring sub-gratings suppressed. The three portions of the FOV delivered to the eye 265 may have different polarizations.

For example, during a first subframe, referring to FIG. 12A, a first in-coupling sub-grating 1205*a* and a first out-coupling sub-grating 1210*a* may be indirectly switched to a diffraction state (or an ON state) via corresponding polarization switches 1250*a* and 1250*d*, respectively. The remaining sub-gratings may be switched to a non-diffraction state (or an OFF state) via corresponding polarization switches. Thus, image lights in an angular range encompassed by rays 1220 may be coupled into a TIR path inside the waveguide 1201 via the first in-coupling sub-grating 1205*a*, and coupled out of the waveguide 1201 via the first out-coupling sub-grating 1210*a* into an angular range encompassed by rays 1220', which may be received by the eye 265. Image lights in an angular range encompassed by rays 1225 and an angular range encompassed by rays 1230 may not be coupled into a TIR path inside the waveguide 1201. The angular range encompassed by the rays 1220' may correspond to the left portion of the FOV.

During a second subframe, referring to FIG. 12B, a second in-coupling sub-grating 1205*b* and a second out-coupling sub-grating 1210*b* may be indirectly switched to a diffraction state (or an ON state) via polarization switches 1250*b* and 1250*e*, respectively. The remaining sub-gratings may be switched to a non-diffraction state (or an OFF state) via corresponding polarization switches. Thus, image lights in an angular range encompassed by rays 1225 may be coupled into a TIR path in the waveguide 1201 via the second in-coupling sub-grating 1205*b*, and coupled out of the waveguide 1201 via the second out-coupling sub-grating 1210*b* into an angular range encompassed by rays 1225', which may be received by the eye 265. Image lights in the angular range encompassed by rays 1220 and an angular range encompassed by rays 1230 may not be coupled into a TIR path inside the waveguide 1201. The angular range encompassed by the rays 1225' may correspond to the center portion of the FOV.

During a third subframe, referring to FIG. 12C, a third in-coupling sub-grating 1205*c* and a third out-coupling sub-grating 1210*c* may be indirectly switched to a diffraction state (or an ON state) via polarization switches 1250*c* and 1250*f*, respectively. The remaining sub-gratings may be switched to a non-diffraction state (or an OFF state) via corresponding polarization switches. Thus, image lights in an angular range encompassed by rays 1230 may be coupled into a TIR path inside the waveguide 1201 via the third in-coupling sub-grating 1205*c*, and coupled out of the waveguide 1201 via the third out-coupling sub-grating 1210*c* into an angular range encompassed by rays 1230', which may be received by the eye 265. Image lights in the angular range encompassed by rays 1220 and an angular range encompassed by rays 1225 may not be coupled into a TIR path inside the waveguide 1201. The angular range encompassed by the rays 1230' may correspond to the right portion of the FOV.

Referring back to FIGS. 12A-12C, in some embodiments, the optical system 1200 may include a polarizer 1260 (e.g., a clean-up polarizer) disposed at a side of the out-coupling grating 1210 facing the eye 265 to reduce or eliminate ghost images. In some embodiments, the polarizer 1260 may be a patterned polarizer with local polarization directions corresponding to the polarizations of the respective portions of the FOV delivered by the corresponding pair of the sub-gratings. For example, the polarizer 1260 may be divided into three parts with different transmission axes orientations for different out-coupling sub-gratings. In some embodiments, the polarizer 1260 may be a uniform (e.g., unpatterned) polarizer, and additional polarization switches may be disposed between the polarizer 1260 and the out-coupling grating 1210 to convert the image lights out-coupled by the out-coupling sub-gratings to image lights having the same polarization.

In some embodiments, the neighboring in-coupling sub-gratings coupled with the waveguide 1201 may be configured to selectively diffract lights having orthogonal polarizations, e.g., orthogonal linear polarizations, and the neighboring out-coupling sub-gratings coupled with the waveguide 1201 may be configured to selectively diffract lights having the same polarization. Each out-coupling grating 1210*a*, 1210*c*, or 1210*c* may be controlled by the corresponding polarization switch 1250*d*, 1250*e*, or 1250*f* to operate in the diffraction state during the corresponding sub-frame. The three portions of the FOV delivered to the eye 265 may have the substantially same polarization. The polarizer 1260 may be configured to be a uniform (un-patterned) polarizer to reduce or eliminate ghost images. In some embodiments, the polarizer 1260 may be omitted.

Although not shown, in some embodiments, the FOV may include a suitable number of portions, e.g., four portions, or five portions, etc. The waveguide 1201 may include a suitable number of pairs of sub-gratings (e.g., four pairs, or five pairs, etc.) to transfer the suitable number of portions of the FOV. The neighboring portions of the FOV may partially overlap to form a continuous FOV at the eye 265. Accordingly, a display frame may be divided into a suitable number of subframes (e.g., four subframes, or five subframes, etc.). During each respective subframe, respective pairs of sub-gratings may be sequentially configured to operate in a diffraction state via the corresponding polarization switches to transmit respective portions of the FOV via the waveguide 1201.

In some embodiments, the light source assembly 205 may emit a linearly polarized image light having a first polarization (e.g., polarized in the x-direction shown in 12A-12C) or a second polarization (e.g., polarized in the y-direction shown in 12A-12C) orthogonal to the first polarization, and the linear polarizer 1340 may be omitted. The power efficiency of the optical system 1200 may be improved.

Figure 12D:
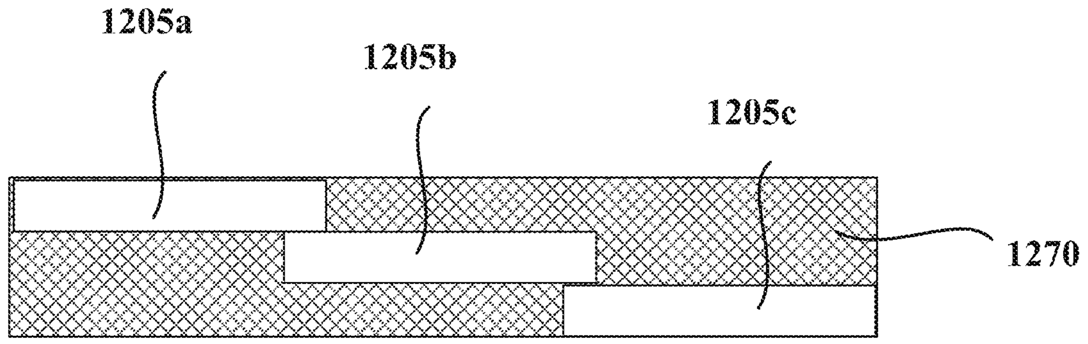
FIG. 12D illustrates a schematic diagram of an overlapping configuration of in-coupling sub-gratings coupled to the waveguide shown in FIG. 12A, according to an embodiment of the disclosure.
Figure 12E:
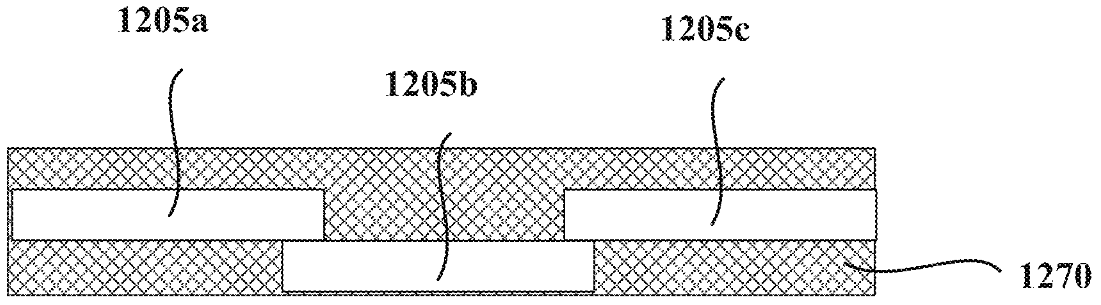
FIG. 12E illustrates a schematic diagram of an overlapping configuration of in-coupling sub-gratings coupled to the waveguide shown in FIG. 12A, according to another embodiment of the disclosure.

FIGS. 12D and 12E illustrate schematic diagrams of overlapping configurations of the in-coupling sub-gratings coupled to the waveguide 1201 shown in FIG. 12A. The sub-gratings may include any of the disclosed indirectly switchable gratings (which may be passive gratings in some embodiments). In some embodiments, one or more in-coupling sub-gratings may be disposed at different planes, such that neighboring in-coupling sub-gratings may partially overlap with one another. The space around the in-coupling sub-gratings may be at least partially filled with an index-matching material. In one embodiment, as shown in FIG. 12D, at least two (e.g., all three) of the in-coupling sub-gratings 1205*a*, 1205*b*, and 1205*c* may be disposed at different planes, such that at least two pairs of neighboring in-coupling sub-gratings may partially overlap with one another. A space around the in-coupling sub-gratings may be at least partially filled with an index-matching material 1270, such that light reflections may be suppressed within the space. In one embodiment, as shown in FIG. 12E, the first in-coupling sub-grating 1205*a* and the third in-coupling sub-grating 1205*c* may be disposed at the same plane, while the second in-coupling sub-grating 1205*b* may be disposed at a different plane, such that the neighboring in-coupling sub-gratings may partially overlap with one another. The overlapping configurations of the out-coupling sub-gratings coupled to the waveguide 1201 in FIG. 12A may be similar to those of the in-coupling sub-gratings illustrated in FIGS. 12D and 12E.

Figure 13A:
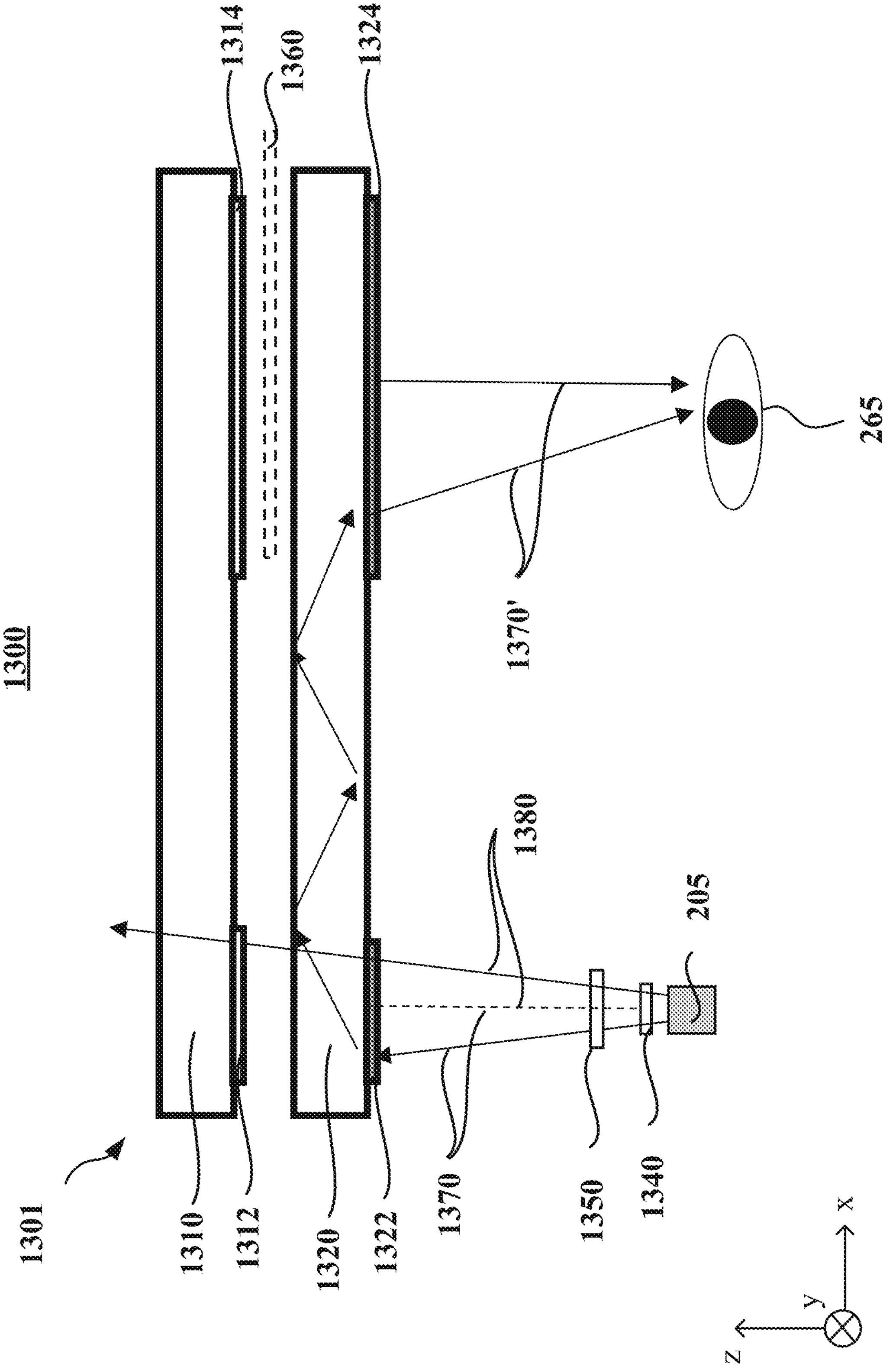
FIGS. 13A-13B illustrate an optical system including a waveguide stack configured to deliver different portions of an FOV in a time-multiplexing manner, according to an embodiment of the present disclosure.
Figure 13B:
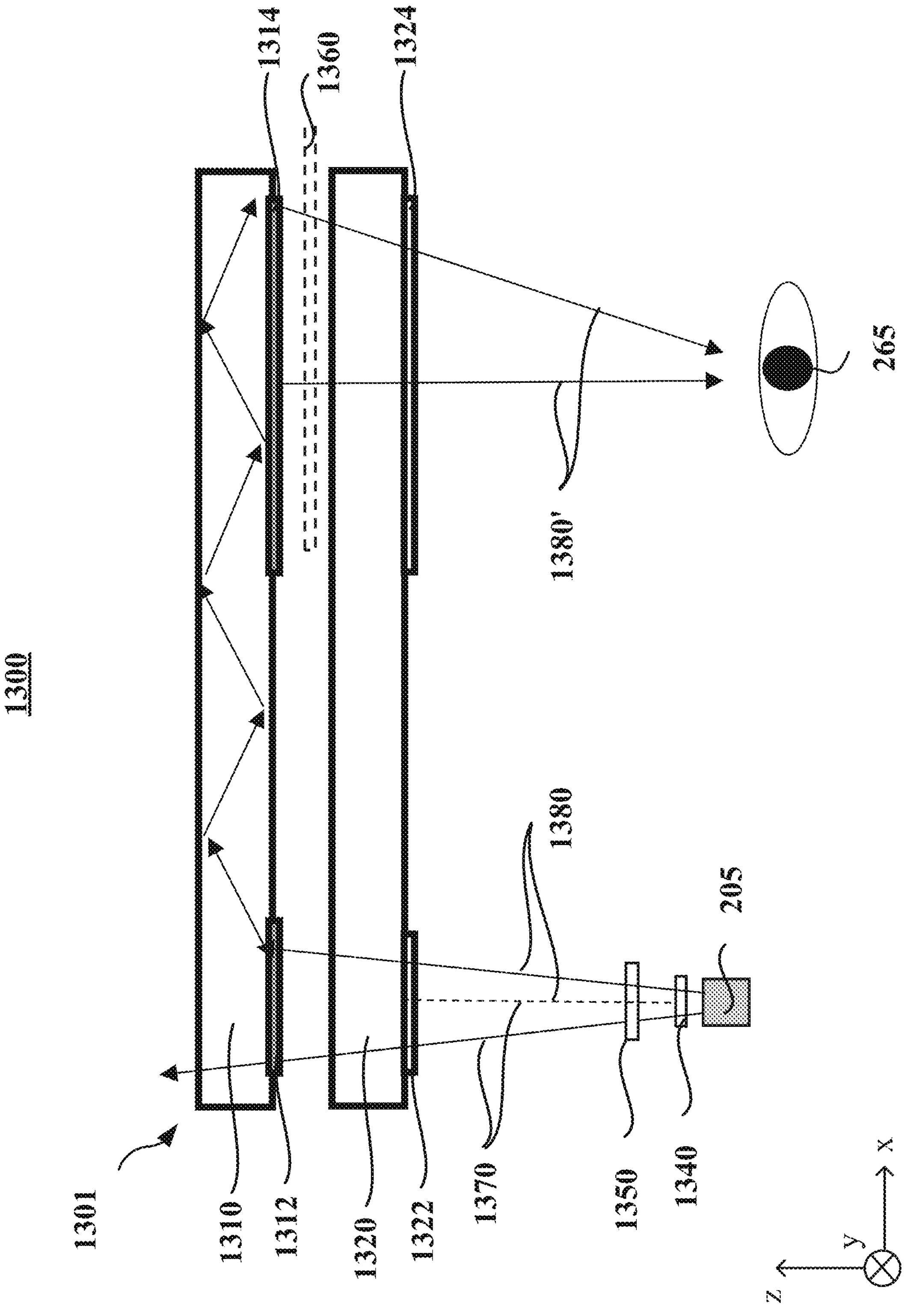

FIGS. 13A and 13B illustrate an optical system 1300 including a waveguide stack 1301 configured to deliver different portions of an FOV to an eye-box of the optical system 1300 in a time-multiplexing manner, according to an embodiment of the present disclosure. The waveguide stack 1301 may include a stack of waveguides, each may be similar to the waveguide 210 shown in FIGS. 2A-2B, the waveguide 1101 shown in FIG. 11A, or the waveguide 1201 shown in FIG. 12A. Descriptions of the same or similar structures and/or components between the embodiments shown in FIG. 2A, FIG. 11A, FIG. 12A, and FIG. 13A are not repeated. As shown in FIG. 13A, the waveguide stack 1301 may include a plurality of waveguides (e.g., two waveguides 1310 and 1320) stacked together. Other suitable number of waveguides may be used, such as three, four, five, etc. The waveguide 1310 may be coupled with an in-coupling grating 1312 and an out-coupling grating 1314. The waveguide 1320 may be coupled with an in-coupling grating 1322 and an out-coupling grating 1324. In some embodiments, for a wave guiding to take place in a waveguide, the waveguides 1310 and 1320 may be separated by air gaps. In some embodiments, the air gaps between the waveguides 1310 and 1320 may be at least partially filled with a material (e.g., a liquid glue) having a refractive index lower than that of the waveguides. Any of the gratings or sub-gratings included in the optical system 1300 may be an embodiment of any of the disclosed indirectly switchable gratings (which may be passive gratings in some embodiments).

The image light emitted from the light source assembly 205 may include rays corresponding to a left portion and a right portion of the FOV. An angular range encompassed by rays 1370 and an angular range encompassed by rays 1380 may correspond to the left portion and the right portion of the FOV of the image light, respectively. In some embodiments, a display frame of the image light may be divided into two subframes for sequential transmission of rays corresponding to different portions of the FOV, thereby realizing sequential transmission of two portions of the FOV in a time-multiplexing manner. In some embodiments, a display frame of the image light may be divided into two subframes for sequential transmission of rays corresponding to different portions of the FOV, thereby realizing sequential transmission of two portions of the FOV in a time-multiplexing manner.

At least one of the in-coupling gratings or the out-coupling gratings may be an embodiment of the disclosed indirectly switchable gratings (which may be passive gratings in some embodiments). The in-coupling gratings or the out-coupling gratings may be disposed at a first surface and/or a second surface of the respective waveguides. For discussion purposes, as shown in FIG. 13A, the in-coupling gratings and the out-coupling gratings coupled to the waveguide stack 1301 may be indirectly switchable gratings (which may be passive gratings in some embodiments), and may be disposed at the second surface of the respective waveguides. The in-coupling grating 1312 and in-coupling grating 1322 may be configured to diffract image lights having two predetermined orthogonal polarizations, respectively, e.g., a second polarization (e.g., polarized in the y-direction shown in FIG. 13A) and a first polarization (e.g., polarized in the x-direction shown in FIG. 13A). The out-coupling grating 1314 and the out-coupling grating 1324 may have the same polarization selectivity as the in-coupling grating 1312 and in-coupling grating 1322, respectively.

In some embodiments, the light source assembly 205 may emit an unpolarized image light. A linear polarizer 1340 may be disposed between the light source assembly 205 and the waveguide stack 1301 to convert the unpolarized image light into a linearly polarized image light having a first polarization (e.g., polarized in the x-direction shown in FIG. 13A) or a second polarization (e.g., polarized in the y-direction shown in FIG. 13A) orthogonal to the first polarization. A polarization rotator or polarization switch 1350 may be disposed between the linear polarizer 1340 and the waveguide stack 1301. The polarization switch 1350 may be an active element configured to switch the polarization of the linearly polarized image light received from the linear polarizer 1340 between the first polarization and the second polarization in accordance with an operation state (e.g., switching or non-switching state) of the polarization switch 1350. In some embodiments, the light source assembly 205 may emit a linearly polarized image light having a first polarization (e.g., polarized in the x-direction shown in FIG. 13A) or a second polarization (e.g., polarized in the y-direction shown in FIG. 13A) orthogonal to the first polarization, and the linear polarizer 1340 may be omitted. The power efficiency of the optical system 1200 may be improved.

During a first subframe, referring to FIG. 13A, the polarization switch 1350 may be configured to operate in the non-switching state to transmit linearly polarized image lights having the first polarization (e.g., polarized in the x-direction shown in FIG. 13A) received from the linear polarizer 1340 without affecting the polarization. Thus, the linearly polarized image lights having the first polarization may be diffracted by the in-coupling grating 1322, and may be transmitted by the in-coupling sub-grating 1312 with negligible or no diffraction. Accordingly, the image lights within an angular range encompassed by rays 1370 may be coupled into a TIR path inside the waveguide 1320 via the in-coupling grating 1322, and coupled out of the waveguide 1320 via the out-coupling grating 1324 into an angular range encompassed by rays 1370', which may be received by the eye 265. The image lights in the angular range encompassed by the rays 1380 may not be coupled into a TIR path inside the waveguide 1310. The angular range encompassed by the rays 1370' may correspond to the left portion of the FOV. That is, the left portion of the FOV may be replicated at the eye-box located at the exit pupil of the eye 265. In some embodiments, a polarizer 1360 may be disposed at a surface of the out-coupling grating 1314 facing the waveguide 1320 to suppress ghost images, which may be caused by lights diffracted by the gratings configured for different portions of the FOV. In some embodiments, the polarizer 1360 may be omitted.

During a second subframe, referring to FIG. 13B, the polarization switch 1350 may be configured to operate in the switching state to convert linearly polarized image lights having the first polarization (e.g., polarized in the x-direction) to linearly polarized image lights having the second polarization (e.g., polarized in the y-direction) toward the waveguide stack 1301. Thus, the linearly polarized image lights having the second polarization may not be diffracted by the in-coupling grating 1322, and may be transmitted by the in-coupling grating 1322 with negligible or no diffraction. Thus, the image lights within an angular range encompassed by rays 1380 may be coupled into a TIR path inside the waveguide 1310 via the in-coupling grating 1312, and coupled out of the waveguide 1310 via the out-coupling grating 1314 into an angular range encompassed by rays 1380', which may be received by the eye 265. The image lights in the angular range encompassed by the rays 1370 may not be coupled into a TIR path inside the waveguide 1320. The angular range encompassed by the rays 1380' may correspond to the right portion of the FOV. That is, the right portion of the FOV may be replicated at the eye-box located at the exit pupil of the eye 265.

Referring back to FIGS. 13A and 13B, in some embodiments, the in-coupling grating 1312, the in-coupling grating 1322, the out-coupling grating 1314, and the out-coupling grating 1324 may be configured to be substantially angularly selective and polarization selective, such that the optical system 1300 may be configured to deliver different portions of the FOV to the eye-box of the optical system 1300 simultaneously during a same time period (e.g., same display frame), e.g., in a polarization-multiplexing manner. The display frame may not be divided into sub-frames. For example, the in-coupling grating 1322 and the out-coupling grating 1324 coupled to the waveguide 1320 may be configured to diffract an image light having an angular range corresponding to the first portion (e.g., left portion) of the FOV and having the first polarization (e.g., polarized in the x-direction shown in FIGS. 13A and 13B). The in-coupling grating 1322, the out-coupling grating 1324, and the waveguide 1320 may be configured to transmit an image light having an angular range corresponding to the second portion (e.g., right portion) of the FOV and having the second polarization (e.g., polarized in the y-direction shown in FIGS. 13A and 13B) with negligible diffraction. The in-coupling grating 1312 and the out-coupling grating 1314 coupled to the waveguide 1310 may be configured to diffract an image light having an angular range corresponding to the second portion (e.g., right portion) of the FOV and having the second polarization (e.g., polarized in the y-direction shown in FIGS. 13A and 13B). The in-coupling grating 1312, the out-coupling grating 1314, and the waveguide 1310 may be configured to transmit the image light having an angular range corresponding to the first portion (e.g., left portion) of the FOV and having the first polarization (e.g., polarized in the x-direction shown in FIGS. 13A and 13B) with negligible diffraction.

In some embodiments, the light source assembly 205 may emit an unpolarized image light toward the waveguide 1301. The polarizer 1340 and the polarization switch 1350 may be omitted. The unpolarized image light may include a first portion having an angular range corresponding to the first portion of the FOV of the unpolarized image light, and a second portion having an angular range corresponding to the second portion of the FOV of the unpolarized image light. Each of the first portion and the second portion of the unpolarized image light may include two components, a first component having the first polarization and a second component having the second polarization. When the unpolarized image light emitted by the light source assembly 205 is incident onto the waveguide stack 1301, an image light having an angular range corresponding to the left portion of the FOV (e.g., encompassed by the rays 1370) and having the first polarization (which is the first component of the first portion of the unpolarized image light) may be coupled into a TIR path inside the waveguide 1320 via the in-coupling sub-grating 1322, and coupled out of the waveguide 1320 via the out-coupling sub-grating 1324 into an angular range encompassed by rays 1370', which may be received by the eye 265. The image light having an angular range corresponding to the right portion of the FOV (e.g., encompassed by the rays 1380) and having the second polarization (which is the second component of the second portion of the unpolarized image light) may be coupled into a TIR path inside the waveguide 1310 via the in-coupling sub-grating 1312, and coupled out of the waveguide 1310 via the out-coupling sub-grating 1314 into an angular range encompassed by rays 1380', which may be received by the eye 265. At the output side of the waveguide stack 1301, the angular range encompassed by the rays 1370' may correspond to the left portion of the FOV, and the angular range encompassed by the rays 1380' may correspond to the right portion of the FOV. Thus, the two portions of the FOV of the unpolarized image light emitted by the light source assembly 205 may be delivered to the eye-box simultaneously.

Figure 14A:
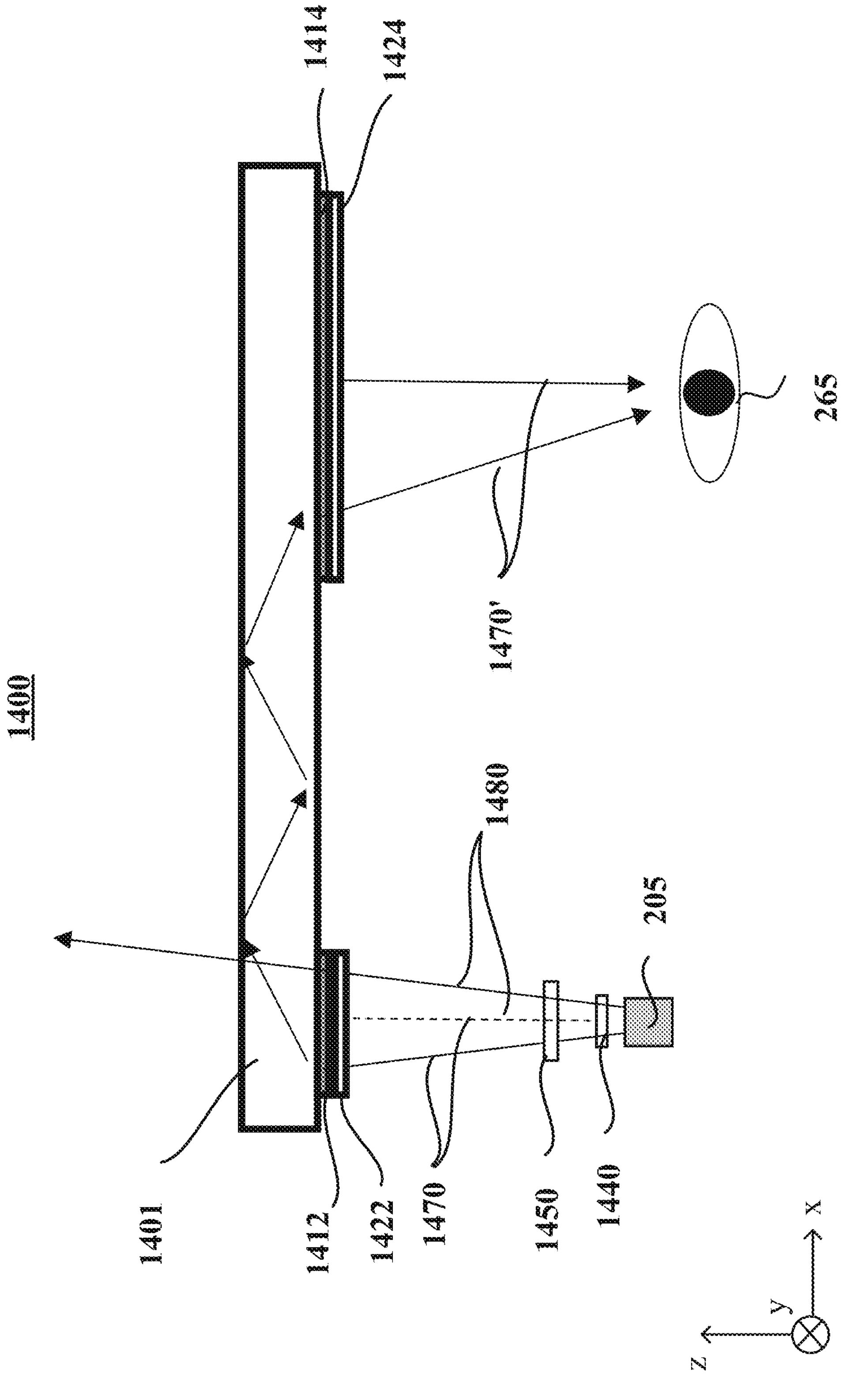
FIGS. 14A-14B illustrate an optical system including a waveguide configured to deliver different portions of the FOV in a time-multiplexing manner, according to another embodiment of the disclosure.
Figure 14B:
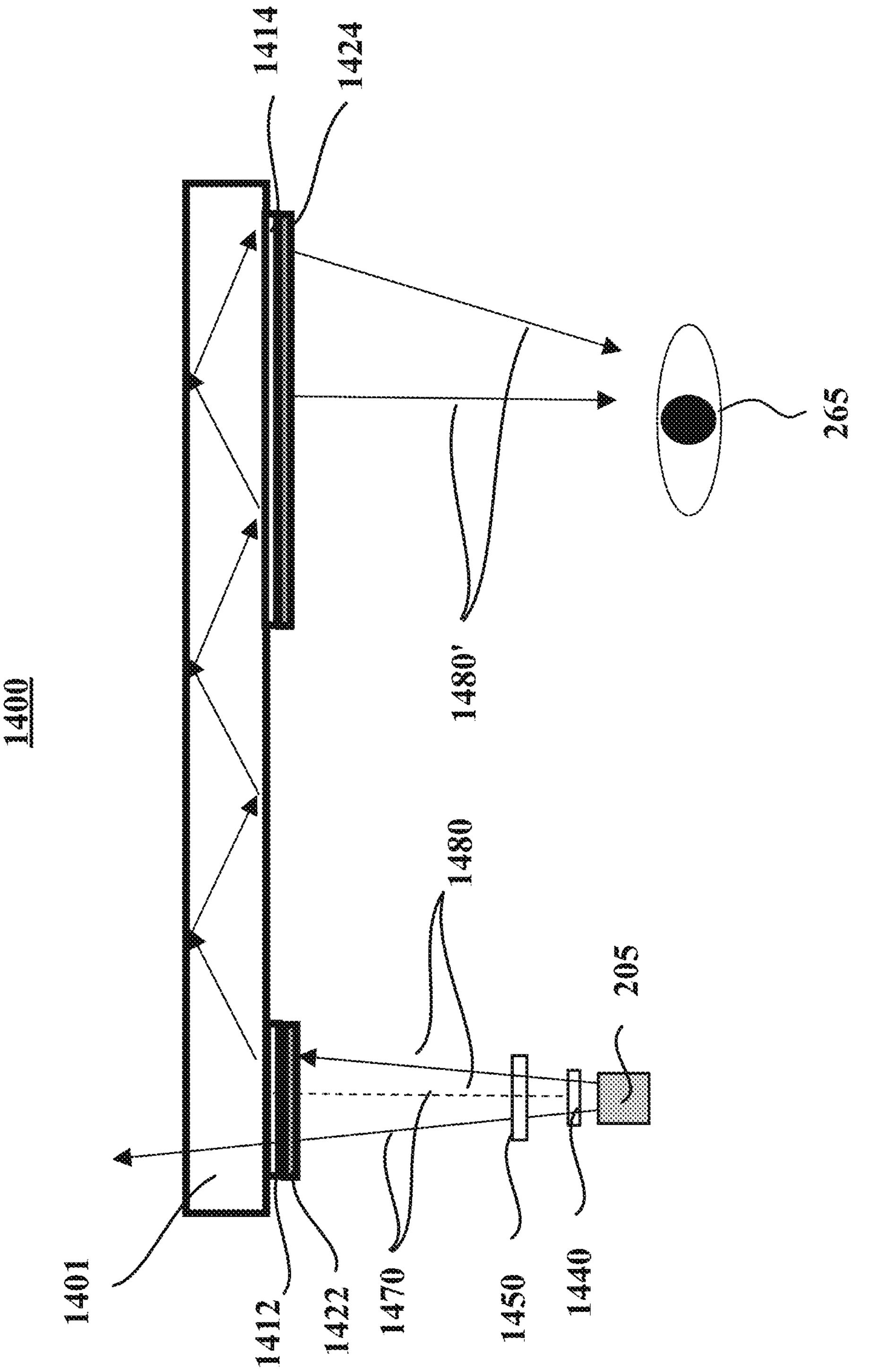

In some embodiments, rather than stacking the in-coupling gratings and the out-coupling gratings coupled to the respective waveguides in the waveguide stack, the in-coupling gratings may be stacked and attached to a common (e.g., a single) waveguide, and the out-coupling gratings may be stacked and attached to the common waveguide, as shown in FIGS. 14A and 14B. FIGS. 14A and 14B illustrate an optical system 1400 including a waveguide 1401 configured to deliver different portions of an FOV in a time-multiplexing manner, according to another embodiment of the disclosure. Descriptions of the similar or the same structures and/or components between the embodiments shown in FIGS. 13A and 13B and the embodiments shown in FIGS. 14A and 14B are not repeated. As shown in FIG. 14A, in-coupling gratings 1412 and 1422 may be stacked at a first surface or a second surface of the waveguide 1401. Out-coupling gratings 1414 and 1424 may be staked at the first surface or the second surface of the waveguide 1401. The in-coupling gratings 1412 and 1422 and the out-coupling gratings 1414 and 1424 may be disposed at the same surface or different surfaces of the waveguide 1401. In some embodiments, the optical system 1400 may be configured to deliver the left and right portions of the FOV in a time-multiplexing manner. The operational principle of the optical system 1400 including the waveguide 1401 for realizing a time-sequential transmission of the left and right portions of the FOV may be similar to that described above in connection with the embodiments shown in FIGS. 13A and 13B. Any of the gratings or sub-gratings included in the optical system 1400 may be an embodiment of any of the disclosed indirectly switchable gratings (which may be passive gratings in some embodiments).

In some embodiments, the light source assembly 205 may emit an unpolarized image light toward the waveguide 1401. The polarizer 1440 and the polarization switch 1450 may be omitted. The in-coupling gratings 1412 and 1422 and out-coupling gratings 1414 and 1424 may be configured to be substantially angularly selective and polarization selective, such that the optical system 1400 may be configured to deliver different portions of the FOV of the unpolarized image light emitted by the light source assembly 205 to the eye-box simultaneously, in a polarization-multiplexing manner. The operational principle of the optical system 1400 including the waveguide 1401 for simultaneously delivering the left and right portions of the FOV of the unpolarized image light emitted by the light source assembly 205 to the eye-box may be similar to that described above in connection with the embodiments shown in FIGS. 13A and 13B.

Figure 15A:
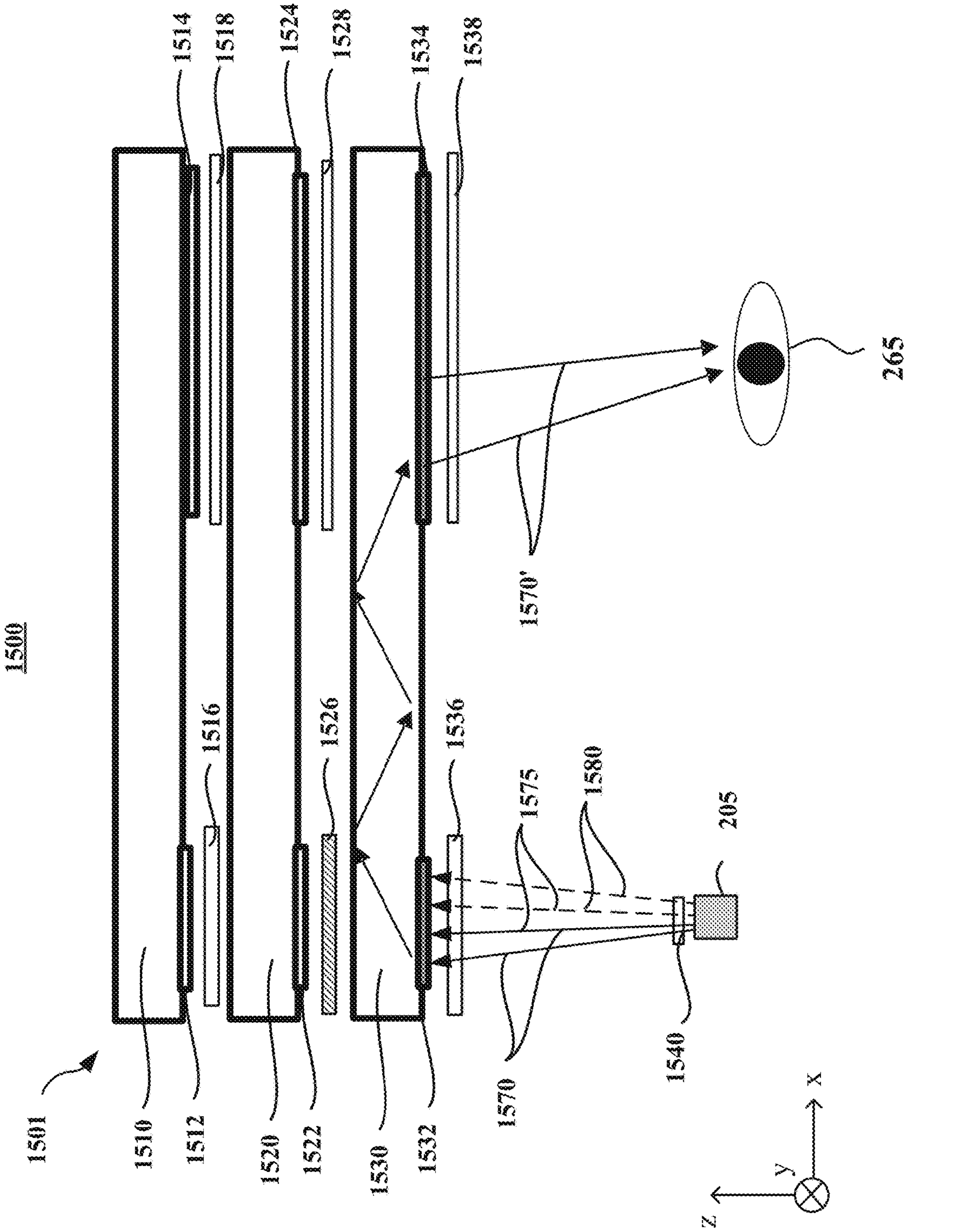
FIGS. 15A-15C illustrate an optical system including a waveguide stack configured to deliver different portions of the FOV in a time-multiplexing manner, according to another embodiment of the disclosure.
Figure 15B:
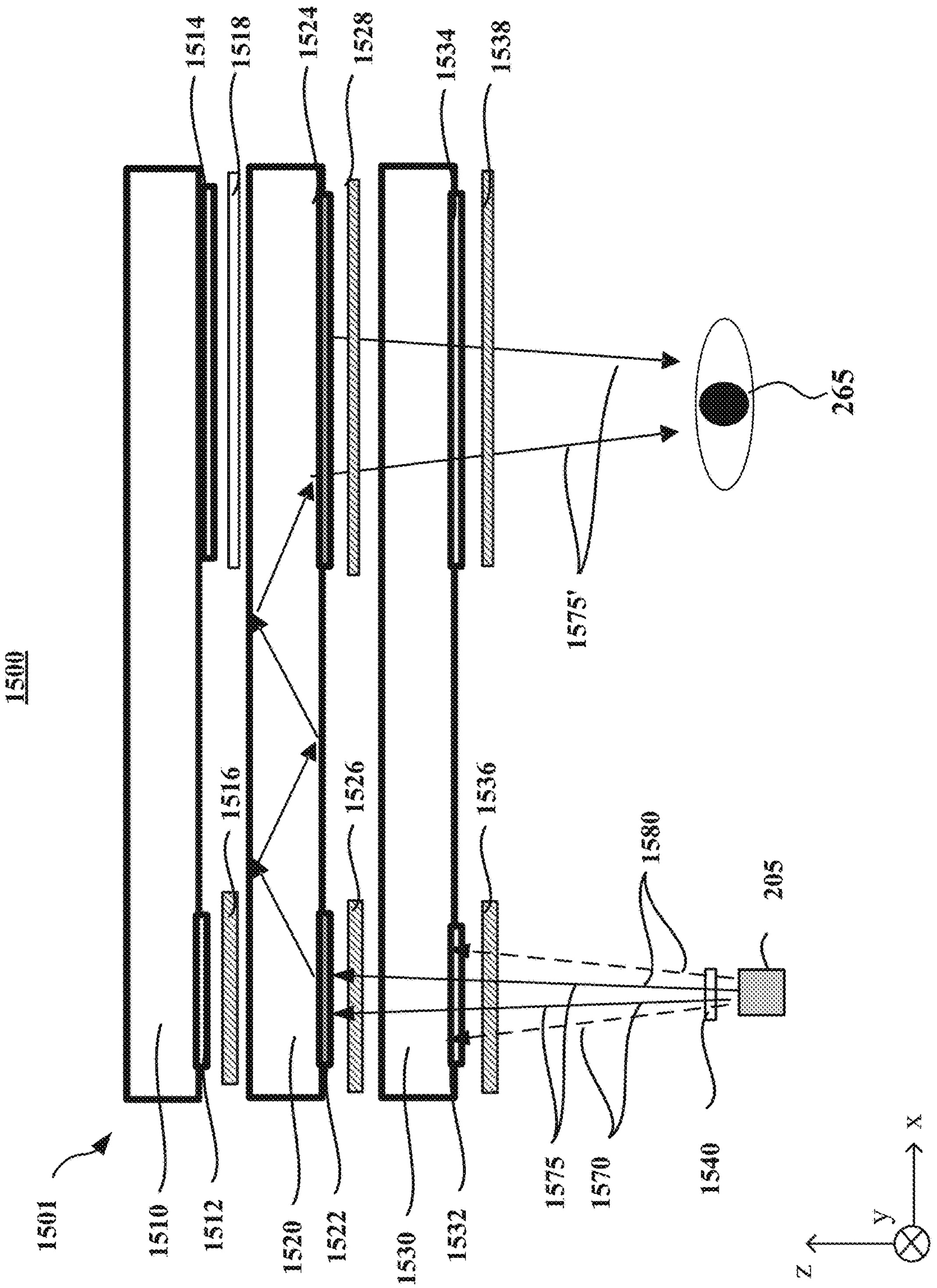
Figure 15C:
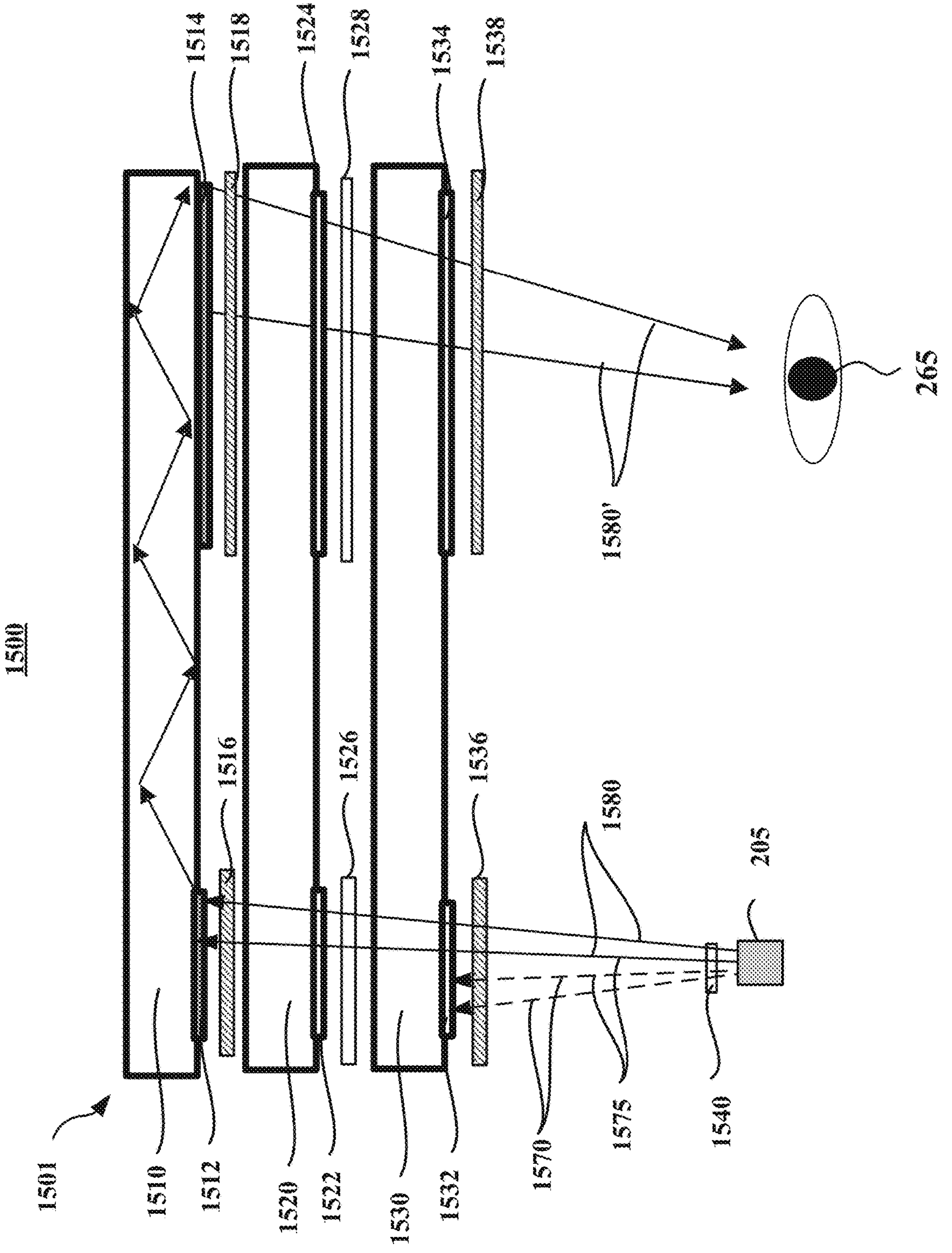

FIGS. 15A-15C illustrate an optical system 1500 including a waveguide stack 1501 to deliver different portions (e.g., three portions) of FOV in a time-multiplexing manner, according to another embodiment of the disclosure. The waveguide stack 1501 may be an embodiment of the waveguide 210 shown in FIGS. 2A and 2B. Descriptions of the similar or the same structures and/or components between the embodiments shown in FIGS. 15A-15C and the embodiments shown in FIGS. 13A and 13B are not repeated. Any of the gratings or sub-gratings included in the optical system 1500 may be an embodiment of any of the disclosed indirectly switchable gratings (which may be passive gratings in some embodiments).

As shown in FIG. 15A, the waveguide stack 1501 may include three waveguides 1510, 1520, and 1530 configured to transfer the left, center, and right portions of the FOV, respectively. At least one (e.g., each) of the waveguides 1510, 1520, or 1530 may include an in-coupling grating and an out-coupling grating disposed at the same surface or different surfaces of the waveguide stack 1501. In some embodiments, at least one (e.g., each) of the in-coupling gratings may be coupled with a polarization switch, such that the in-coupling grating may be indirectly switched through the polarization switch between a diffraction state and a non-diffraction state. The polarization switch may be disposed at a side of the corresponding in-coupling grating from which the image light is incident onto the in-coupling grating, thereby controlling the polarization of the image light incident onto the corresponding in-coupling grating. For example, polarization switches 1516, 1526, and 1536 may correspond to in-coupling gratings 1512, 1522, and 1532, respectively. In some embodiments, at least one (e.g., each) of the out-coupling gratings may be coupled with a polarization switch, which may be disposed at a side of the corresponding out-coupling grating from which the image light exits the out-coupling grating. That is, the polarization switch may be disposed at a side of the corresponding grating facing the eye 265. In some embodiments, at least one (e.g., each) of the out-coupling gratings may be coupled with a polarization switch, which may be disposed at a side of the corresponding out-coupling grating from which the image light is incident onto the out-coupling grating, thereby controlling the polarization of the image light incident onto the corresponding out-coupling grating. For example, in the embodiment shown in FIG. 15A, polarization switches 1518 and 1528 may correspond to out-coupling gratings 1524 and 1534, respectively, and a polarization switch corresponding to an out-coupling grating 1514 may be omitted.

The in-coupling and out-coupling gratings coupled to the waveguide stack 1501 may be configured to diffract image lights having the same polarization (e.g., a first polarization) or different polarizations. In some embodiments, the direction of the first polarization may be in the x-direction shown in FIG. 15A. For discussion purposes, in FIGS. 15A-15C, the in-coupling and out-coupling gratings coupled to the waveguide stack 1501 may be configured to diffract image lights having the same polarization, for example, the first polarization (e.g., polarized in the x-direction shown in FIG. 15A). The light source assembly 205 may emit an unpolarized image light, and a linear polarizer 1540 may be disposed between the light source assembly 205 and the waveguide stack 1501 to convert the unpolarized image light into linearly polarized image lights or rays with a predetermined polarization direction, e.g., the first polarization (e.g., polarized in the x-direction shown in FIG. 15A).

In some embodiments, as shown in FIG. 15A, the light source assembly 205 may emit an unpolarized image light, and a linear polarizer 1540 may be disposed between the light source assembly 205 and the waveguide stack 1501 to convert the unpolarized image light into linearly polarized image lights or rays with a predetermined polarization direction, e.g., a first polarization (e.g., polarized in the x-direction shown in FIG. 15A) or a second polarization (e.g., polarized in the y-direction shown in FIG. 15A). In some embodiments, the light source assembly 205 may emit a linearly polarized image light having a first polarization (e.g., polarized in the x-direction shown in FIG. 15A) or a second polarization (e.g., polarized in the y-direction shown in FIG. 15A) orthogonal to the first polarization, and the linear polarizer 1540 may be omitted. For example, the light source assembly 205 may be a liquid crystal display or a laser used in a laser scanning display. The power efficiency of the optical system 1500 may be improved.

In some embodiments, a display frame may be divided into three subframes. In some embodiments, the light source assembly 205 may emit rays 1570, 1575, and 1580 corresponding to different portions (e.g., left, center, and right portions) of FOV in the three subframes, respectively. In some embodiments, as shown in FIGS. 15A-15C, during each subframe, the light source assembly 205 may emit rays 1570, 1575, and 1580 corresponding to different portions (e.g., left, center, and right portions) of FOV simultaneously. In some embodiments, to deliver a continuous FOV to the eye-box, the angular spectra of the in-coupling gratings 1512, 1522, and 1532 may slightly overlap with one another, and the angular spectra of the out-coupling gratings 1514, 1524, and 1534 may slightly overlap with one another.

Referring to FIG. 15A, during a first subframe, a polarization switch 1536 coupled to an in-coupling grating 1532 at the waveguide 1530 may operate in a non-switching state to transmit the rays 1570 having the first polarization without affecting or switching the polarization. As both the in-coupling grating 1532 and the out-coupling grating 1534 may be configured to diffract imaging lights having the first polarization and transmit image lights having the second polarization with negligible or no diffraction, the rays 1570 having the first polarization may be coupled into a TIR path within the waveguide 1530 via the in-coupling grating 1532, and coupled out of the waveguide 1530 via the out-coupling grating 1534 into an angular range encompassed by rays 1570', which may be received by the eye 265. The angular range encompassed by the rays 1570' may correspond to the left portion of the FOV.

The rays 1575 and the rays 1580 having the first polarization may not be coupled into a TIR path inside the waveguide 1530 via the in-coupling grating 1532, and may be transmitted by the waveguide 1530 toward the waveguide 1520. A polarization switch 1526 coupled to an in-coupling grating 1522 at the waveguide 1520 may operate in the switching state, thereby converting the rays 1575 and the rays 1580 having the first polarization into rays having the second polarization. As the in-coupling grating 1522 is configured to diffract image lights having the first polarization and transmit image lights having the second polarization with negligible or no diffraction, the rays having the second polarization output from the polarization switch 1526 may not be coupled into a TIR path inside the waveguide 1520, and may be transmitted through the waveguide 1520 toward the waveguide 1510.

A polarization switch 1516 coupled to an in-coupling grating 1512 at the waveguide 1510 may operate in the non-switching state. Accordingly, the rays having the second polarization received from the waveguide 1520 may maintain the second polarization after being transmitted through the polarization switch 1516. As the in-coupling grating 1512 may be configured to diffract image lights having the first polarization and transmit lights having the second polarization with negligible or no diffraction, the rays having the second polarization output from the polarization switch

1516 may not be coupled into a TIR path inside the waveguide 1510, and may be transmitted. Polarization switches 1538, 1528, and 1518 respectively coupled to the out-coupling gratings 1534, 1524, and 1514 may operate in the non-switching state, which may not switch the polarization of the image lights transmitted therethrough. Thus, during the first subframe, the rays 1570 having the first polarization may be directed to the eye 265 via the waveguide 1530, through which the left portion of the FOV may be replicated at the eye-box located at the exit pupil of the eye 265.

Referring to FIG. 15B, during a second subframe, the polarization switch 1536 coupled to the in-coupling grating 1532 at the waveguide 1530 may operate in the switching state to convert the rays 1570, 1575, and 1580 having the first polarization into rays 1570, 1575, and 1580 having the second polarization. The rays 1570, 1575, and 1580 having the second polarization may not be coupled into a TIR path inside the waveguide 1530. Rather, the rays 1570, 1575, and 1580 having the second polarization may be transmitted through the waveguide 1530 toward the waveguide 1520. The polarization switch 1526 coupled to the in-coupling grating 1522 at the waveguide 1520 may operate in the switching state to convert the rays 1570, 1575, and 1580 having the second polarization into rays 1570, 1575, and 1580 having the first polarization. The rays 1575 having the first polarization may be coupled into a TIR path within the waveguide 1520 via the in-coupling grating 1522, and coupled out of the waveguide 1520 via the out-coupling grating 1524 as rays having the first polarization. The rays 1570 and 1580 having the first polarization may not be coupled into TIR paths within the waveguide 1520 via the in-coupling grating 1522, and may be transmitted through the waveguide 1520.

At the out-coupling side of the waveguide stack 1501, the polarization switch 1528 coupled to the out-coupling grating 1524 at the waveguide 1520 may operate in the switching state to convert the rays 1575 having the first polarization output from the out-coupling grating 1524 into rays 1575' having the second polarization toward the waveguide 1530. The rays 1575' having the second polarization transmitted by the polarization switch 1528 may not be coupled into a TIR path inside the waveguide 1530. Rather, the rays 1575' having the second polarization may be directly transmitted through the waveguide 1530 toward the polarization switch 1538.

In some embodiments, the polarization switch 1538 coupled to the out-coupling grating 1534 at the waveguide 1530 may operate in the switching state to convert the rays 1575' having the second polarization into rays having the first polarization toward the eye 265, within an angular range encompassed by rays 1575', which may be received by the eye 265. The angular range encompassed by rays 1575' may correspond to the center portion of FOV.

Referring back to the in-coupling side of the waveguide stack 1501, the polarization switch 1516 coupled to the in-coupling grating 1512 at the waveguide 1510 may operate in the switching state to convert the rays 1570 and 1580 having the first polarization that are not coupled into a TIR path inside the waveguide 1520 (i.e., rays 1570 and 1580 having the first polarization that are transmitted through the waveguide 1520 toward the waveguide 1510) into rays having the second polarization. The rays 1570 and 1580 having the second polarization may not be coupled into a TIR path inside the waveguide 1510. Rather, the rays 1570 and 1580 having the second polarization may be transmitted through the waveguide 1510. Thus, during the second subframe, the rays 1575 having the first polarization may be directed to the eye 265 via the waveguide 1520, through which the center portion of the FOV may be replicated at the eye-box located at the exit pupil of the eye 265.

Referring to FIG. 15C, during a third subframe, the polarization switch 1536 coupled to the in-coupling grating 1532 at the waveguide 1530 may operate in the switching state to convert the rays 1570, 1575, ad 1580 having the first polarization into rays 1570, 1575, ad 1580 having the second polarization. The rays 1570, 1575, ad 1580 having the second polarization may not be coupled into a TIR path inside the waveguide 1530. Rather, the rays 1570, 1575, ad 1580 having the second polarization may be transmitted through the waveguide 1530 toward the waveguide 1520.

In the embodiment shown in FIG. 15C, the polarization switch 1526 coupled to the in-coupling grating 1522 at the waveguide 1520 may operate in the non-switching state to transmit the rays 1570, 1575, ad 1580 having the second polarization without affecting or switching the polarization of the rays. The rays 1570, 1575, ad 1580 having the second polarization output from the polarization switch 1526 may not be coupled into a TIR inside the waveguide 1520. Rather, the rays 1570, 1575, ad 1580 having the second polarization output from the polarization switch 1526 may be transmitted by the waveguide 1520 toward the waveguide 1510.

In the embodiment shown in FIG. 15C, the polarization switch 1516 coupled to the in-coupling grating 1512 at the waveguide 1510 may operate in the switching state to convert the rays 1570, 1575, ad 1580 having the second polarization transmitted from the waveguide 1520 into rays having the first polarization. The rays 1580 having the first polarization output from the polarization switch 1516 may be coupled into a TIR path within the waveguide 1510 via the in-coupling grating 1512, and coupled out of the waveguide 1510 via the out-coupling grating 1514 as rays 1580' having the first polarization. The rays 1570 and 1575 having the first polarization output from the polarization switch 1516 may not be coupled into a TIR path within the waveguide 1510 via the in-coupling grating 1512, and may be transmitted through the waveguide 1510.

At the out-coupling side of the waveguide stack 1501, the polarization switch 1518 coupled to the out-coupling grating 1514 at the waveguide 1510 may operate in the switching state to convert the rays 1580' having the first polarization output from the out-coupling grating 1514 into rays 1580' having the second polarization toward the waveguide 1520. The rays 1580' having the second polarization output from the polarization switch 1518 may not be coupled into a TIR path inside the waveguide 1520. Rather, the rays 1580' having the second polarization may be transmitted through the waveguide 1520 and the out-coupling grating 1524 toward the waveguide 1530.

In the embodiment shown in FIG. 15C, the polarization switch 1528 coupled to the out-coupling grating 1524 at the waveguide 1520 may operate in the non-switching state to transmit the rays 1580' having the second polarization transmitted from the waveguide 1520 without affecting or switching the polarization of the rays. The rays 1580' having the second polarization output from the polarization switch 1528 may not be coupled into a TIR path inside the waveguide 1530. Rather, the rays 1580' having the second polarization may be transmitted through the waveguide 1530 and the out-coupling grating 1538 toward the polarization switch 1538.

In some embodiments, the polarization switch 1538 coupled to the out-coupling grating 1534 at the waveguide 1530 may operate in the switching state to convert the rays 1580' having the second polarization output from the out-coupling grating 1538 into rays 1580' having the first polarization toward the eye 265, in an angular range encompassed by rays 1580'. The angular range encompassed by the rays 1580' may correspond to the right portion of FOV that may be viewable by the eye 265. Thus, during the third subframe, the rays 1580 having the first polarization may be directed to the eye 265 via the waveguide 1510, through which the right portion of the FOV may be replicated at the eye-box located at the exit pupil of the eye 265. Thus, during a display frame (which includes the three subframes), a sequential transmission of image lights corresponding to different portions of the FOV to the eye-box may be realized, and the eye 265 may observe a full FOV in one polarization, e.g., the first polarization. Further, a time-multiplexing realized through the disclosed indirectly switchable gratings (which may be passive gratings in some embodiments) may eliminate crosstalk in the waveguide stack 1501. Accordingly, the optical performance of the waveguide display assembly including the waveguide stack 1501 may be enhanced. The principle shown in FIGS. 15A-15C for splitting the FOV into three portions and time sequentially delivering the three portions to the eye-box may be extended to splitting the FOV in more than three portions and time sequentially delivering the more than three portions to the eye-box.

Referring back to FIGS. 15A-15C, in some embodiments, the angular spectra of the in-coupling gratings 1512, 1522, and 1532 may be substantially non-overlapping with one another such that the crosstalk between the in-coupling gratings may be minimized or reduced. Accordingly, the polarization switches 1516, 1526, and 1536 respectively coupled to the in-coupling gratings 1512, 1522, and 1532 may be omitted. In some embodiments, the angular spectra of the out-coupling gratings 1514, 1524, and 1534 may be substantially non-overlapping with one another such that the crosstalk between the out-coupling gratings may be minimized or reduced. Accordingly, the polarization switches 1518, 1528, and 1538 respectively coupled to the out-coupling gratings 1514, 1524, and 1534 may be omitted. When the angular spectra of the in-coupling gratings 1512, 1522, and 1532 are substantially non-overlapping with one another and the angular spectra of the out-coupling gratings 1514, 1524, and 1534 are substantially non-overlapping with one another, the in-coupling grating 1512, 1522, or 1532 may be configured to couple an image light having an angular range corresponding to the respective portion of the FOV into the respective waveguide 1510, 1520, or 1530, and the out-coupling gratings 1514, 1524, and 1534 may be configured to couple the in-coupled image light out of the respective waveguide 1510, 1520, or 1530. Thus, the optical system 1500 may be configured to simultaneously deliver different portions (e.g., three portions) of FOV of the image light emitted from the light source assembly 205. In some embodiments, the light source assembly 205 may emit an unpolarized image light, and the linear polarizer 1540 may be disposed between the light source assembly 205 and the waveguide stack 1501 to convert the unpolarized image light into a linearly polarized image light with a predetermined polarization direction, e.g., the first polarization (e.g., polarized in the x-direction shown in FIGS. 15A-15C). The in-coupling gratings 1512, 1522, and 1532 and the out-coupling gratings 1514, 1524, and 1534 may have the same polarization selectivity, e.g., may diffract an image light having the first polarization and transmit an image light having the second polarization with negligible diffraction. In some embodiments, the light source assembly 205 may be configured to emit an unpolarized image light, and the polarizer 1540 may be omitted. The unpolarized image light may include two orthogonally polarized components. The in-coupling gratings 1512, 1522, and 1532 may be configured to have different polarization selectivity. According to the polarization selectivity of the in-coupling gratings 1512, 1522, and 1532, one component may be coupled into the corresponding waveguide by the in-coupling grating, while the other component may be transmitted through with negligible diffraction. The polarization selectivity of the out-coupling gratings 1514, 1524, and 1534 may be configured, such that the out-coupling gratings 1514, 1524, and 1534 may couple the corresponding in-coupled image lights out of the corresponding waveguide.

Although not shown, in some embodiments, the FOV may include a suitable number of portions, e.g., four portions, or five portions, etc. The waveguide stack 1501 may include a suitable number of waveguides (e.g., four waveguides, or five waveguides, etc.) coupled with respective in-coupling gratings and out-coupling gratings to transfer the suitable number of portions of the FOV. The neighboring portions of the FOV may partially overlap to form a continuous FOV at the eye 265. Accordingly, a display frame may be divided into a suitable number of subframes (e.g., four subframes, or five subframes, etc.). During each subframe, respective pairs of sub-gratings may be sequentially configured to operate in a diffraction state via the corresponding polarization switches to transmit respective portions of the FOV via the respective waveguides.

Figure 16A:
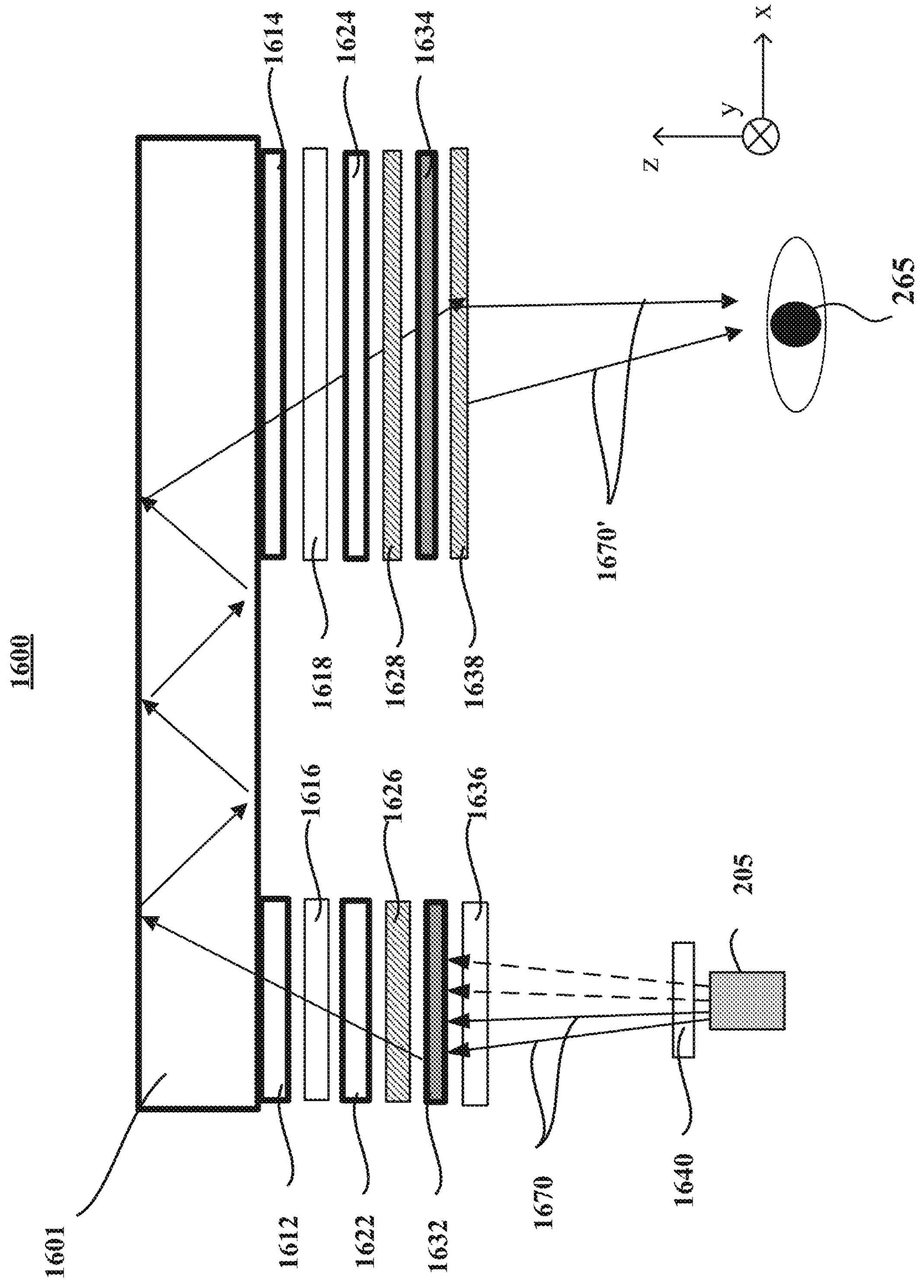
FIGS. 16A-16C illustrate an optical system including a waveguide configured to deliver different portions of the FOV in a time-multiplexing manner, according to another embodiment of the disclosure.
Figure 16B:
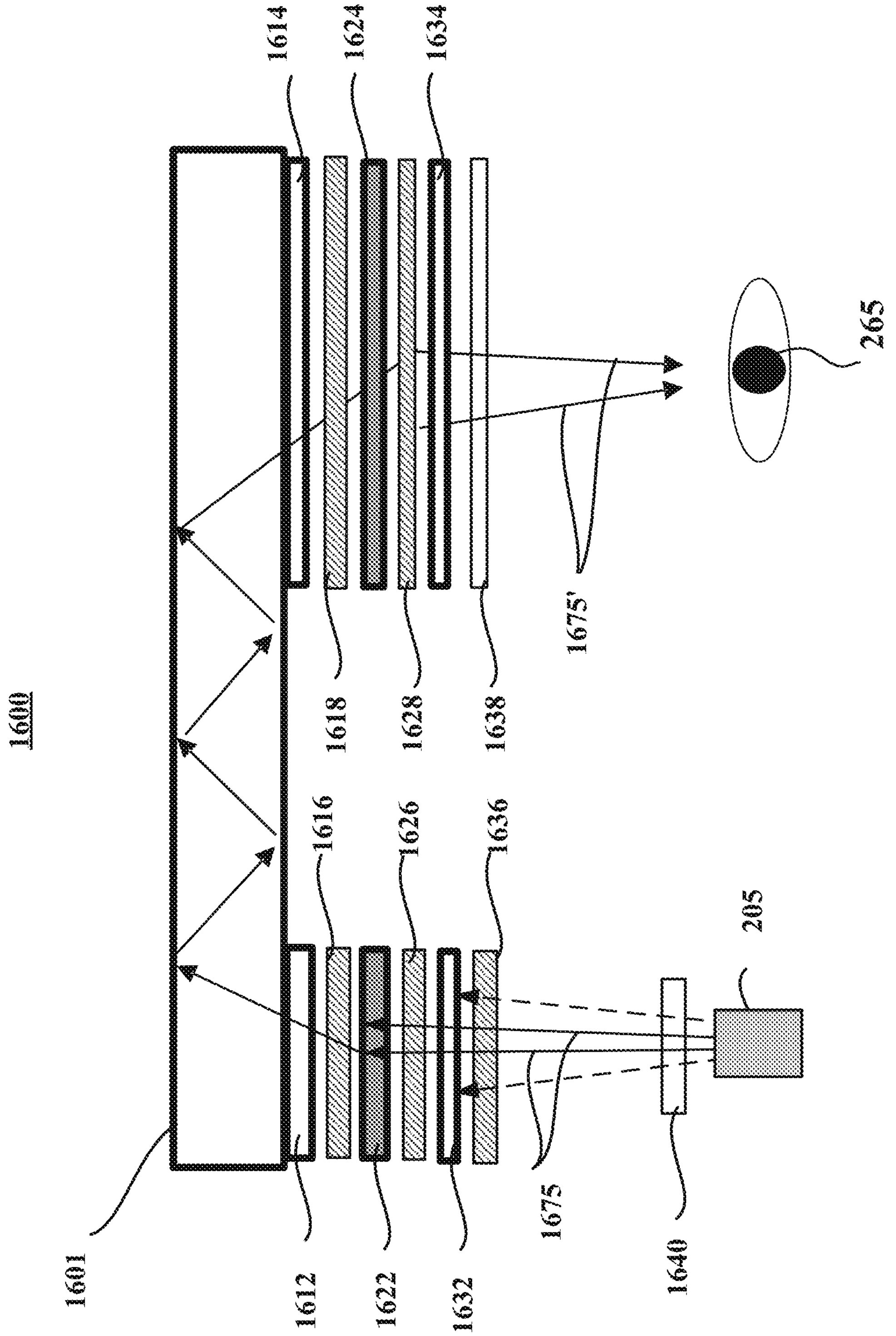
Figure 16C:
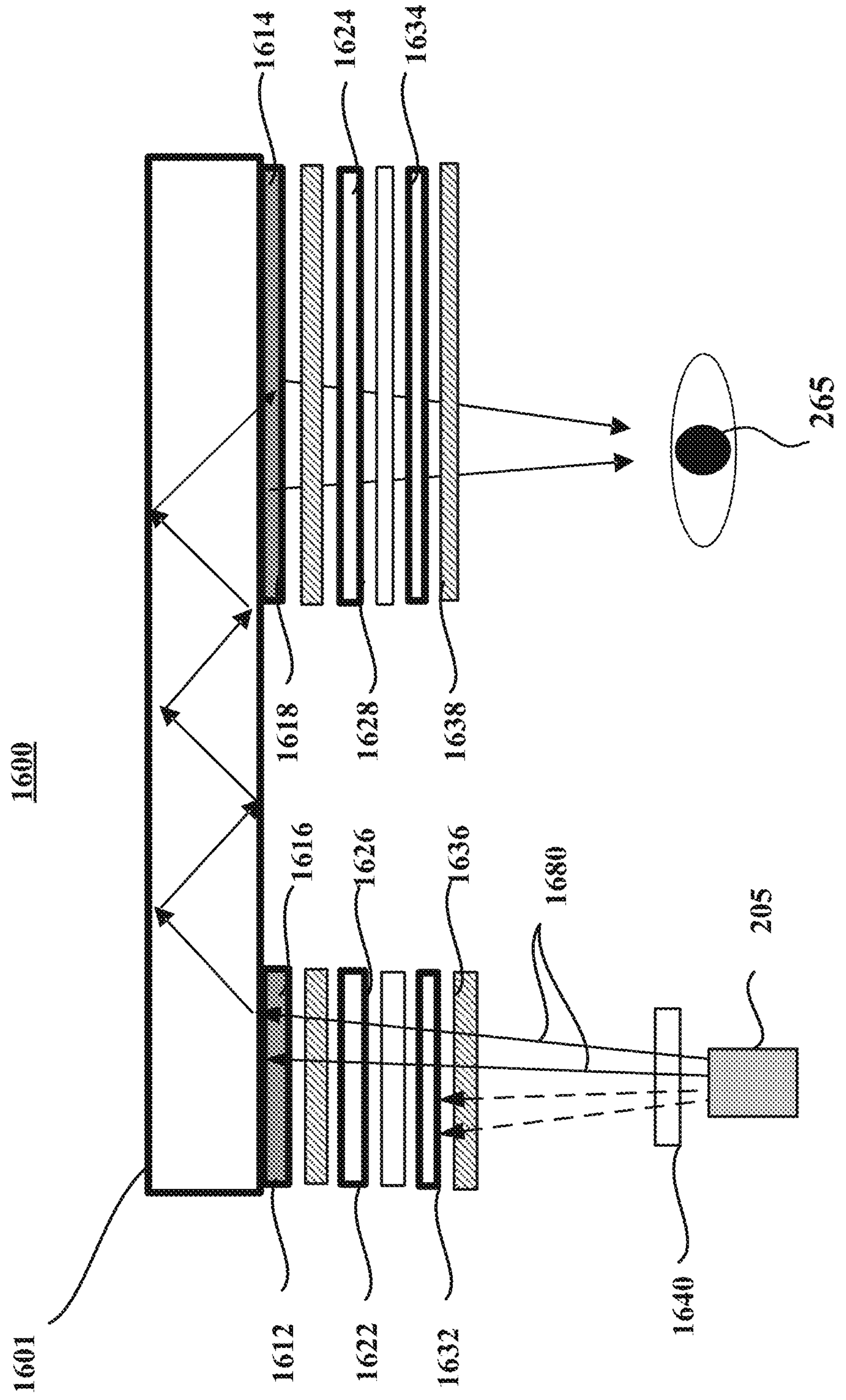

In some embodiments, instead of being disposed at the respective waveguides in the waveguide stack, the in-coupling gratings and out-coupling gratings may be respectively stacked and attached to a common (e.g., a single) waveguide, as shown in FIG. 16A-16C. FIGS. 16A-16C illustrate an optical system 1600 including a single waveguide 1601 configured to deliver different portions of an FOV in a time-multiplexing manner, according to another embodiment of the disclosure. Descriptions of the similar or the same structures and/or components between the embodiments shown in FIGS. 16A-16C and the embodiments shown in FIGS. 15A-15C are not repeated. Any of the gratings or sub-gratings included in the optical system 1600 may be an embodiment of any of the disclosed indirectly switchable gratings (which may be passive gratings in some embodiments).

As shown in FIG. 16A, a plurality of in-coupling gratings 1612, 1622, and 1632 may be disposed at a first surface or a second surface of the waveguide 1601. The number of in-coupling gratings is not limited to three, and may be any suitable number, such as two, four, five, six, etc. A plurality of out-coupling gratings 1614, 1624, and 1634 may be disposed at the first surface or the second surface of the waveguide 1601. The number of the out-coupling gratings is not limited to three, and may be any suitable number, such as two, four, five, six, etc. The plurality of in-coupling gratings 1612, 1622, and 1632 and the plurality of out-coupling gratings 1614, 1624, and 1634 may be disposed at the same surface or different surfaces of the waveguide 1601. As shown in FIG. 16A, the in-coupling gratings 1612, 1622, and 1632 may be coupled to polarization switches 1616, 1626, and 1636, respectively. The number of polarization switches optically coupled with the in-coupling gratings may be the same as the number of the in-coupling gratings, or may be less than or more than the number of the in-coupling gratings. As shown in FIG. 16A, the out-coupling gratings 1614, 1624, and 1634 may be coupled to polarization switches 1618, 1628, and 1638, respectively. The number of polarization switches optically coupled with the out-coupling gratings may be the same as the number of the out-coupling gratings, or may be less than or more than the number of the out-coupling gratings. The operational principles for sequential transmission of the left, center, and right portions of the FOV through the waveguide 1601 in a time-multiplexing manner, and the operation scheme of the light source assembly 205, the gratings, and corresponding polarization switches arranged at the waveguide 1601, may be similar to those described above in connection with the embodiments shown in FIGS. 15A-15C. In some embodiments, the angular spectra of the out-coupling gratings 1614, 1624, and 1634 may overlap (e.g., slightly overlap) with one another to deliver a continuous FOV to the eye-box.

In some embodiments, the angular spectra of the in-coupling gratings 1612, 1622, and 1632 may be substantially non-overlapping with one another, such that the crosstalk between the in-coupling gratings may be minimized or reduced. Accordingly, the polarization switches 1616, 1626, and 1636 respectively coupled to the in-coupling gratings 1612, 1622, and 1632 may be omitted. In some embodiments, the angular spectra of the out-coupling gratings 1614, 1624, and 1634 may be substantially non-overlapping with one another such that the crosstalk between the out-coupling gratings may be minimized or reduced. Accordingly, the polarization switches 1618, 1628, and 1638 respectively coupled to the out-coupling gratings 1614, 1624, and 1634 may be omitted. When the angular spectra of the in-coupling gratings 1612, 1622, and 1632 are substantially non-overlapping with one another and the angular spectra of the out-coupling gratings 1614, 1624, and 1634 are substantially non-overlapping with one another, the in-coupling grating 1612, 1622, or 1632 may be configured to couple an image light having an angular range corresponding to the respective portion of the FOV into the waveguide 1601, and the out-coupling gratings 1614, 1624, and 1634 may be configured to couple the in-coupled image light out of the waveguide 1601. Thus, the optical system 1600 may be configured to simultaneously deliver different portions (e.g., three portions) of FOV of the image light emitted from the light source assembly 205. In some embodiments, the light source assembly 205 may emit an unpolarized image light, and the linear polarizer 1640 may be disposed between the light source assembly 205 and the waveguide 1601 to convert the unpolarized image light into a linearly polarized image light with a predetermined polarization direction, e.g., the first polarization (e.g., polarized in the x-direction shown in FIGS. 16A-15C). The in-coupling gratings 1612, 1622, and 1632 and the out-coupling gratings 1614, 1624, and 1634 may be configured with the same polarization selectivity, e.g., may diffract an image light having the first polarization and transmit an image light having the second polarization with negligible diffraction. In some embodiments, the light source assembly 205 may be configured to emit an unpolarized image light, and the polarizer 1640 may be omitted. The unpolarized image light may include two orthogonally polarized components. The in-coupling gratings 1612, 1622, and 1632 may be configured to have different polarization selectivities. According to the polarization selectivity of the in-coupling gratings 1612, 1622, and 1632, one component of the unpolarized image light may be coupled into the corresponding waveguide by the in-coupling grating, while the other component may be transmitted through with negligible diffraction. The polarization selectivity of the out-coupling gratings 1614, 1624, and 1634 may be configured, such that the out-coupling gratings 1614, 1624, and 1634 may couple the corresponding in-coupled image lights out of the waveguide 1601.

Although not shown, in some embodiments, the FOV may include a suitable number of portions, e.g., four portions, or five portions, etc. The waveguide 1601 may include a suitable number of pairs of gratings (e.g., four pairs, or five pairs, etc.) to transfer the suitable number of portions of the FOV. The neighboring portions of the FOV may partially overlap to form a continuous FOV at the eye 265. Accordingly, a display frame may be divided into a suitable number of subframes (e.g., four subframes, or five subframes, etc.). During respective subframes, respective pairs of gratings may be sequentially configured to operate in a diffraction state via the corresponding polarization switches to transmit respective portions of the FOV via the waveguide 1601.

Figure 17A:
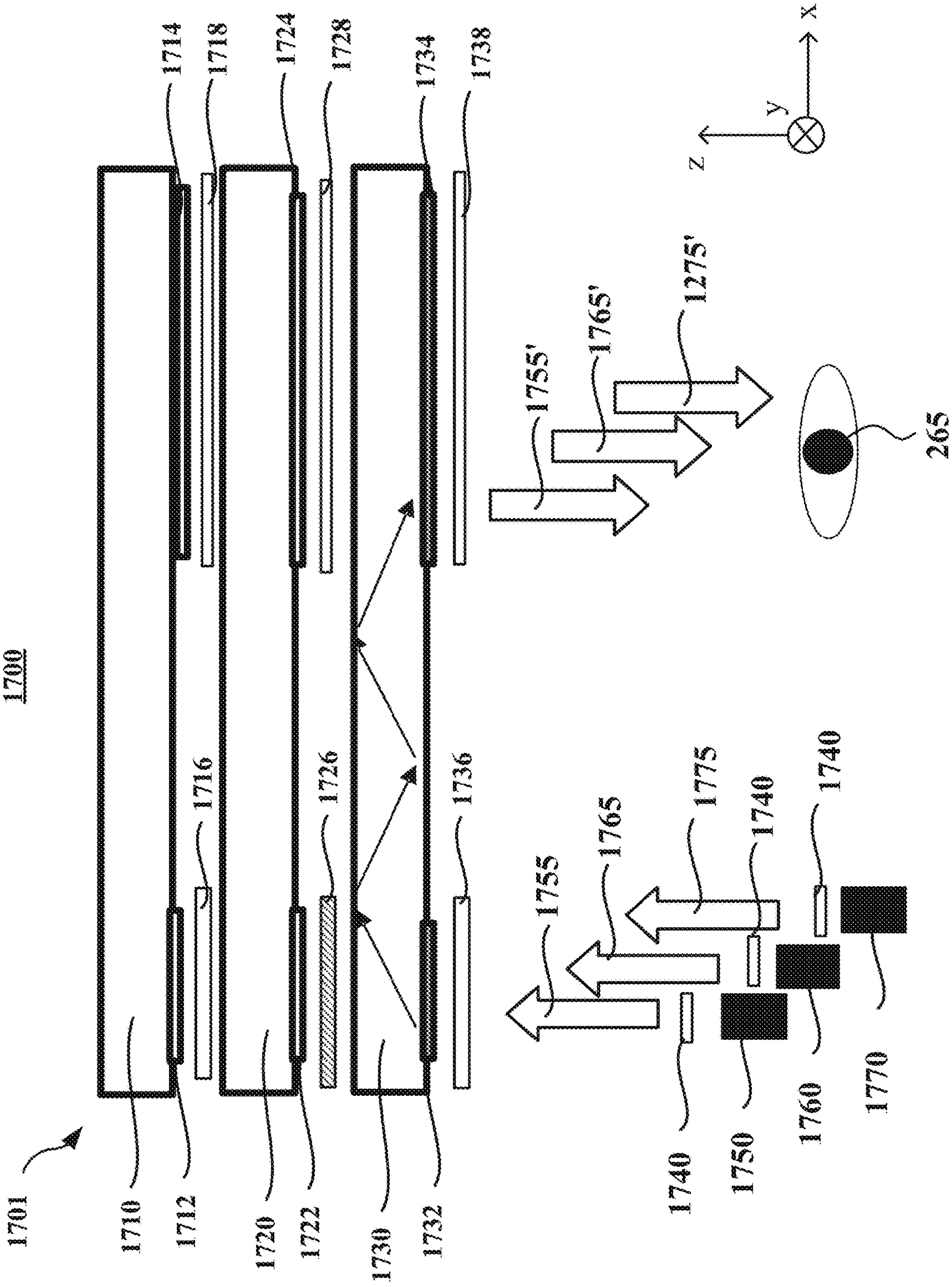
FIG. 17A illustrates a schematic diagram of an optical system including a waveguide stack configured to deliver single-color images of different colors, according to an embodiment of the disclosure.
Figure 17B:
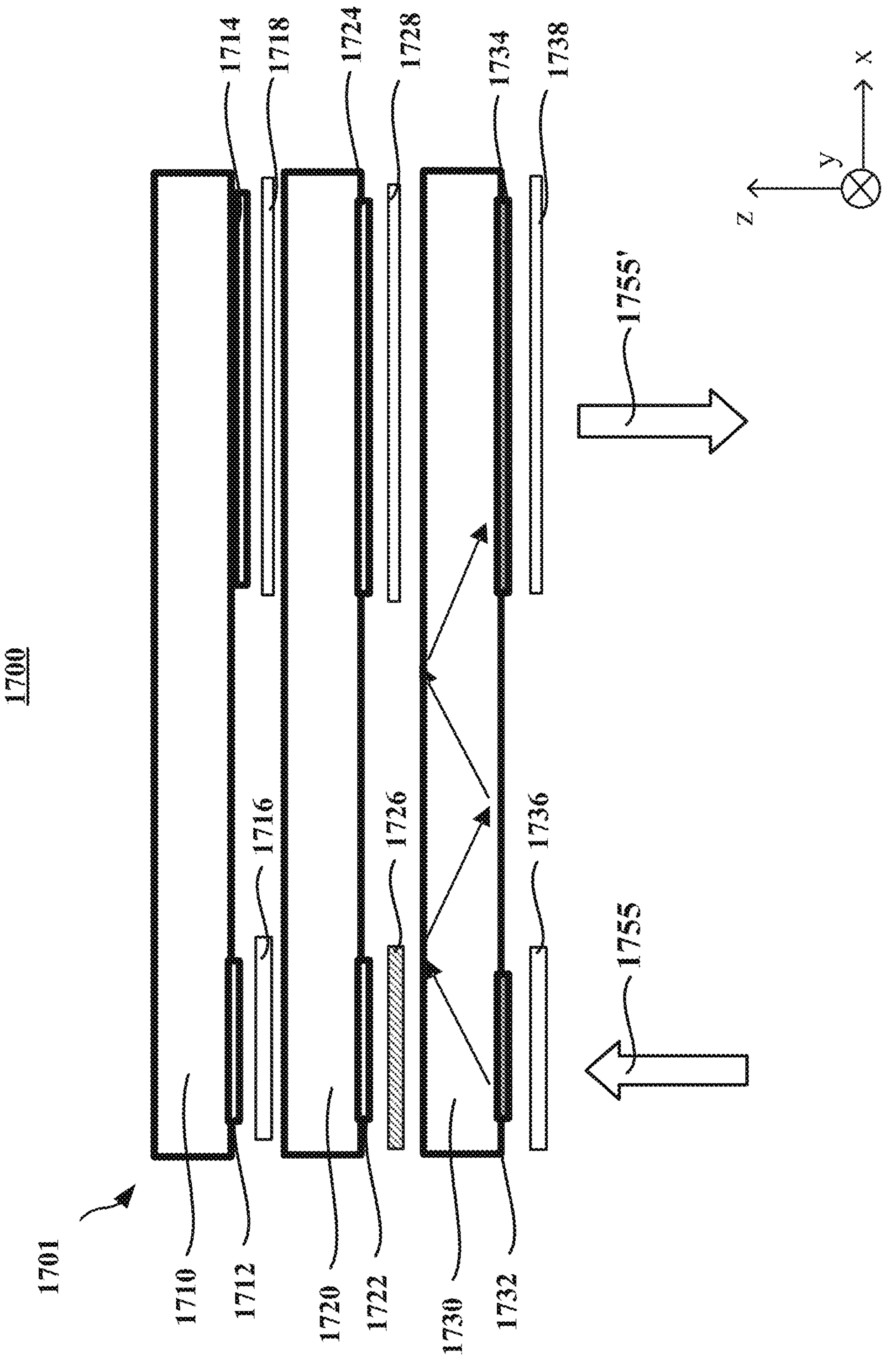
FIGS. 17B-17D illustrate an optical system including the waveguide stack shown in FIG. 17A, which is configured to deliver single-color images of different colors in a time-multiplexing manner, according to an embodiment of the disclosure.
Figure 17C:
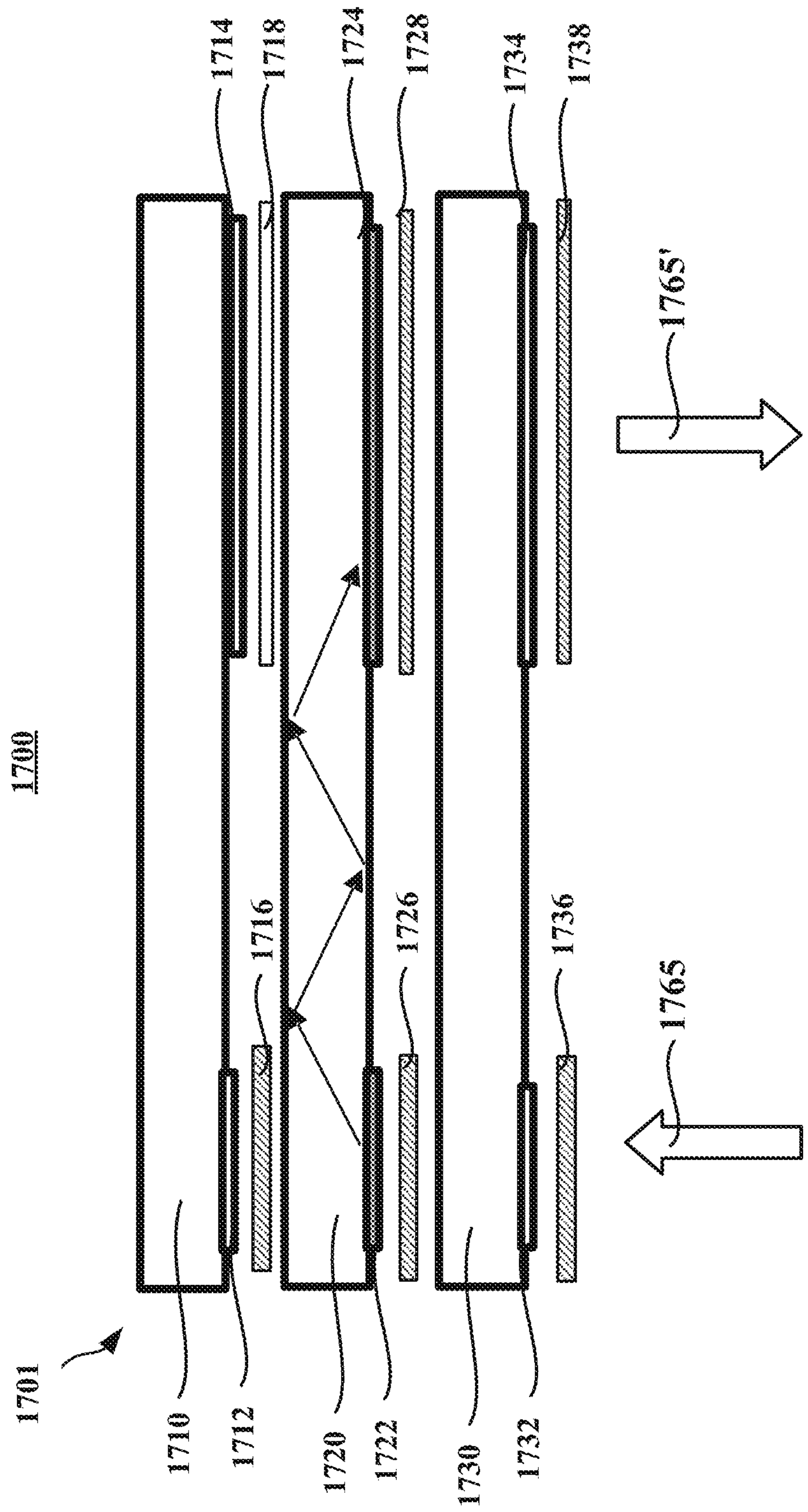
Figure 17D:
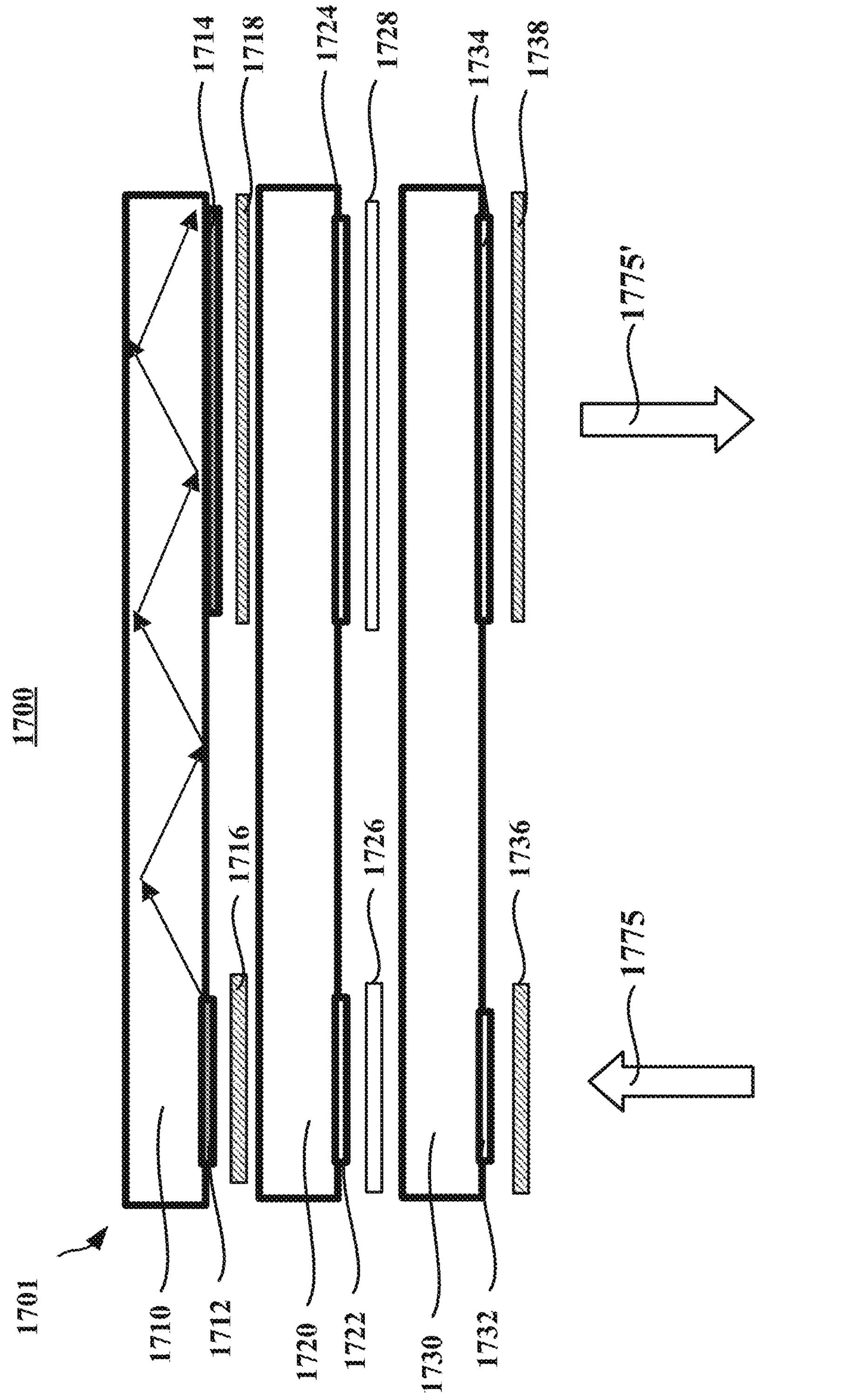

FIG. 17A illustrates a schematic diagram of an optical system 1700 including a waveguide stack 1701 according to an embodiment of the disclosure. FIGS. 17B-17D illustrate the optical system 1700 including the waveguide stack 1701 shown in FIG. 17A, which is configured to deliver single-color images of different colors in a time-multiplexing manner. The waveguide stack 1701 may be similar to the waveguide stack 1501 shown in FIG. 15A. Thus, descriptions of the waveguide stack 1501 may also be applicable to the waveguide stack 1701. In some embodiments, as shown in FIG. 17A, the waveguide stack 1701 may receive image lights from one or more light source assemblies, for example, three light source assemblies 1750, 1760, and 1770. At least one (e.g., each) of the light source assemblies 1750, 1760, or 1770 may emit a monochromatic image light of a specific wavelength band corresponding to a primary color (e.g., red, green, or blue). For example, the light source assemblies 1750, 1760, and 1770 may emit monochromatic image lights 1755, 1765, and 1775 of specific wavelength bands corresponding to a first primary color (e.g., red), a second primary color (e.g., green), and a third primary color (e.g., blue), respectively. Any of the gratings or sub-gratings included in the optical system 1700 may be an embodiment of any of the disclosed indirectly switchable gratings (which may be passive gratings in some embodiments).

The light source assemblies 1750, 1760, and 1770 may be controlled by a controller (which may be similar to the controller 215 shown in FIG. 2A) to sequentially emit the corresponding image lights. In some embodiments, the image lights emitted from the light source assemblies 1750, 1760, and 1770 may be unpolarized image lights. A linear polarizer 1740 may be disposed between the corresponding light source assembly and the waveguide stack 1701 to convert the unpolarized image lights into linearly polarized image lights with a predetermined polarization, for example, the first polarization (e.g., polarized in the x-direction shown in FIG. 17A). In some embodiments, the light source assemblies 1750, 1760, and 1770 may emit linearly polarized image lights with a predetermined polarization, and the linear polarizers 1740 may be omitted. In some embodiments, the monochromatic image lights 1755, 1765, and 1775 of specific wavelength bands respectively corresponding to a first primary color (e.g., red), a second primary color (e.g., green) and a third primary color (e.g., blue) may be sequentially emitted from a common light source assembly.

The waveguide 1710 may be coupled with an in-coupling grating 1712 and an out-coupling grating 1714 both configured for a wavelength band corresponding to the first primary color (e.g., red). The waveguide 1720 may be coupled with an in-coupling grating 1722 and an out-coupling grating 1724 both configured for a wavelength band corresponding to the second primary color (e.g., green). The waveguide 1730 may be coupled with an in-coupling grating 1732 and an out-coupling grating 1734 both configured for a wavelength band corresponding to the third primary color (e.g., blue). At least one of the in-coupling gratings 1712, 1722, or 1732 and the out-coupling gratings 1714, 1724, or 1734 may include one or more of the disclosed indirectly switchable gratings (which may be passive gratings in some embodiments). For discussion purposes, each of the in-coupling gratings 1712, 1722, and 1732 and the out-coupling gratings 1714, 1724, and 1734 includes a disclosed indirectly switchable grating (which may be a passive grating in some embodiments). The in-coupling and out-coupling gratings coupled to the waveguide stack 1701 may be configured to diffract lights having a same predetermined polarization (e.g., a first polarization, polarized in the x-direction shown in FIG. 17A). For discussion purposes, in the embodiments shown in FIGS. 17A-17D, the in-coupling and out-coupling gratings coupled to the waveguide stack 1701 are configured to diffract lights having the same predetermined polarization, for example, the first polarization (e.g., polarized in the x-direction shown in FIG. 17A).

In some embodiments, at least one (e.g., each) of the in-coupling gratings 1712, 1722, or 1732 may be coupled with a polarization switch. The in-coupling gratings 1712, 1722, and 1732 may be indirectly switched between a diffraction state and a non-diffraction state depending on a polarization of an incident light output from the polarization switch. The polarization switch may be disposed at a side of a corresponding in-coupling grating from which the image light is incident onto the in-coupling grating, thereby controlling the polarization of the image light incident onto the corresponding in-coupling grating. At least one (e.g., each) of the out-coupling gratings 1714, 1724, or 1734 may be coupled with a polarization switch, which may be disposed at a side of the corresponding out-coupling grating from which the image light exits the out-coupling grating.

A display frame may be divided into three subframes for sequential transmission of the image lights 1755, 1765, and 1775. During a first subframe, referring to FIG. 17A and FIG. 17B, the image lights 1755 (e.g., red lights) may be emitted from the light source assembly 1750 toward the waveguide stack 1701, and the image lights 1765 (e.g., green lights) and 1775 (e.g., blue lights) may not be emitted from the corresponding source assemblies 1760 and 1770. A polarization switch 1736 coupled to an in-coupling grating 1732 at the waveguide 1730 may operate in a non-switching state to transmit the image lights 1755 having the first polarization without affecting or switching the polarization. As the in-coupling grating 1732 and the out-coupling grating 1734 may be configured to diffract image lights having the first polarization and transmit image lights having the second polarization orthogonal to the first polarization with negligible or no diffraction, the image lights 1755 having the first polarization may be coupled into a TIR path within the waveguide 1730 via the in-coupling grating 1732. The image lights 1755 may be coupled out of the waveguide 1730 via the out-coupling grating 1734 as image lights 1755' (e.g., red lights), which may be received by the eye 265. That is, a single-color image of a first color (e.g. red color) may be perceived by the eye 265.

In the embodiment shown in FIG. 17A, a polarization switch 1726 coupled to an in-coupling grating 1722 at the waveguide 1720 may operate in a switching state to convert the image lights 1755 having the first polarization into image lights having the second polarization. As the in-coupling grating 1722 may be configured to diffract image lights having the first polarization and transmit image lights having the second polarization with negligible or no diffraction, the transmitted image lights having the second polarization may not be coupled into a TIR path inside the waveguide 1720 and may be transmitted through the waveguide 1720 toward the waveguide 1710. A polarization switch 1716 coupled to an in-coupling grating 1712 at the waveguide 1710 may operate in the non-switching state. Accordingly, the image lights having the second polarization received from the waveguide 1720 may maintain the second polarization after being transmitted through the polarization switch 1716. As the in-coupling grating 1712 may be configured to diffract image lights having the first polarization and transmit image lights having the second polarization with negligible or no diffraction, the transmitted image lights having the second polarization may not be coupled into a TIR path inside the waveguide 1710, and may be transmitted through the waveguide 1710. Polarizations switches 1738, 1728, and 1718 respectively coupled to the out-coupling gratings 1734, 1724, and 1714 may operate in the non-switching state, and may transmit image lights without affecting or switching the polarizations of the image lights. Thus, during the first subframe, the image lights 1755 (e.g. red lights) may be directed to the eye 265 via the waveguide 1730, and the single-color image of a first color (e.g. red color) may be replicated at the eye-box located at the exit pupil of the eye 265.

Referring to FIG. 17A and FIG. 17C, during a second subframe, the image lights 1765 (e.g., green light) may be emitted by the light source assembly 1760 toward the waveguide stack 1701, and the image lights 1755 (e.g., red light) and 1775 (e.g., blue light) may not be emitted from the corresponding source assemblies 1750 and 1770, respectively. The polarization switch 1736 coupled to the in-coupling grating 1732 at the waveguide 1730 may operate in the switching state to convert the image lights 1765 having the first polarization into image lights having the second polarization. The image lights having the second polarization may not be coupled into a TIR path inside the waveguide 1730. Rather, the image lights having the second polarization may be transmitted through the waveguide 1730 toward the waveguide 1720.

The polarization switch 1726 coupled to the in-coupling grating 1722 at the waveguide 1720 may operate in the switching state to convert the image lights having the second polarization output from the waveguide 1730 into image lights having the first polarization. The image lights having the first polarization may be coupled into a TIR path within the waveguide 1720 via the in-coupling grating 1722, and coupled out of the waveguide 1720 via the out-coupling grating 1724 as image lights having the first polarization.

At the out-coupling side of the waveguide stack 1701, the polarization switch 1728 coupled to the out-coupling grating 1724 at the waveguide 1720 may operate in the switching state to convert the image lights having the first polarization output from the out-coupling grating 1724 into image lights having the second polarization toward the waveguide 1730. The image lights having the second polarization may not be coupled into a TIR path inside the waveguide 1730. Rather, the image lights having the second polarization output from the polarization switch 1728 may be directly transmitted through the waveguide 1730 and the out-coupling grating 1734 toward the polarization switch 1738. In some embodiments, the polarization switch 1738 coupled to the out-coupling grating 1734 at the waveguide 1730 may operate in the switching state to convert the image lights having the second polarization output from the out-coupling grating 1734 into image lights having the first polarization toward the eye 265. Thus, the single-color image of a second color (e.g. green color) different from the first color (e.g., red color) may be perceived by the eye 265.

Referring back to the in-coupling side of the waveguide stack 1701, the polarization switch 1716 coupled to the in-coupling grating 1712 at the waveguide 1710 may operate in the switching state to convert the image lights having the first polarization and not coupled into the waveguide 1720, into image lights having the second polarization. The image lights having the second polarization output from the polarization switch 1716 may not be coupled into a TIR path inside the waveguide 1710. Rather, the image lights having the second polarization output from the polarization switch 1716 may be transmitted through the waveguide 1710. Thus, during the second subframe, the image lights 1765 (e.g., green lights) having the first polarization may be directed to the eye 265 via the waveguide 1720, and the single-color image (e.g. green color image) may be replicated at the eye-box located at the exit pupil of the eye 265.

Referring to FIG. 17A and FIG. 17C, during a third subframe, the image lights 1775 (e.g., blue lights) may be emitted by the light source assembly 1770 toward the waveguide stack 1701, and the image lights 1755 (e.g., red light) and 1765 (e.g., green light) may not be emitted from the corresponding source assemblies, respectively. The polarization switch 1736 coupled to the in-coupling grating 1732 at the waveguide 1730 may operate in the switching state to convert the image lights 1775 having the first polarization into image lights having the second polarization, which may not be coupled into a TIR path inside the waveguide 1730. Rather, the image lights having the second polarization output from the polarization switch 1736 may be transmitted through the waveguide 1730 toward the waveguide 1720.

The polarization switch 1726 coupled to the in-coupling grating 1722 at the waveguide 1720 may operate in the non-switching state to transmit the image lights having the second polarization without affecting or switching the polarization of the image lights. The image lights having the second polarization output from the polarization switch 1726 may not be coupled into a TIR path inside the waveguide 1720, and may be transmitted through the waveguide 1720 toward the waveguide 1710.

The polarization switch 1716 coupled to the in-coupling grating 1712 at the waveguide 1710 may operate in the switching state to convert the image lights having the second polarization into image lights having the first polarization. The image lights having the first polarization may be coupled into a TIR path within the waveguide 1710 via the in-coupling grating 1712, and coupled out of the waveguide 1710 via the out-coupling grating 1714 as image lights having the first polarization.

At the out-coupling side of the waveguide stack 1701, the polarization switch 1718 coupled to the out-coupling grating 1714 at the waveguide 1710 may operate in the switching state to convert the image lights having the first polarization into image lights having the second polarization toward the waveguide 1720. The image lights having the second polarization output from the polarization switch 1718 may not be coupled into a TIR path inside the waveguide 1720. Rather, the image lights having the second polarization output from the polarization switch 1718 may be directly transmitted through the waveguide 1720 toward the waveguide 1710.

The polarization switch 1728 coupled to the out-coupling grating 1724 at the waveguide 1720 may operate in the non-switching state to transmit the image lights having the second polarization without affecting or switching the polarization toward the waveguide 1730. The image lights having the second polarization output from the polarization switch 1728 may not be coupled into a TIR path inside the waveguide 1730. Rather, the image lights having the second polarization output from the polarization switch 1728 may be directly transmitted through the waveguide 1730 toward the polarization switch 1738.

In some embodiments, the polarization switch 1738 coupled to the out-coupling grating 1734 at the waveguide 1730 may operate in the switching state to convert the image lights having the second polarization into image lights having the first polarization toward the eye 265, such that a third single-color image (e.g. blue color image) may be perceived by the eye 265. Thus, during the third subframe, the image lights 1775 (e.g., blue lights) having the first polarization may be directed to the eye 265 via the waveguide 1710, and the single-color image of a third color (e.g. blue color) different from the first color (e.g., red color) or second color (e.g., green color) may be replicated at the eye-box located at the exit pupil of the eye 265.

Thus, during a display frame, a sequential transmission of image lights of different colors (e.g., red, green, blue) may be realized. That is, a sequential transmission of single-color images of different colors may be realized. A final image may be perceived by the eye 265 as a polychromatic image. In some embodiments, a time-multiplexing realized through the disclosed indirectly switchable gratings (which may be passive gratings in some embodiments) may reduce or eliminate crosstalk in the waveguide stack 1701. Accordingly, the optical performance of the waveguide display assembly including the waveguide stack 1701 may be enhanced.

In some embodiments, at least one (e.g., each) of the light source assemblies 1750, 1760, or 1770 may emit an unpolarized monochromatic image light, and at least one (e.g., each of) the polarizers 1740 may be omitted. The unpolarized image light may be directed to the in-coupling gratings 1712, 1722, or 1732. Depending on the polarization selectivity of the in-coupling gratings 1712, 1722, or 1732, one component of the two orthogonal polarized components of the unpolarized image light emitted from the light source assemblies 1750, 1760, or 1770 may be coupled into the waveguides 1710, 1720, or 1730, while the other component may be transmitted through with negligible or no diffraction.

In some embodiments, the wavelength spectra of the out-coupling gratings 1714, 1724, and 1734 may be substantially non-overlapping with one another such that the crosstalk between the out-coupling gratings may be minimized or reduced. Accordingly, the polarization switches 1718, 1728, and 1738 respectively coupled to the out-coupling gratings 1714, 1724, and 1734 may be omitted. In some embodiments, the wavelength spectra of the in-coupling gratings 1712, 1722, and 1732 may be substantially non-overlapping with one another such that the crosstalk between the in-coupling gratings may be minimized or reduced. Accordingly, the polarization switches 1716, 1726, and 1736 respectively coupled to the in-coupling gratings 1712, 1722, and 1732 may also be omitted. That is, in some embodiments, the out-coupling gratings 1714, 1724, and 1734 and in-coupling gratings 1712, 1722, and 1732 may each have a predetermined wavelength selectivity, e.g., the gratings may diffract incoming lights within a predetermined wavelength band or range and transmit incoming lights outside of the predetermined wavelength band with negligible or no diffraction, such that the corresponding polarization switches coupled to the gratings may be omitted. For example, each of the in-coupling gratings 1712, 1722, and 1732, and the out-coupling gratings 1714, 1724, and 1734 may be fabricated to operate in a Bragg regime to have a predetermined wavelength selectivity. In some embodiments, when the out-coupling gratings 1714, 1724, and 1734 and in-coupling gratings 1712, 1722, and 1732 are substantially wavelength selective, the optical system 1700 may be configured to simultaneously deliver single-color images of different colors to the eye-box. In some embodiments, at least one (e.g., each) of the light source assemblies 1750, 1760, or 1770 may emit an unpolarized monochromatic image light, and at least one (e.g., each of) the polarizers 1740 may be omitted. The unpolarized image light may be directed to the in-coupling gratings 1712, 1722, or 1732. Depending on the polarization selectivity of the in-coupling grating 1712, 1722, or 1732, one component of the two orthogonal polarized components of the unpolarized image light emitted from the light source assembly 1750, 1760, or 1770 may be coupled into the waveguide 1710, 1720, or 1730, while the other component may be transmitted through with negligible or no diffraction. Thus, the optical system 1700 may be configured to deliver the single-color image of the first color (e.g., red color), the single-color image of the second color (e.g., green color), and the single-color image of the third color (e.g., blue color) to the eye-box simultaneously.

In some embodiments, instead of being disposed at the respective waveguides in the waveguide stack 1701, the in-coupling gratings 1712, 1722, and 1732 may be stacked and attached to a common (e.g., a single) waveguide, and the out-coupling gratings 1714, 1724, and 1734 may be stacked and attached to the common waveguide. A similar structure is shown in FIG. 16A. The stack of the in-coupling gratings and the stack of the out-coupling gratings may both be disposed at the first surface of the common waveguide, or may both be disposed at the second surface of the common waveguide, or may be disposed at the first surface and the second surface, respectively. Descriptions of the operation scheme for switching the polarizations to realize a time-sequential transmission of the image lights of different colors may refer to the descriptions rendered above in connection with FIGS. 17B-17D.

The embodiments shown in FIGS. 17A-17D may be effective for monochromatic image lights. For color images, the image lights of different colors may be spatially and/or temporally multiplexed. In some embodiments, the number of waveguides in the stack may be reduced to two. For separate transmission of image lights of different colors, one waveguide may be configured for red and green and the other waveguide may be configured for green and blue. FIG. 17A shows that the in-coupling gratings and the out-coupling gratings may be embodiments of the disclosed indirectly switchable gratings (which may be passive gratings in some embodiments). This configuration is for illustrative purposes and is not intended to limit the scope of the present disclosure. In some embodiments, at least one of the in-coupling gratings may be an embodiment of the disclosed indirectly switchable gratings (which may be passive gratings in some embodiments), which may be indirectly switchable via an external polarization rotator or switch, and at least one of the out-coupling gratings may be a passive, non-switchable grating. In some embodiments, at least one of the out-coupling gratings may be an embodiment of the disclosed indirectly switchable gratings (which may be passive gratings in some embodiments), which are indirectly switchable via an external polarization rotator or switch, and at least one of the in-coupling gratings may be a passive, non-switchable grating.

The present disclosure also provides a method for directing, through a waveguide display assembly, a plurality of portions of an image light emitted from a light source assembly in a time-multiplexing manner. FIG. 18 illustrates a flow chart showing a method 1800 for directing, through a waveguide display assembly, different portions of the image light in a time-multiplexing manner, according to an embodiment of the disclosure. As shown in FIG. 18, the method 1800 may include: configuring, during a first time period, at least one of a first in-coupling grating or a first out-coupling grating disposed at a first waveguide of an optical device to operate in a diffraction state (step 1810). The method 1800 may also include coupling, during the first time period by the first in-coupling grating, a first light into the first waveguide via diffraction (step 1820). The first light may correspond to a first portion of an image light. The method 1800 may also include coupling, by the first out-coupling grating, the first light out of the first waveguide toward an eye-box of the optical device via diffraction (step 1830). In some embodiments, configuring the at least one of the first in-coupling grating or the first out-coupling grating to operate in the diffraction state may include configuring the at least one of the first in-coupling grating or the first out-coupling grating to operate in the diffraction state through a polarization switch coupled to the at least one of the first in-coupling grating or the first out-coupling grating. A portion of the image light may correspond to a predetermined portion of a field of view ("FOV") of a single-color image, a predetermined portion of the FOV of a multi-color image (e.g., a full-color image), or a single-color image of a predetermined color. In some embodiments, the first portion of the image light may correspond to a first portion of the FOV of a single-color image or a multi-color image. In some embodiments, the first portion of the image light may correspond to a single-color image of a first color.

The method 1800 may also include: configuring, during a second time period, at least one of a second in-coupling grating or a second out-coupling grating disposed at a second waveguide to operate in the diffraction state (step 1840). The method 1800 may also include coupling, during the second time period by the second in-coupling grating, a second light into the second waveguide via diffraction (step 1850). The second light may correspond to a second portion of the image light. The method 1800 may also include coupling, during the second time period by the second out-coupling grating, the second light out of the second waveguide toward an eye-box of the optical device via diffraction (step 1860). In some embodiments, configuring the at least one of a second in-coupling grating or a second out-coupling grating to operate in the diffraction state may include configuring the at least one of a second in-coupling grating or a second out-coupling grating to operate in the diffraction state via a polarization switch coupled to the at least one of the second in-coupling grating or the second out-coupling grating. In some embodiments, the second portion of the image light may correspond to a second portion of the FOV of a single-color image or a multi-color image (e.g., a full-color image). In some embodiments, the second portion of the image light may correspond to a second portion of the FOV of a single-color image or a multi-color image. In some embodiments, the second portion of the image light may correspond to a single-color image of a second color.

In some embodiments, the method 1800 may include additional steps not shown in FIG. 18. For example, in some embodiments, the method 1800 may include configuring, during a third time period, at least one of a third in-coupling grating or a third out-coupling grating disposed at a third waveguide to operate in the diffraction state via a polarization switch coupled to the at least one of the third in-coupling grating or the third out-coupling grating. The method 1800 may include coupling, during the third time period by the third in-coupling grating, a third light corresponding to a third portion of the image light into the third waveguide via diffraction. The method 1800 may also include, coupling, during the third time period by the third out-coupling grating, the third light out of the third waveguide toward an eye-box of the optical device via the diffraction. The waveguide display assembly may be an embodiment of any disclosed waveguide display assembly, such as the waveguide display assembly 200 or 250 shown in FIG. 2A-2B. The waveguide display assembly may include at least one disclosed passive diffractive optical element functioning as an in-coupling grating or an in-coupling grating.

FIG. 19 is a flow chart illustrating a method 1900 for directing, through a waveguide display assembly, a plurality of portions of an image light emitted from a light source assembly. The method 1900 may include configuring, at least one of a first polarization selective in-coupling element or a first polarization selective out-coupling element coupled to a first waveguide of a device to operate in a diffraction state (step 1910). At least one of the first polarization selective in-coupling element or the first polarization selective out-coupling element may include one or more of the disclosed indirectly switchable gratings. The method 1900 may also include directing, by the first polarization selective in-coupling element, the first waveguide, and the first polarization selective out-coupling element, a first portion of an image light to an eye-box of the device (step 1920). The method 1900 may also include configuring, at least one of a second polarization selective in-coupling element or a second polarization selective out-coupling element coupled to a second waveguide to operate in the diffraction state (step 1930). At least one of the second polarization selective in-coupling element or the second polarization selective out-coupling element may include one or more of the disclosed indirectly switchable gratings. The method may further include directing, by the second polarization selective in-coupling element, the second waveguide, and the second polarization selective out-coupling element, a second portion of the image light to the eye-box (step 1940). The first portion of the image light and the second portion of the image light may be delivered to the eye-box during a same time period or different time periods. In some embodiments, configuring the at least one of the first polarization selective in-coupling element or the first polarization selective out-coupling element to operate in the diffraction state may include controlling an operation state of a polarization switch coupled to the at least one of the first polarization selective in-coupling element or the first polarization selective out-coupling element. In some embodiments, the first portion of the image light may correspond to a first portion of a field of view ("FOV") of a single-color image, a multi-color image, or a single-color image of a first color. The second portion of the image light may correspond to a second portion of the FOV of the single-color image, the multi-color image, or the single-color image of a second color different from the first color. In some embodiments, the first waveguide and the second waveguide are a same common waveguide, the first polarization selective in-coupling element and the second polarization selective in-coupling element are configured to at least partially overlap, and the first polarization selective out-coupling element and the second polarization selective out-coupling element are configured to at least partially overlap. In some embodiments, the first waveguide and the second waveguide are separate waveguides, the first polarization selective in-coupling element and the first polarization selective out-coupling element are coupled to the first waveguide, and the second polarization selective in-coupling element and the second polarization selective out-coupling element are coupled to the second waveguide. In some embodiments, the method 1900 may include additional steps. For example, the method 1900 may include configuring, at least one of a third polarization selective in-coupling element or a third polarization selective out-coupling element coupled to a third waveguide to operate in the diffraction state. The method 1900 may also include directing, by the third polarization selective in-coupling element, the third waveguide, and the third polarization selective out-coupling element, a third portion of the image light to the eye-box.

The disclosed methods for polarization-multiplexing, spatial-multiplexing, and/or time-multiplexing of different colors and/or different portions of an FOV based on the disclosed indirectly switchable gratings (which may be passive gratings in some embodiments) may be combined to deliver multi-color images (e.g., full-color images) with a wide FOV, all of which are within the scope of the present disclosure. For example, the waveguide 1101 in FIG. 11A, the waveguide 1201 in FIG. 12A, the waveguide stack 1301 in FIG. 13A, the waveguide 1401 in FIG. 14A, the waveguide stack 1501 in FIG. 15A, or the waveguide 1601 in FIG. 16A may also be used for transmitting the multi-color images (e.g., full-color images) with a large FOV (e.g., an FOV greater than or equal to 60°), where the one or more waveguides are configured to deliver the multi-color images (e.g., full-color images) with different portions of FOV in a time-multiplexing manner. To realize the transmission of multi-color images (e.g., full-color images) with a large FOV via the waveguides in a time-multiplexing manner, at least one (e.g., each) of the in-coupling grating or the out-coupling grating in at least one (e.g., each) waveguide may include a plurality of sub-gratings for delivering different colors (e.g., red, green, and blue colors).

For example, to sequentially deliver multi-color image lights (e.g., full-color image lights) corresponding to predetermined portions of the FOV in a time-multiplexing manner via the waveguide stack 1501 shown in FIG. 15A or the waveguide 1601 shown in FIG. 16A, at least one (e.g., each) of the in-coupling gratings 1512, 1522, or 1532 shown in FIG. 15A, or at least one (e.g., each) of the in-coupling gratings 1612, 1622, or 1632 shown in FIG. 16A may include one or more indirectly switchable in-coupling sub-gratings (which may be passive sub-gratings in some embodiments). At least one (e.g., each) of the out-coupling gratings 1514, 1524, or 1534 shown in FIG. 15A, or at least one (e.g., each) of the out-coupling gratings 1614, 1624, or 1634 shown in FIG. 16A may include one or more indirectly switchable out-coupling sub-gratings (which may be passive sub-gratings in some embodiments). At least one (e.g., each) of the in-coupling gratings 1512, 1522, or 1532 shown in FIG. 15A or at least one (e.g., each) of the in-coupling gratings 1612, 1622, or 1632 shown in FIG. 16A may be an in-coupling grating stack. At least one (e.g., each) of the out-coupling gratings 1514, 1524, or 1534 shown in FIG.

15A or at least one (e.g., each) of the out-coupling gratings 1614, 1624, or 1634 shown in FIG. 16A may be an out-coupling grating stack.

In some embodiments, when X number of sub-gratings are configured for delivering an FOV and Y number of sub-gratings are configured for delivering single-color images forming a multi-color image (e.g., RGB colors), the total number of sub-gratings included in at least one (e.g., each) of the in-coupling grating stack or the out-coupling grating stack may be X*Y, where X and Y are positive integers that are greater than or equal to 2. For example, in some embodiments, at least one (e.g., each) of the in-coupling gratings 1512, 1522, or 1532 shown in FIG. 15A or at least one (e.g., each) of the in-coupling gratings 1612, 1622, or 1632 shown in FIG. 16A configured for delivering ⅓ portion of the FOV (X=3) may include 3 sub-gratings (Y=3) to deliver a corresponding portion of the FOV in red, green and blue colors, respectively. Likewise, at least one (e.g., each) of the out-coupling gratings 1514, 1524, or 1534 shown in FIG. 15A or at least one (e.g., each) of the out-coupling gratings 1614, 1624, or 1634 shown in FIG. 16A configured for delivering ⅓ portion of the FOV (X=3) may include 3 sub-gratings (Y=3) to deliver a corresponding portion of FOV in red (R), green (G), and blue (B) colors, respectively. The total number of the in-coupling sub-gratings may be equal to the total amount of the out-coupling sub-gratings. In some embodiments, the total number of sub-gratings may satisfy X*Y=3*3=9. In some embodiments, the corresponding sub-gratings from the in-coupling and out-coupling grating stacks may be configured to operate in the diffraction state in separate subframes (e.g., 9 subframes) to suppress the crosstalk.

In at least one (e.g., each) subframe, a pair of indirectly switchable (e.g., passive) in-coupling and out-coupling sub-gratings may be configured to operate in the diffraction state to transmit a single-color image corresponding to a predetermined portion of the FOV to the eye. The remaining pairs of the in-coupling sub-gratings and out-coupling sub-gratings may be configured to operate in the non-diffraction state. Thus, during the entire display frame, single-color images corresponding to different portions of the FOV may be sequentially transmitted to the eye in the time-multiplexing manner. For example, a single-color image of red color corresponding to the left portion of FOV, a single-color image of green color corresponding to the left portion of FOV, a single-color image of blue color corresponding to the left portion of FOV, a single-color image of red color corresponding to the center portion of FOV, a single-color image of green color corresponding to the center portion of FOV, a single-color image of blue color corresponding to the center portion of FOV, a single-color image of red color corresponding to the right portion of FOV, a single-color image of green color corresponding to the right portion of FOV, and a single-color image of blue color corresponding to the right portion of FOV may be sequentially transmitted to the eye in the time-multiplexing manner. The sequence of transmission may operate in any suitable sequence. In some embodiments, the number of subframes may be reduced when one or more sub-gratings included in the waveguide stack 1501 (e.g., for different colors) or the waveguide 1601 are highly selective, such that a crosstalk therebetween may be negligible.

Likewise, the waveguide 1201 shown in FIG. 12A may be configured for transmitting multi-color images (e.g., full-color images) with a large FOV. The waveguide 1201 may be configured to deliver multi-color images (e.g., full-color images) with different portions of the FOV in a time-multiplexing manner. To realize the transmission of multi-color images (e.g., full-color images) with a large FOV via the waveguide 1201 in a time-multiplexing manner, at least one (e.g., each) of the in-coupling sub-gratings 1205*a*, 1205*b*, or 1205*c* may include one or more in-coupling tertiary gratings for delivering different colors (e.g., red, green, and blue colors). At least one (e.g., each) of the out-coupling sub-gratings 1210*a*, 1210*b*, or 1210*c* may include one or more out-coupling tertiary gratings for delivering different colors (e.g., red, green, and blue colors). The respective tertiary gratings may be stacked or tiled at a surface of the waveguide 1201, as shown in FIG. 12A. The number of the in-coupling tertiary gratings and out-coupling tertiary gratings may be determined in a same way as that of the in-coupling sub-gratings and out-coupling sub-gratings coupled to the waveguide stack 1501 in FIG. 15A.

In the present disclosure, in some embodiments, to sequentially deliver multi-color image lights (e.g., full-color image lights) corresponding to predetermined portions of the FOV in a time-multiplexing manner, at least one (e.g., each) in-coupling grating may include three switchable in-coupling sub-gratings, and/or at least one (e.g., each) out-coupling grating may include three switchable out-coupling sub-gratings. The number of switchable in-coupling sub-gratings and the number of switchable out-coupling sub-gratings are for illustrative purposes, and are not intended to limit the scope of the present disclosure. Any other suitable number of switchable in-coupling sub-gratings and any other suitable number of switchable out-coupling sub-gratings may be used. In some embodiments, to multiplex colors and tile FOVs substantially simultaneously, at least one (e.g., each) in-coupling grating (or sub-grating) may include N number of in-coupling sub-gratings (or tertiary gratings), and/or at least one (e.g., each) out-coupling grating (or sub-grating) may include N number of out-coupling sub-gratings (or tertiary gratings), N is a positive integer and N is greater than or equal to 2. In some embodiments, N is greater than or equal to 3. That is, an in-coupling sub-grating (or tertiary grating) and a corresponding out-coupling sub-grating (or tertiary grating) may form a pair. A disclosed waveguide or waveguide stack may include N pairs. During respective time periods, corresponding pairs of the N pairs may be sequentially configured to operate in the diffraction state to transmit corresponding portions of a plurality of portions of the image light, and the remaining pairs of the N pairs may be configured to operate in the non-diffraction state. The plurality of portions of the image light may correspond to single-color images of different colors, different portions of the FOV of single-color images, or different portions of the FOV of multi-color images (e.g., full-color images).

In some embodiments, when the above-mentioned waveguide display assemblies are used for spatial- and/or time-multiplexing of different colors and/or different portions of the FOV, the polarization of image light may not change while the image light travels through one or more waveguides. In some embodiments, the polarization of image light may change while the image light travels through one or more waveguides. In such a situation, the waveguide display assembly may include a polarization correcting anisotropic plate disposed adjacent to the one or more waveguides, and a clean-up polarizer to block, reduce, or eliminate undesirable (or ghost) images.

Further, the disclosed methods and disclosed waveguide display assemblies for spatial- and/or time-multiplexing of different colors and/or different portions of the FOV are described using indirectly switchable gratings (which may be passive gratings in some embodiments) as examples. In some embodiments, the passive, indirectly switchable gratings may be configured to diffract image lights having a predetermined linear polarization and transmit image lights having a different polarization (e.g., a polarization orthogonal to the predetermined linear polarization) with negligible diffraction or no diffraction. A polarization switch may be configured to switch a linearly polarized incoming light between two orthogonal linear polarizations before the light is incident onto the passive, indirectly switchable grating. The indirectly switchable gratings (which may be passive gratings in some embodiments) are for illustrative purposes and are not intended to limit the scope of the present disclosure. In some embodiments, the disclosed methods and waveguide display assemblies for spatial- and/or time-multiplexing of different colors and/or different portions of the FOV may also be realized by indirectly switchable gratings (which may be passive gratings in some embodiments) configured to selectively diffract image lights having a polarization other than a linear polarization, such as a circular polarization or an elliptical polarization, all of which are within the scope of the present disclosure. For example, the indirectly switchable grating (which may be a passive grating in some embodiments) may include a polarization volume hologram ("PVH") that may be configured to diffract image lights having a circular polarization. In some embodiments, the PVH may diffract a circularly polarized light having a same handedness as a helix twist of the PVH and transmit a circularly polarized light having a handedness opposite to that of the helix twist of the PVH. A polarization switch may be coupled to the PVH, and configured to switch a circularly polarized incoming light between two orthogonal handedness, thereby controlling the polarization of a light incident onto the passive gratings. The disclosed methods and waveguide display assemblies for spatial- and/or time-multiplexing of different colors and/or different portions of the FOV may also be realized by other indirectly switchable gratings (which may be passive gratings in some embodiments), such as geometric phase gratings based on passive LCs, metasurface/LC gratings etc., all of which are within the scope of the present disclosure. In some embodiments, in the disclosed methods, devices, and systems, the passive indirectly switchable grating may be replaced by an active and polarization selective grating, which can also be indirectly switchable.

In the disclosed devices and systems, any polarization switch for indirectly switching an indirectly switchable grating (e.g., a passive grating) may be similar to the polarization switch 820 shown in FIG. 8A. Although not shown in some of the embodiments, it is understood that in each embodiment where an indirectly switchable grating is included, a controller similar to the controller 215 may be included to control the polarization switch, thereby indirectly switching the operation state (e.g., diffraction state or non-diffraction state) of the indirectly switchable grating.

The foregoing description of the embodiments of the disclosure have been presented for the purpose of illustration. It is not intended to be exhaustive or to limit the disclosure to the precise forms disclosed. Persons skilled in the relevant art can appreciate that modifications and variations are possible in light of the above disclosure.

Some portions of this description may describe the embodiments of the disclosure in terms of algorithms and symbolic representations of operations on information. These operations, while described functionally, computationally, or logically, may be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware and/or software modules, alone or in combination with other devices. In one embodiment, a software module is implemented with a computer program product including a computer-readable medium containing computer program code, which can be executed by a computer processor for performing any or all of the steps, operations, or processes described. In some embodiments, a hardware module may include hardware components such as a device, a system, an optical element, a controller, an electrical circuit, a logic gate, etc.

Embodiments of the disclosure may also relate to an apparatus for performing the operations herein. This apparatus may be specially constructed for specific purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. The non-transitory computer-readable storage medium can be any medium that can store program codes, for example, a magnetic disk, an optical disk, a read-only memory ("ROM"), or a random access memory ("RAM"), an Electrically Programmable read only memory ("EPROM"), an Electrically Erasable Programmable read only memory ("EEPROM"), a register, a hard disk, a solid-state disk drive, a smart media card ("SMC"), a secure digital card ("SD"), a flash card, etc. Furthermore, any computing systems described in the specification may include a single processor or may be architectures employing multiple processors for increased computing capability. The processor may be a central processing unit ("CPU"), a graphics processing unit ("GPU"), or any processing device configured to process data and/or performing computation based on data. The processor may include both software and hardware components. For example, the processor may include a hardware component, such as an application-specific integrated circuit ("ASIC"), a programmable logic device ("PLD"), or a combination thereof. The PLD may be a complex programmable logic device ("CPLD"), a field-programmable gate array ("FPGA"), etc.

Embodiments of the disclosure may also relate to a product that is produced by a computing process described herein. Such a product may include information resulting from a computing process, where the information is stored on a non-transitory, tangible computer readable storage medium and may include any embodiment of a computer program product or other data combination described herein.

Further, when an embodiment illustrated in a drawing shows a single element, it is understood that the embodiment may include a plurality of such elements. Likewise, when an embodiment illustrated in a drawing shows a plurality of such elements, it is understood that the embodiment may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one embodiment but not another embodiment may nevertheless be included in the other embodiment.

Various embodiments have been described to illustrate the exemplary implementations. Based on the disclosed embodiments, a person having ordinary skills in the art may make various other changes, modifications, rearrangements, and substitutions without departing from the scope of the present disclosure. Thus, while the present disclosure has been described in detail with reference to the above embodiments, the present disclosure is not limited to the above described embodiments. The present disclosure may be embodied in other equivalent forms without departing from the scope of the present disclosure. The scope of the present disclosure is defined in the appended claims.

What is claimed is:

1. A device, comprising:

a waveguide; and an in-coupling element and an out-coupling element coupled with the waveguide;

wherein the waveguide, the in-coupling element, and the out-coupling element are configured to deliver a plurality of portions of an image light to an eye-box of the device, and wherein at least one of the in-coupling element or the out-coupling element includes a polarization selective diffractive element comprising:

a grating including a plurality of microstructures defining a plurality of grooves filled with a passive optically anisotropic material having a first effective refractive index along a groove direction of the grooves and a second effective refractive index along an in-plane direction perpendicular to the groove direction, wherein one of the first effective refractive index or the second effective refractive index substantially matches with a refractive index of the microstructures, and wherein the polarization selective diffractive element is indirectly switchable between a diffraction state and a non-diffraction state via an external polarization switch coupled to the polarization selective diffractive element.

2. The device of claim 1, wherein the other one of the first effective refractive index or the second effective refractive index does not match with the refractive index of the microstructures.

3. The device of claim 1, wherein a portion of the image light corresponds to a predetermined portion of a field of view of a single-color image or a multi-color image.

4. The device of claim 1, wherein a portion of the image light corresponds to a single-color image of a predetermined color.

5. The device of claim 1, wherein the passive optically anisotropic material includes an optically anisotropic polymer.

6. The device of claim 1, further comprising:

a plurality of waveguides disposed in a stacked configuration, and a plurality of polarization selective diffractive elements coupled with the plurality of waveguides, wherein the polarization selective diffractive elements are configured to operate in the diffraction state to deliver a respective portion of the plurality of portions of the image light during a same time period, and wherein at least one of angular spectra or wavelength spectra of the polarization selective diffractive elements are substantially non-overlapping.

7. The device of claim 1, wherein the grating is a slanted grating or a non-slanted grating.

8. The device of claim 1, wherein the polarization selective diffractive element includes a plurality of gratings, during a plurality of time periods, the gratings are sequentially configured to operate in the diffraction state to deliver a respective portion of the plurality of portions of the image light, and during one of the plurality of time periods, at least one of the gratings is configured to operate in the diffraction state to deliver a portion of the plurality of portions of the image light, and one or more remaining gratings are configured to operate in the non-diffraction state.

9. The device of claim 8, wherein the gratings are arranged to at least partially overlap with one another.

10. The device of claim 8, wherein the gratings are disposed in a stacked configuration.

11. The device of claim 1, further comprising:

a plurality of waveguides disposed in a stacked configuration, and a plurality of the polarization selective diffractive elements coupled with the plurality of waveguides, wherein, during a plurality of time periods, the polarization selective diffractive elements are sequentially configured to operate in the diffraction state to deliver a respective portion of the plurality of portions of the image light, and wherein, during one of the plurality of time periods, the polarization selective diffractive element included in one of the waveguides is configured to operate in the diffraction state to deliver a portion of the plurality of portions of the image light, and one or more polarization selective diffractive elements included in one or more remaining waveguides are configured to operate in the non-diffraction state.

12. A device, comprising:

a waveguide; and an in-coupling element and an out-coupling element coupled with the waveguide;

wherein the waveguide, the in-coupling element, and the out-coupling element are configured to deliver a plurality of portions of an image light to an eye-box of the device, wherein at least one of the in-coupling element or the out-coupling element includes a polarization selective diffractive element comprising:

a grating including a plurality of microstructures defining a plurality of grooves filled with a passive optically anisotropic material having a first effective refractive index along a groove direction of the grooves and a second effective refractive index along an in-plane direction perpendicular to the groove direction, wherein one of the first effective refractive index or the second effective refractive index substantially matches with a refractive index of the microstructures, wherein the polarization selective diffractive element includes a plurality of gratings configured to operate in a diffraction state to deliver a respective portion of the plurality of portions of the image light during a same time period, and wherein at least one of angular spectra or wavelength spectra of the gratings are substantially non-overlapping.

* * * * *